United States Patent [19]

Yoshida

[11] Patent Number: 4,829,524
[45] Date of Patent: May 9, 1989

[54] DATA COMMUNICATION APPARATUS

[75] Inventor: Takehiro Yoshida, Tokyo, Japan

[73] Assignee: Canon Kabushiki Kaisha, Tokyo, Japan

[21] Appl. No.: 110,542

[22] Filed: Oct. 20, 1987

Related U.S. Application Data

[63] Continuation of Ser. No. 834,779, Feb. 28, 1986, abandoned.

[30] Foreign Application Priority Data

| Feb. 28, 1985 | [JP] | Japan | 60-37361 |
| Feb. 28, 1985 | [JP] | Japan | 60-37362 |
| Feb. 28, 1985 | [JP] | Japan | 60-37363 |
| Feb. 28, 1985 | [JP] | Japan | 60-37366 |
| Feb. 28, 1985 | [JP] | Japan | 60-37367 |
| Feb. 28, 1985 | [JP] | Japan | 60-37368 |

[51] Int. Cl.$^4$ .................................... G08C 25/02
[52] U.S. Cl. ............................................. 371/32
[58] Field of Search .................. 371/32, 33, 34, 35, 371/5; 375/58; 358/257; 455/63, 69

[56] References Cited

U.S. PATENT DOCUMENTS

| 3,452,330 | 6/1969 | Avery | 371/32 |
| 3,876,979 | 4/1975 | Winn | 371/32 |
| 4,110,558 | 8/1978 | Kageyama et al. | |
| 4,149,142 | 4/1979 | Kageyama | 371/32 |
| 4,153,916 | 5/1979 | Miwa et al. | 358/257 |
| 4,377,862 | 3/1983 | Koford | 371/32 |
| 4,422,171 | 12/1983 | Wortley | 371/32 |
| 4,583,124 | 4/1986 | Tsuji | 358/256 |
| 4,589,111 | 5/1986 | Adachi | 371/32 |
| 4,710,925 | 12/1987 | Negi . | |

FOREIGN PATENT DOCUMENTS

| 39191 | 11/1981 | European Pat. Off. . |
| 0116650 | 8/1984 | European Pat. Off. . |
| 2711377 | 9/1978 | Fed. Rep. of Germany . |
| 53-83514 | 7/1978 | Japan . |
| 55-151835 | 11/1980 | Japan . |
| 57-138269 | 8/1982 | Japan . |
| 60-10876 | 1/1985 | Japan . |

Primary Examiner—Jerry Smith
Assistant Examiner—Robert W. Beausoliel
Attorney, Agent, or Firm—Fitzpatrick, Cella, Harper & Scinto

[57] ABSTRACT

There is a data communication apparatus having a transmitting section to divide data into a plurality of units and transmit the data and a memory section to store the data. This apparatus reads out the data of the designated unit from the memory section in response to a retransmission request signal from the reception side and a signal indicative of the designated unit and then retransmits the readout data from the transmitting section. Thus, even if the transmission error occurs the data can be retransmitted from the corresponding line and the retransmission is efficiently executed.

29 Claims, 35 Drawing Sheets

FIG. 9A

LINE NUMBER (HIGH BYTE) | LINE NUMBER (LOW BYTE)

14 BITS/LINE NUMBER

FIG. 9B  LINE NUMBER 0
`1 0 0 0 0 0 0 0 1 0 0 0 0 0 0 0`

FIG. 9C  LINE NUMBER 1
`1 0 0 0 0 0 0 0 1 0 0 0 0 0 0 1`

FIG. 9D  LINE NUMBER 2
`1 0 0 0 0 0 0 0 1 0 0 0 0 0 1 0`

FIG. 9E  LINE NUMBER 3
`1 0 0 0 0 0 0 0 1 0 0 0 0 0 1 1`

FIG. 9F  LINE NUMBER 10
`1 0 0 0 0 0 0 0 1 0 0 0 1 0 1 0`

FIG. 9G  LINE NUMBER 100
`1 0 0 0 0 0 0 1 1 1 0 0 1 0 0`

FIG. 10

| TFIFS (8400H) | 00H | 80H | 80H | 80H | B2H | 59H | 01H | 00H |
|---|---|---|---|---|---|---|---|---|
| | 80H | 80H | 81H | B2H | 59H | 01H | 00H | 80H |
| (8410H) | 80H | 82H | B2H | 59H | 01H | 00H | 80H | 80H |
| | 83H | B2H | 59H | 01H | 00H | 80H | 80H | 84H |
| (8420H) | B2H | 59H | 01H | 00H | 80H | 80H | 85H | B2H |
| | 59H | 01H | 00H | 80H | 80H | 86H | B2H | 59H |
| (8430H) | 01H | 00H | 80H | 80H | 87H | B2H | 59H | 01H |
| | 00H | 80H | 80H | 88H | B2H | 59H | 01H | 00H |
| (8440H) | 80H | 80H | 89H | B2H | 59H | 01H | 00H | 80H |
| | 80H | 8AH | B2H | 59H | 01H | 00H | 80H | 80H |
| (8450H) | 8BH | B2H | 59H | 01H | 00H | 80H | 80H | 8CH |
| | B2H | 59H | 01H | 00H | ... | | | |

| LIN0 (C000H) | 00H | 84H | 07H | 84H | 0EH | 84H | 15H | 84H |
|---|---|---|---|---|---|---|---|---|
| | 1CH | 84H | ... | | | | | |

| TRANSMISSION SPEED | THE NUMBER OF BITS TRANSMITTED DURING 3 SEC | THE NUMBER OF BYTES TRANSMITTED DURING 3 SEC |
|---|---|---|
| 9600 BITS/SEC | 28800 BITS | 3600 BYTES |
| 7200 BITS/SEC | 21600 BITS | 2700 BYTES |
| 4800 BITS/SEC | 14400 BITS | 1800 BYTES |
| 2400 BITS/SEC | 7200 BITS | 900 BYTES |

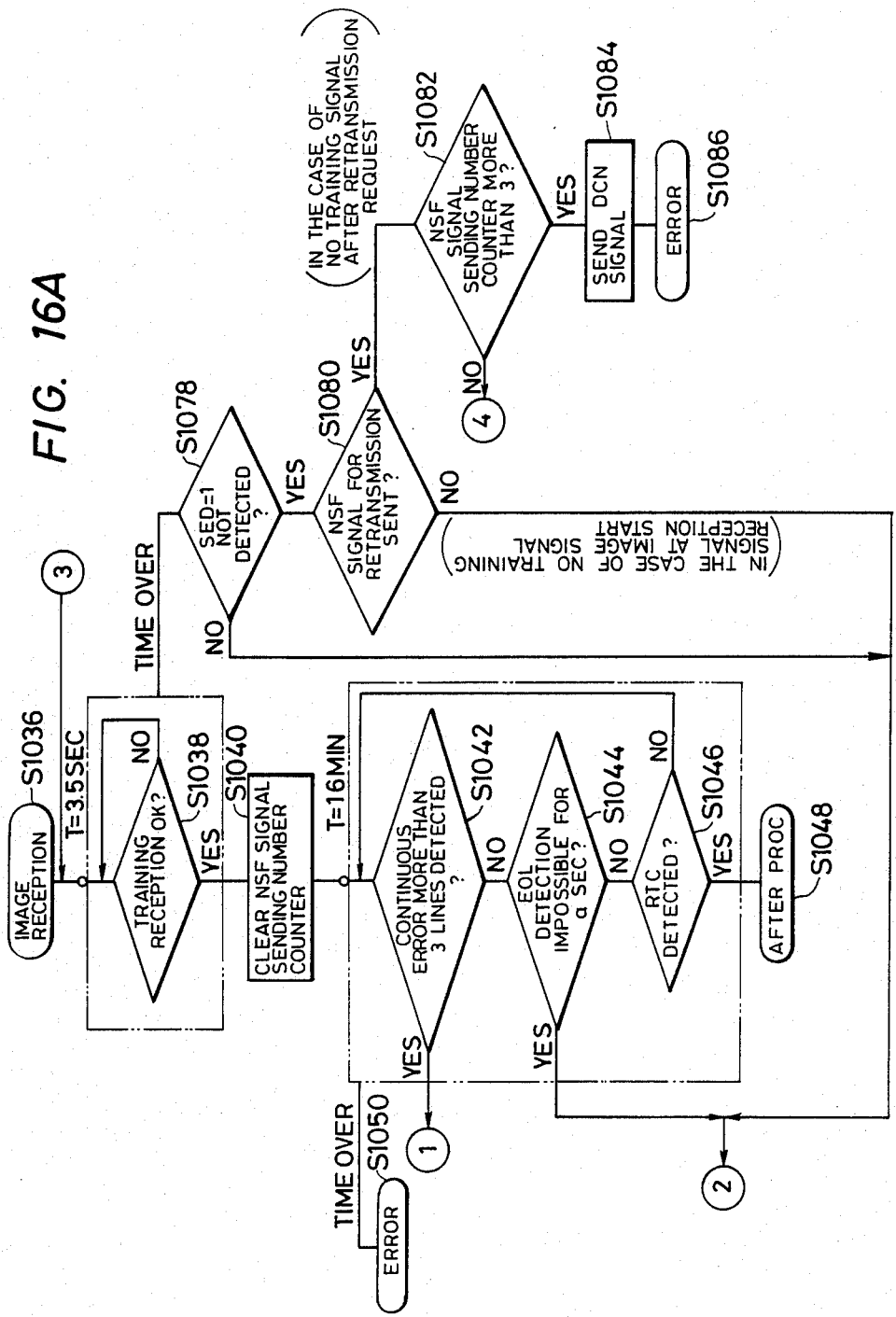

FIG. 20

| Address | Line Number |
|---|---|
| C000H, C001H | LINE NUMBER 0, 512 |
| C002H, C003H | LINE NUMBER 1, 513 |
| C004H, C005H | LINE NUMBER 2, 514 |
| C006H, C007H | LINE NUMBER 3, 515 |
| C008H, C009H | LINE NUMBER 4, 516 |
| ⋮ | ⋮ |
| C3F6H, C3F7H | LINE NUMBER 507, 101 |
| C3F8H, C3F9H | LINE NUMBER 508, 1020 |
| C3FAH, C3FBH | LINE NUMBER 509, 1021 |
| C3FCH, C3FDH | LINE NUMBER 510, 1022 |
| C3FEH, C3FFH | LINE NUMBER 511, 1023 |

FIG. 22B
FIG. 22C
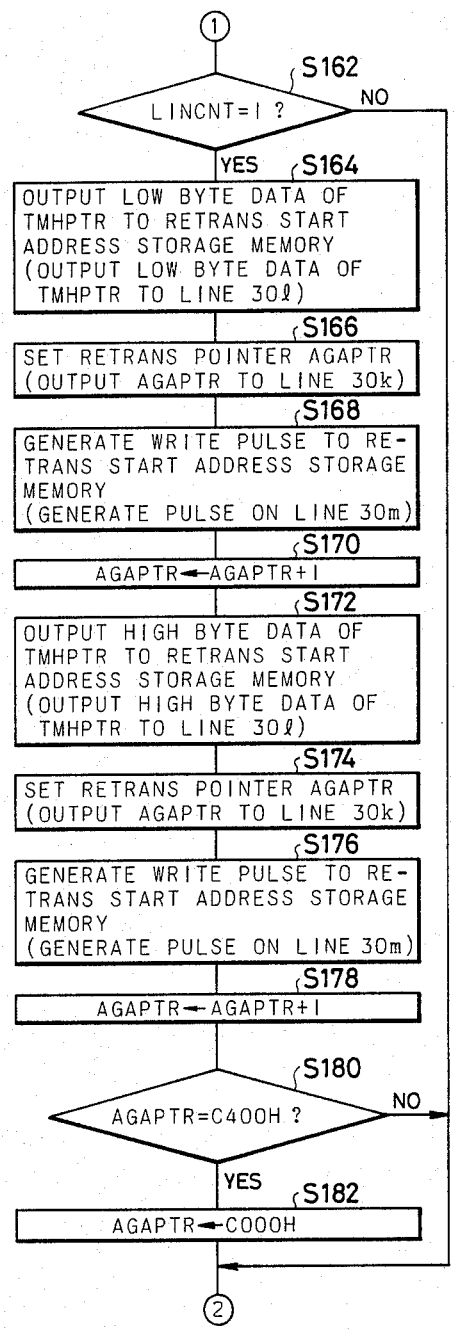
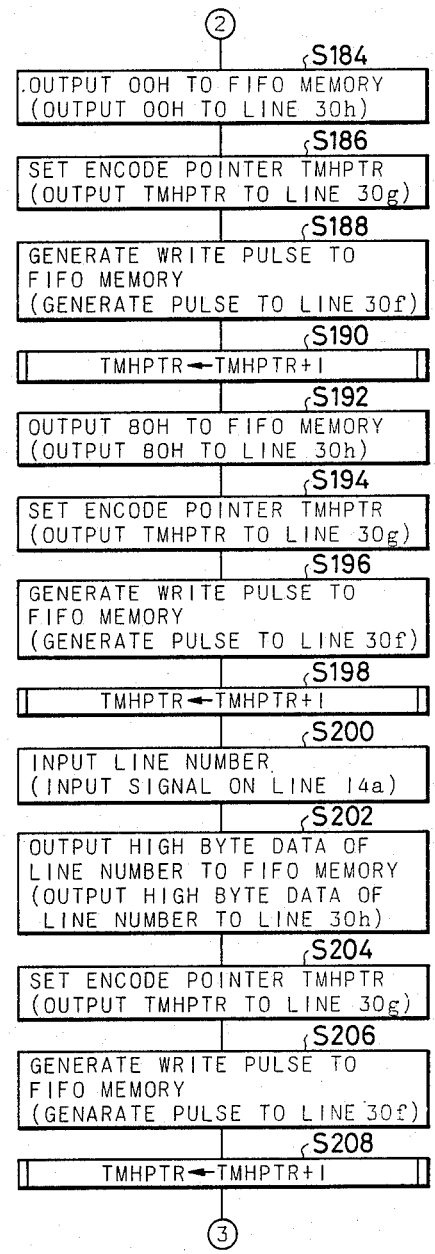

DATA COMMUNICATION APPARATUS

This application is a continuation of application Ser. No. 834,779 filed Feb. 28, 1986 and now abandoned.

BACKGROUND OF THE INVENTION

1. Field of the Invention

The present invention relates to a data communication apparatus for dividing data such as image data, character code data or the like and then transmitting the divided data and, more particularly, to a data communication apparatus which can efficiently retransmit and correct the data.

2. Related Background Art

Conventional technologies will now be practically described in accordance with the sequence of the items shown below with respect to a facsimile apparatus for executing a communication of an image as such a kind of data communication apparatus.

§1 Description of a constitution of an HDLC frame (using FIG. 1)

§2 Practical example of error retransmission using the HDLC frame constitution (using FIG. 2)

§3 Problems which are caused by error retransmission using the HDLC frame constitution
  §3.1 Influences upon line error
  §3.2 Influences due to the bit position where an error occurred (using FIG. 3)
  §3.3 Influences based on the propagation delay characteristic of the communication line (using FIG. 4)
  §3.4 Difficulty in encoding §4 Drawbacks of the error retransmission system which has conventionally been known
  §4.1 Regarding fallback
  §4.2 Regarding the process in the case where the reception of a training signal has resulted in a failure (using FIGS. 5 to 7)
  §4.3 Regarding the process in the case where EOL cannot be detected
  §4.4 Regarding the process in the case where the transmission of an image signal has been finished
  §4.5 Regarding the process after an instruction signal of a retransmission start line or the like has been sent
  §4.6 Regarding the selection of the error retransmission mode

§1 DESCRIPTION OF A CONSTITUTION OF AN HDLC FRAME

In the case of performing data transmission through a communication line such as a telephone line or the like, an error occurs in the data at a constant probability due to influences by the momentary disconnection of the communication line, noise, distortion, or the like. To detect the error data (this term is used herein to denote data received erroneously, i.e., with one or more errors in its content), the received data is subjected to predetermined arithmetic operations or the like, thereby discriminating whether a constant rule is maintained or not. If errors are detected, a method whereby a group of information data including the error data are retransmitted in accordance with a predetermined transmission control procedure is used.

Such an automatic retransmission request system (ARQ: Automatic Repeat Request) is used in the case of performing the half duplex transmission using telephone lines or the like and executed in accordance with the HDLC (High Level Data Link Control) procedure. This HDLC procedure is the transmission control procedure of the bit transparent synchronizing type in which highly efficient data transmission can be executed between data terminal equipment (DTE) through a data transmission line and at the same time an arbitrary bit string can be transmitted irrespective of any code system. In the HDLC procedure, the data of an arbitrary bit string and link control data are transferred on the basis of the frame as a transfer unit. The start and end of a frame are indicated by a flag sequence (01111110).

FIG. 1 shows a frame format of the HDLC procedure. The flag sequence shown in the diagram is the signal for frame synchronization. The frame synchronization is obtained by way of transmission and reception of one or more flag sequences. When the same bit string as the flag sequence appears in the data which is transferred by the frame, the reception side regards this bit string as an end of frame. To prevent this, the transparency of the data which is transferred is assured by using a method (zero bit inserting system) whereby in the case where a pattern of five successive bits "1" appears in the data of the frame, the transmission side forcedly inserts bit "0" immediately after this pattern and then transmits, while the reception side removes one bit "0" which is received subsequent to the pattern of five successive bits "1".

In the address field, the address by which the frame was assigned to the station for transmission and reception is indicated by a binary code (e.g., 11111111). The frame having the address of the station on the reception side of this frame is the command frame. The frame having the address of the station on the transmission side is the response frame.

The control field indicates a command to instruct an operation for the distant station in the case where the frame is a command, or a response to a command of the command frame in the case where the frame is a response, or the like.

A frame checking sequence (FCS) consists of sixteen bits and serves to detect a transmission error of the frame and shows the result of the operation by way of the generating polynomial $X^{16}+X^{12}+X^5+1$. The data from the beginning of the address field of the frame to the end of the data field is subjected to the operation.

The length of the data field may be set to an arbitrary value (e.g., $512 \times 8$ bits = 512 bytes).

§2 PRACTICAL EXAMPLE OF ERROR RETRANSMISSION USING THE HDLC CONSTITUTION

FIG. 2 shows a practical example when the error retransmission was performed using the HDLC frame data shown in FIG. 1. Namely, in the case where no error occurs when the reception side receives a certain frame, an ACK signal is sent. (On the contrary, when an error is detected, an NACK signal is sent, on the other hand).

The transmission side transmits frame N+1 after sending frame N in response to the ACK signal detected during transmission of frame N.

On the contrary, when the NACK signal is detected during transmission of a certain frame N, or when the ACK signal is not detected, the transmission side sends again frame N−1 after sending frame N. When the NACK signals are detected a predetermined number of times or more with respect to the same frame, or when no ACK signal is detected, the fallback is carried out.

In this manner, in the case of sending the framed data from the transmission side and receiving it on the reception side, as shown in FIG. 2, in the case where no error occurs with regard to frame N on the reception side and an error occurs upon reception of frame N+1, the following control is executed. Namely, the reception side sends an ACK signal after frame N is received and sends an NACK signal after frame N+1 is received.

On the other hand, the transmission side receives the ACK signal during transmission of frame N+1, so that it sends frame N+2 after frame N+1 is sent. Further, since the transmission side receives the NACK signal during transmission of frame N+2, it sends frame N+1 again after frame N+2 is sent.

After the reception side sends the NACK signal for frame N+1, it transmits the ACK signal after reception of frame N+2 irrespective of whether or not an error occurs in frame N+2. Therefore, the reception side enters the waiting state until frame N+1 is received. In the case where no error occurs in the retransmission frame N+1 which is sent subsequent to frame N+2, the reception side sends the ACK signal after it has received retransmission frame N+1.

On the other hand, since the transmission side receives the ACK signal during transmission of retransmission frame N+1, it again transmits frame N+2 after retransmission frame N+1 is sent. Then, frame N+3 is sent after frame N+2 is transmitted in response to the ACK signal received during transmission of frame N+2.

§3 PROBLEMS WHICH ARE CAUSED DUE TO ERROR RETRANSMISSION USING THE HDLC FRAME

The image communication apparatus using the automatic repeat request (ARQ) system which has conventionally been known adopts such an HDLC frame constitution as mentioned above, so that it has mainly the following problems.

§3.1 Influences Upon a Line Error

Since the signal to be transmitted is constituted as a block using the HDLC frame, the reception side can discriminate whether (i) no error occurred in the block or (ii) an error of one bit or more occurred. Therefore, the reception side can reproduce a good image without any error of one bit.

However, in the case where a reception error occurred with respect to a certain block, degree of the error cannot be discriminated. Namely, the reception side can only determine that no error occurred in the block or that an error exists in the block. In other words, the reception side cannot specify in which one of the first to xth bits (x denotes a block size and differs in dependence on the image data) the error exists.

Therefore, it is effective to constitute the signal as a block by the HDLC frame under a good line condition such as in Japan or the like (namely, in the case of the good line condition, the image without any error of one bit can be reproduced on the side of the receiver). However, in the case of a bad line condition, the probability that a few bits included in the HDLC frame contains reception errors is high. Thus, there is a drawback that the number of retransmission times increases.

§3.2 Influences Due to the Bit Position Where an Error Occurred

Since the signal to be transmitted is constituted as a block using the HDLC frame, even in the case where an error occurred at any bit position of the block, it is necessary to retransmit from the head of the block. For example, as shown in FIG. 3, even in the case where an error occurred in the data of the portion indicated at (A), it is necessary to retransmit from the head of the block, namely, from the data indicated at (B). Thus, there is a drawback that the transmission efficiency cannot be improved.

§3.3 Influences Based on the Propagation Delay Characteristic of the Communication Line The transmission side discriminates whether or not frame N−1 previously transmitted during transmission of a certain frame N was accurately received by the reception side. However, in this case as well, there is also a possibility that the ACK signal cannot be received due to a peculiar delay time of the line. The practical example will be described with reference to FIG. 4. Now, assuming that the time required to transmit the data of one block is Tf and the delay time which is caused when the signal is transferred from the transmission side to the reception side is Td, the relation of Tf>2Td must be satisfied. As mentioned above, there is a drawback that the allowable delay time of the line is determined in dependence on the block size. Therefore, a method whereby the block size is enlarged is considered to permit a long delay time of the line. However, the increase in the block size causes a drawback that it further promotes the drawback mentioned in the section §3.2 above.

§3.4 Difficulty in Encoding

There is a drawback that the time required for encoding is additionally expended to newly design.

§4 DRAWBACKS OF THE ERROR RETRANSMISSION SYSTEM WHICH HAS CONVENTIONALLY BEEN KNOWN

§4.1 Regarding Fallback

In the conventional error retransmission system, a retransmission is requested in the case where a reception error has occurred in the apparatus on the reception side. On one hand, fallback (this means that the transmission speed is reduced) is executed in the case where the error retransmission has been performed a constant number of times (e.g., three times ) or more while a certain document is being transmitted.

Therefore, in the case where the state (characteristic) of the line does not change and data can be received at a predetermined transmission speed (e.g., 4800 bits/sec) as well, the fallback occurs when the impulse-like noise is added to the line (for instance, in the case where impulse noise occurred three times during transmission of one doument).

Similarly, in the case where data cannot be received at a predetermined transmission speed in spite of the fact that the line is in the stationary state, the fallback is executed when the error retransmission has been carried out successively three times.

In the foregoing latter case, the reception error could be eliminated due to the fallback; therefore, this fallback is significant. However, in the former case, even if the fallback is executed, an error again occurs on the reception side due to the impulse noises. Consequently, the fallback is futile in the former case.

As described above, the conventional error retransmission system has a drawback that the transmission time becomes unnecessarily long since unnecessary and useless fallback is performed.

§4.2 Regarding the Process in the Case Where the Reception of a Training Signal Has Resulted in a Failure In the image communication system which has conventionally been known, in the case where the reception of a training signal has failed, an error immediately occurs on the reception side; on the other hand, an error occurs after completion of the transmission of one document on the transmission side. In this way, in spite of the fact that the image transmission is not executed, the line is held occupied until the end of the transmission of one document, so that there is a large drawback that the charge is expended without benefit.

FIG. 5 shows an example of the operation when the apparatus on the reception side has failed to receive a training signal in the conventional error retransmission system. In the diagram, NSF is a non-standard apparatus signal,
CSI is a called station identifying signal,
DIS is a digital identifying signal,
NSS is a non-standard apparatus setting signal,
TSI is a transmission terminal identifying signal,
DCS is a digital command signal,
TCF is a training check signal,
CFR is a reception preparation confirming signal,
EOP is an end of procedure signal, and
DCN is a disconnection command signal.
(Refer to T. 30 CCITT Recommendation.)

FIGS. 6A to 6C show waveform diagrams in the case where the reception side apparatus received a training signal and succeeded in receiving the training signal.

FIG. 6A shows a signal on the line. FIG. 6B shows the presence or absence of the signal (SED: Signal Energy Detect) indicative of whether a signal exists on the line or not. When the signal exists on the line, the SED is at a high level. FIG. 6C shows a carrier detect (CD) representative of whether the effective data which is sent at a predetermined transmission speed has been detected or not. When the effective data at a predetermined transmission speed is detected, the CD is at a high level.

As will be apparent from FIGS. 6A to 6C, the training signal is received for the period (Tr) when the SED is at a high level and the CD is at a low level (Tr=1158 msec when 2400 bits/sec, and Tr=923 msec when 4800 bits/sec).

FIG. 7 is a flowchart showing a control procedure for receiving the training/image signal in the conventional apparatus.

Step S1000 indicates the reception of the training/image signal.

In step S1002, the time of ten seconds is set to a timer $T_2$ to discriminate whether the reception of the training signal has failed or not.

In step S1004, a check is made to see if the SED is held at a 1 level for 20 msec or not while checking to see if the timer $T_2$ has timed out or not. If the timer $T_2$ has timed out in step S1004, step S1012 follows. When SED=1 for 20 msec (namely, when the head of the training signal has been detected), step S1006 follows.

In step S1006, a check is made to see if the CD is held at a 0 level for a msec (a=700 msec when 2400 bits/sec, and a=500 msec when 4800 bits/sec) or not while checking to see if the timer $T_2$ has timed out or not. If the timer $T_2$ has timed out in step S1006, step S1012 follows. When CD=0 for a msec (namely, when the training signal has been received), step S1008 follows.

In step S1008, a check is made to see if the CD is held at a 1 level for 20 msec or not while checking to see if the timer $T_2$ has timed out or not. When the timer $T_2$ has timed out in step S1008, step S1012 follows. When CD=1 for 20 msec (namely, when the head of the image signal has been received), step S1010 follows.

Step S1010 indicates the reception of the image signal.

Step S1012 represents the reception error.

As shown in FIG. 7, when the reception of the training signal has failed (namely, when the SED and CD did not correctly operate), there is a drawback that this control procedure ends as an error about ten seconds after the apparatus has entered the reception mode of the training/image signal.

§4.3 Regarding the Process in the Case Where EOL Cannot Be Detected

In the conventional facsimile apparatus, in the case where the apparatus has succeeded in receiving the training signal and entered the reception mode of the image signal, if an EOL (End of Line) signal cannot be received for five or more seconds, an error is immediately determined to exist. This is also similar to the case where the error retransmission mode is used.

As described above, the error is decided promptly when the demodulation data is not accurately demodulated in spite of the fact that the reception of the training signal has succeeded. Thus, there is a drawback that the error retransmission is not effectively used.

§4.4 Regarding the Process in the Case Where the Transmission of an Image Signal Has Been Finished In the conventional facsimile apparatus, a procedure signal is sent immediately after completion of the transmission of the image signal. Therefore, there is a drawback that when an error occurs in the apparatus on the reception side upon reception of the last block, the error retransmission cannot be performed.

§4.5 Regarding the Process After an Instruction Signal of a Retransmission Start Line or the Like Has Been Sent In the conventional facsimile apparatus, when the reception side detects an error, it sends an NACK signal and thereafter transmits an instruction signal of a retransmission start line or the like. Then, the apparatus on the reception side receives the image signal which is sent from the apparatus on the transmission side (namely, the image signal from the retransmission start line designated).

However, there is a drawback that an error is decided when the instruction signal of the retransmission start line or the like which is sent from the reception side cannot be correctly received by the transmission side.

§4.6 Regarding the Selection of the Error Retransmission Mode

In general, although the error retransmission mode has an advantage that image data can be reliably transmitted, in the case where no error is detected, there is an inconvenience that it takes additional time than that in the ordinary transmission. Therefore, it is desirable for the operator to select whether the transmission in the error retransmission mode is to be executed or not.

However, in the conventional facsimile apparatus, there is also a drawback that the error retransmission mode cannot be arbitrarily selected on the basis of the will of the operator.

SUMMARY OF THE INVENTION

It is an object of the present invention to provide a data communication apparatus having an error retransmission mode in which the above-mentioned drawbacks of the conventional technology can be removed.

Another object of the invention is to provide a data communication apparatus which can efficiently and accurately retransmit error image data in consideration of the foregoing points.

Another object of the invention is to provide a data communication apparatus which executes fallback in the case where the number of times of retransmission of error data exceeds a predetermined value, thereby eliminating the drawbacks of the conventional problems regarding the fallback.

To accomplish the above objects, according to one aspect of the present invention, a data communication apparatus adapted to transmit and receive the data divided into a plurality of units comprises means for retransmitting the data in the case where an amount of reception error in the unit exceeds a predetermined value, and counting means for detecting that the number of times of data transmission has reached to a predetermined value and instructing gradual decrease of the transmission speed.

Another object of the invention is to provide a data communication apparatus which can arbitrarily change the decision reference enough to recognize "occurrence of a reception error" on the reception side, thereby eliminating various problems which are caused due to the image transmission in accordance with the HDLC frame format.

To accomplish this object, according to one aspect of the present invention, a data communication apparatus adapted to transmit and receive the data divided into a plurality of units comprises means for resending the code data corresponding the unit to the transmission side in the case where it is determined that the data in the unit has been erroneously received and then requesting the retransmission of the data in the unit, and means for variably setting the decision reference to request the retransmission of the data in the unit.

Another object of the invention is to provide a data communication apparatus which can retransmit error data in the case where the training signal cannot be correctly received, thereby eliminating the drawbacks as the conventional problems regarding the process in the case where the reception of the training signal has failed.

To accomplish this object, an apparatus according to this aspect of the present invention is provided with means for detecting that the training signal transmitted prior to transmission of data could not be correctly received by the distant side of communication, and means for controlling the retransmission of the data in accordance with the result of the detection.

Still another object of the invention is to provide a data communication apparatus which can store a part of the transmitted data on the transmission side, thereby eliminating the problems which are caused due to the data transmission in accordance with the HDLC frame format.

To accomplish this object, an apparatus according to still another aspect of present invention is provided with means for storing only a predetermined amount of transmitted data and this transmitted data is retransmitted in response to a request for retransmission which is obtained from the distant side apparatus to be communicated.

Another object of the invention is to provide an image data communication apparatus which retransmits error data when an EOL (End of Line) code could not be detected thereby eliminating the drawbacks as the conventional problems regarding the process in the case where the EOL cannot be detected.

To accomplish this object, according to the present invention, an image data communication apparatus adapted to divide image data into a plurality of line data and transmit them comprises means for determining that the distant side apparatus to be communicated could not detect the EOL within a predetermined period and means for controlling the retransmission of the data in accordance with the result of this decision.

Another object of the invention is to provide a data communication apparatus which enables the operator himself to selectively designate or cancel the error retransmission mode, thereby eliminating the drawbacks as the conventional problems regarding the selection of the error transmission mode.

To accomplish this object, an apparatus according to this aspect of the present invention is provided with retransmitting means for controlling the retransmission of error data in the case where a reception error occurred in the distant side apparatus to be communicated and selecting means for instructing the energization or non-energization of the retransmitting means.

Another object of the invention is to provide a data communication apparatus which, in the case where the reception of a training signal which is executed prior to the transmission and reception of data failed, can determine which one of the transmission side or reception side the cause of the failure belongs to.

To accomplish this object, an apparatus according to the present invention is provided with means for sending a training signal prior to transmitting data, means for detecting that the distant side apparatus to be communicated could not correctly receive the training signal, and means for deciding whether the transmission side or the reception side was the origin of the reception error of the training signal on the basis of the result of the detection.

Another object of the invention is to provide a data communication apparatus which interrupts the transmission of a procedure signal until it is confirmed that an error is not detected on the reception side, thereby eliminating the drawbacks as the conventional problems regarding the process in the case where the transmission of data ended.

To accomplish this object, an apparatus according to this aspect of the present invention is provided with means for confirming that a reception error regarding data didn't occur in the distant side apparatus to be communicated after completion of the transmission of the data and means for controlling the transmission of a procedure signal in the case where the above-mentioned confirmation was performed within a predetermined period.

The above and other objects and features of the present invention will become apparent from the following detailed description and the appended claims with reference to the accompanying drawings.

BRIEF DESCRIPTION OF THE DRAWINGS

FIGS. 9A to 9G are bit arrangement diagrams showing practical examples of line numbers;

FIG. 10 is a diagram showing an example in the case where the encoded data and the retransmission start address corresponding to each line number were stored into a memory;

FIG. 20 is an arrangement diagram showing a memory to store a retransmission start address;

FIGS. 22A to 22L are flowcharts showing the detailed encoding process (namely, details of the main process) of the control circuit 30 shown in FIG. 19;

DETAILED DESCRIPTION OF THE PREFERRED EMBODIMENTS

A facsimile apparatus adapted to communicate an image will now be described hereinbelow as an embodiment to which the present invention is applied.

The outline of the embodiment will be first described.

(i) Upon transmission of image data (on the transmission side), the encoded line number is added to each line and transmitted together with the image data. When the code corresponding to a certain line number appears, the data subsequent to this code can be retransmitted.

On the receiver side, the line number is checked when image data is being received, thereby discriminating whether a reception error has occurred or not. When the data was correctly received, the line number is removed and the image data is decoded. On the other hand, when the occurrence of the reception error was detected on the receiver side, the reception side apparatus transmits a control signal to interrupt the transmission of the image data from the apparatus on the transmission side. Thereafter, the reception side apparatus informs the retransmission request start line number to the transmission side apparatus. Thus, the transmission side apparatus restarts the transmission of the image data from the retransmission request start line number.

(ii) Upon transmission of the image data, the line number which is inserted for every line has the following characteristics.

(a) The line number is increased for every line.

(b) The line number is inserted after the signal indicative of the end of the code of one line, for example, after "EOL" (End of Line; which is used in the case where the Modified Huffman encoding or Modified READ encoding or the like was carried out on the basis of the CCITT Recommendation T4, or other case). Due to this, the reception side apparatus can discriminate the image data from the line number.

(c) A length of the line number is constant. Therefore, the line number indicative of a small number and the line number representative of a large number have the same code length. Due to this, the reception side apparatus can recognize that a predetermined byte in the signal indicative of the end of the code of one line is the line number. In this way, the reception side can easily discriminate the image data from the line number.

(d) The line number is constituted as the signal having a code arrangement which is different from the signal having a special meaning, e.g., the signal indicative of the end of one line. Therefore, when an error occurred on the reception side, the signal having the special meaning (indicative of the end of one line) is again searched, thereby making it possible to identify the line sychronization in response to the detection of this signal.

The facsimile apparatus according to the embodiment will then be described in detail in accordance with the following items.

Figure 8:
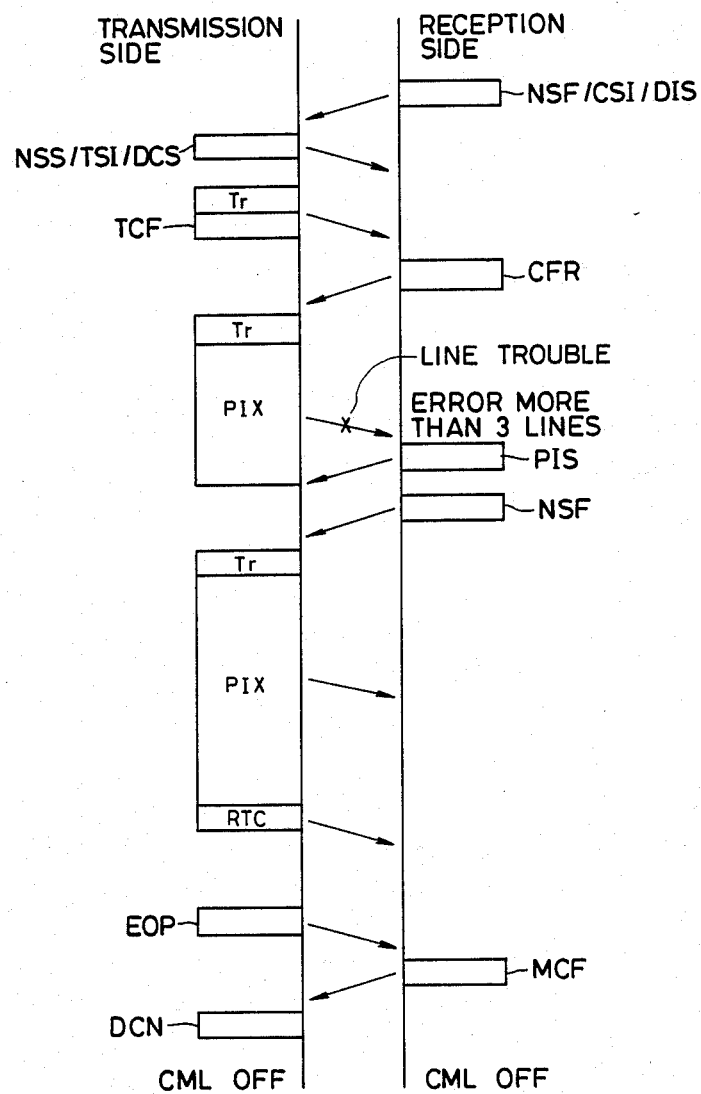
FIG. 8 is a diagrammatical view for explaining the control procedure according to an embodiment of the present invention.
Figure 11:
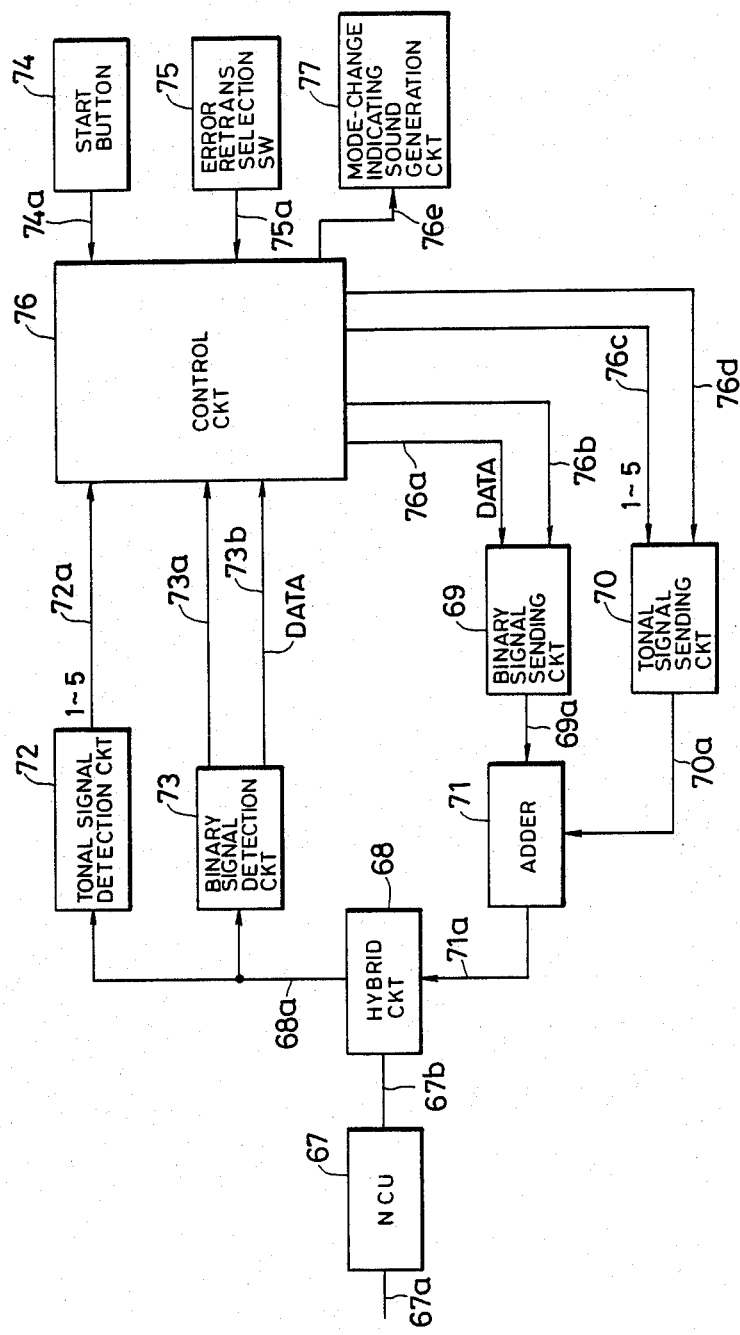
FIG. 11 is a block diagram showing an arrangement on the transmission side of a facsimile apparatus according to the embodiment of FIG. 8.
Figure 12:
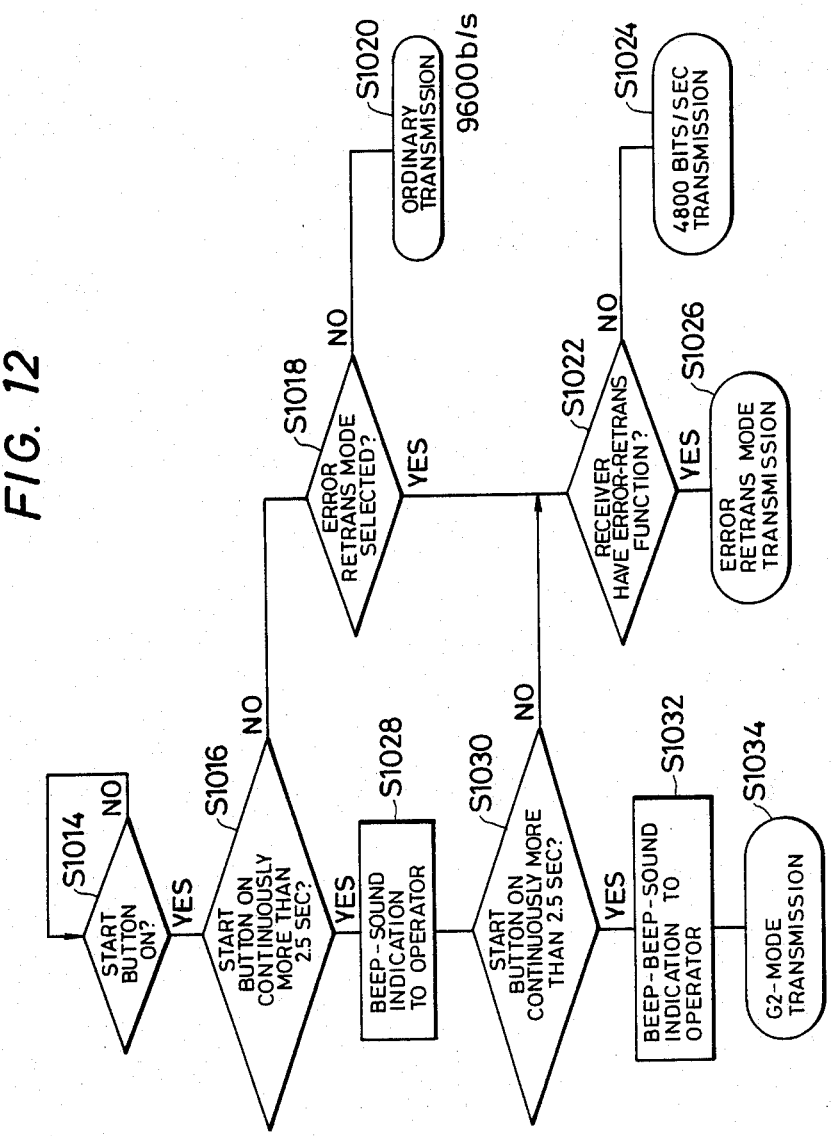
FIG. 12 is a flowchart showing the control procedure which is executed by a control circuit 76 shown in FIG. 11.
Figure 13A:
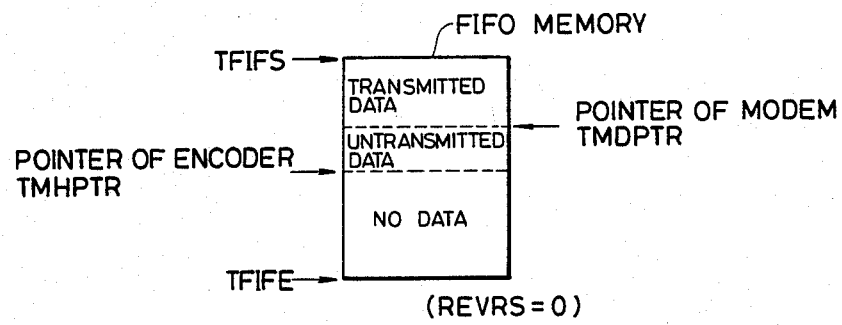
FIGS. 13A and 13B are diagrams for explaining the relations among an FIFO memory and various kinds of pointers.
Figure 13B:
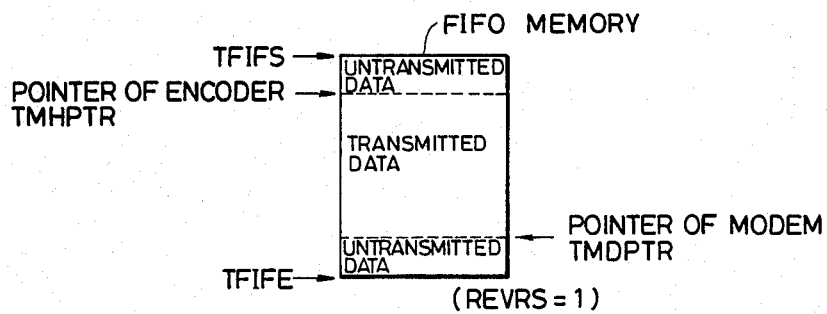
Figures 14, 17:
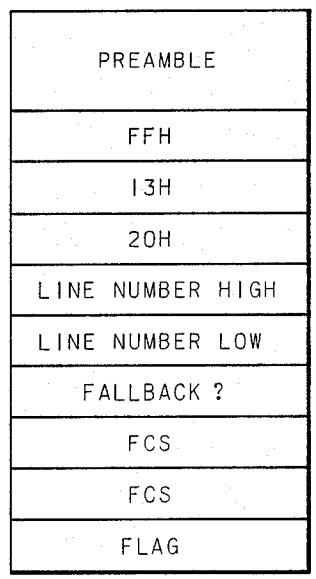
FIG. 14 is a diagram showing the number of bits and the number of bytes which are transmitted for three seconds at each transmission speed.
FIG. 17 is a diagram showing an example of a signal of 300 bits/sec to inform the retransmission start address and the data indicative of the presence or absence of the fallback from the reception side to the transmission side.
Figure 15A:
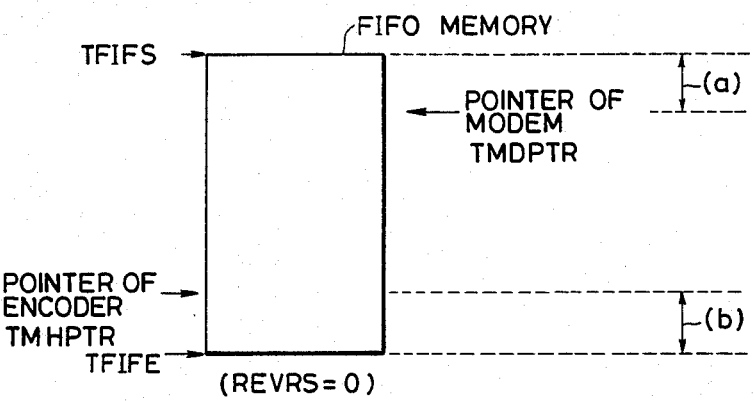
FIGS. 15A and 15B are diagrams showing the relations among an FIFO memory and various kinds of pointers.
Figure 15B:
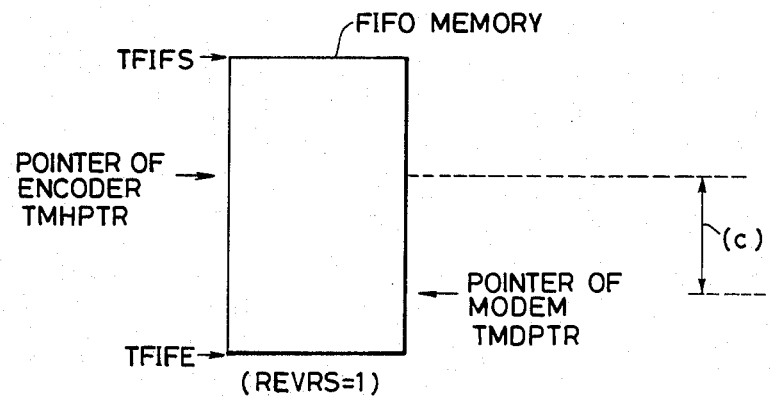
Figure 16B:
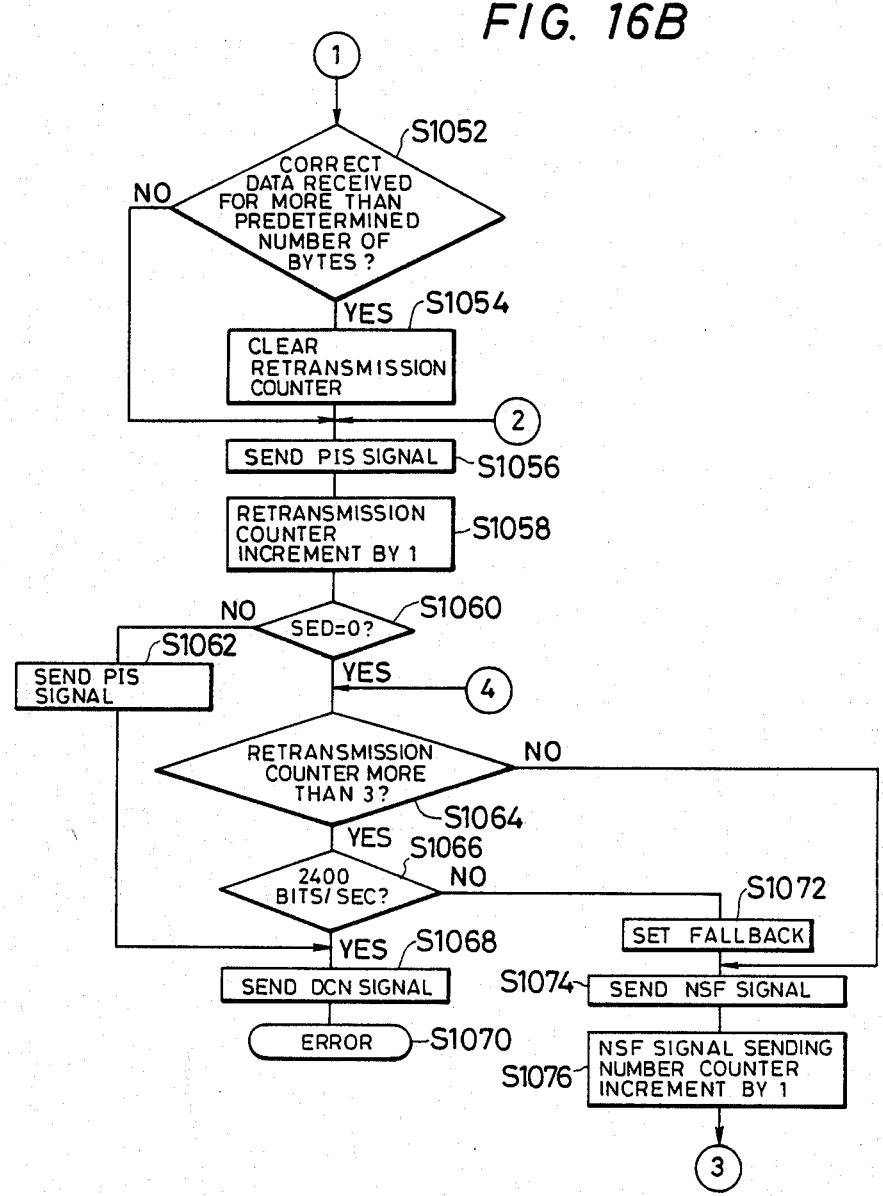
FIG. 16 is, consisting of FIGS. 16A and 16B, a flowchart showing an example of the control of the image reception when attention is paid to the case of executing the error retransmission accompanied with the fallback.
Figure 18A:
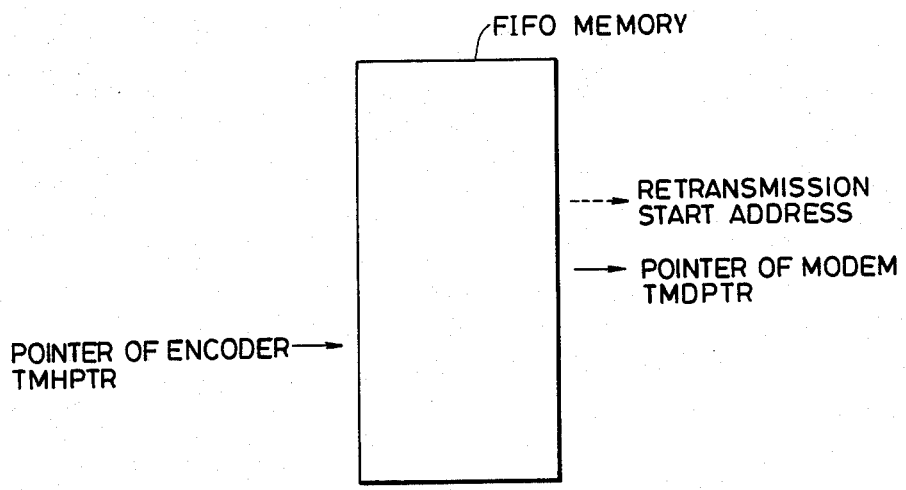
FIGS. 18A to 18C are diagrams for explaining methods of setting a retransmission start address.
Figure 18B:
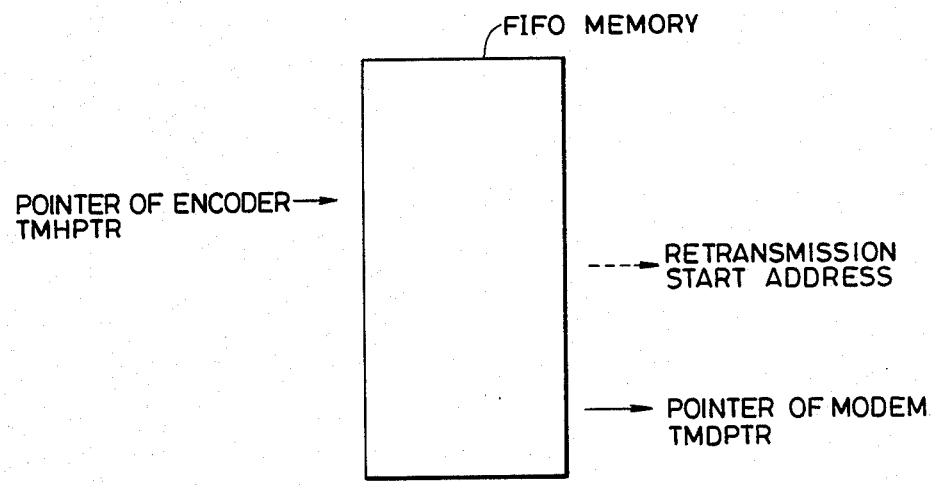
Figure 18C:
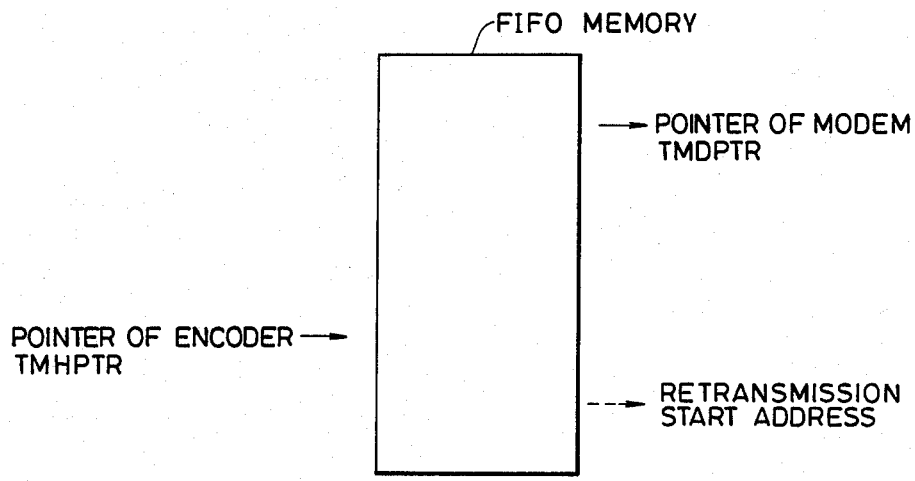
Figure 19:
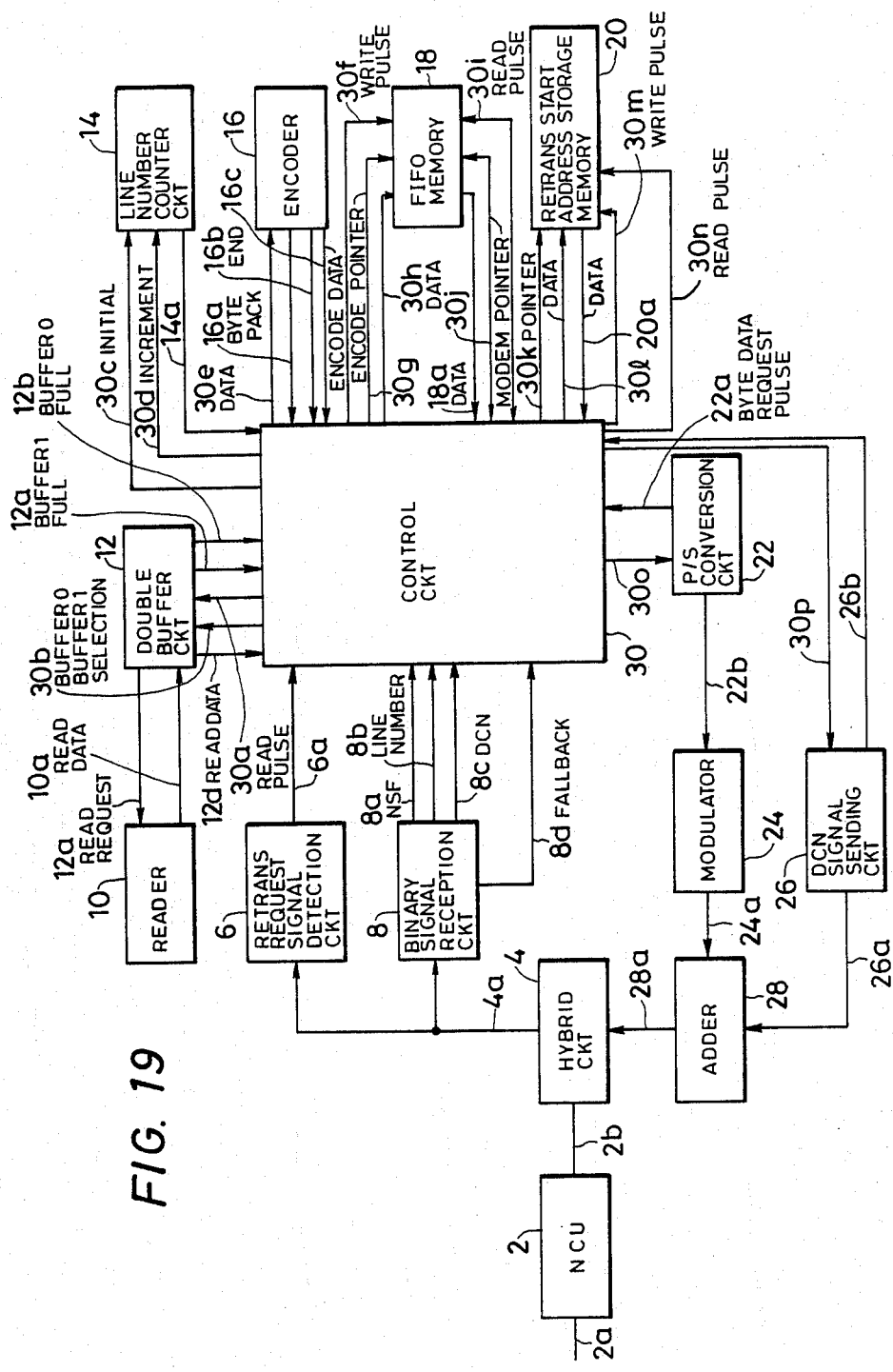
FIG. 19 is a block diagram showing an embodiment of the transmission side in a facsimile apparatus to which the invention is applied.
Figure 21:
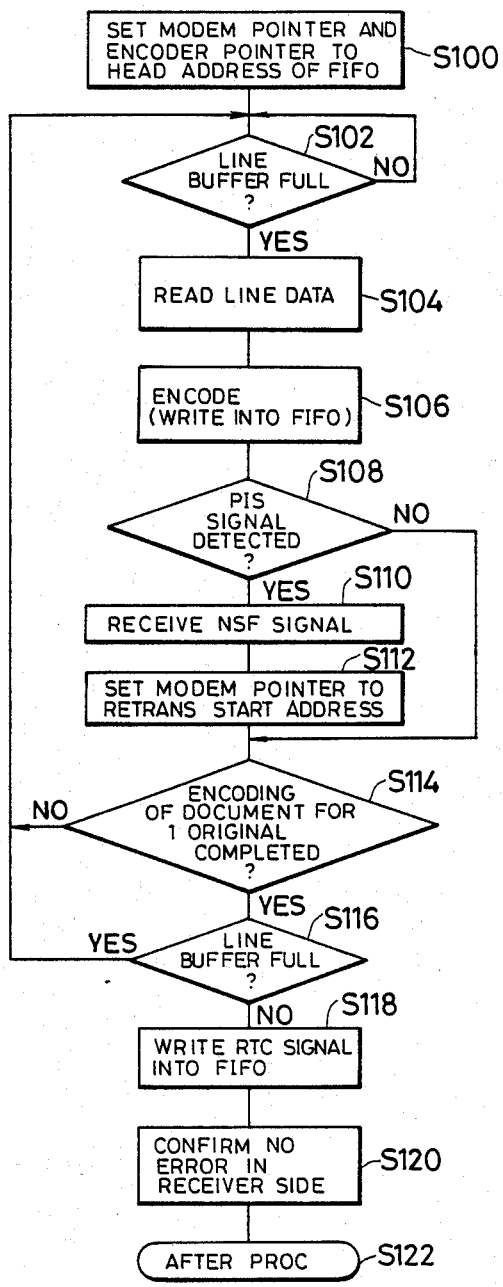
FIG. 21 is a flowchart showing the schematic encoding process (namely, outline of the main process) of a control circuit 30 shown in FIG. 19.
Figure 22A:
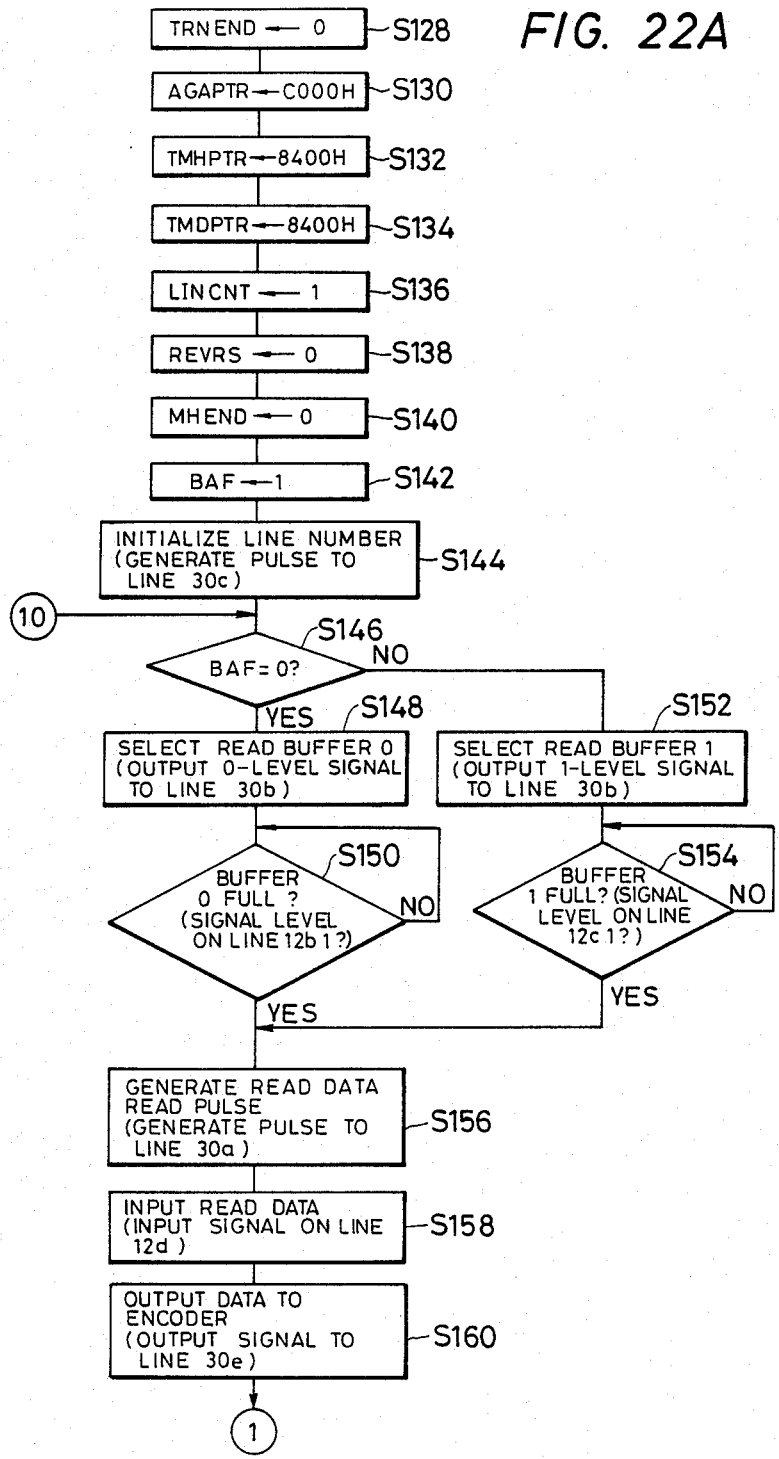
Figure 22D:
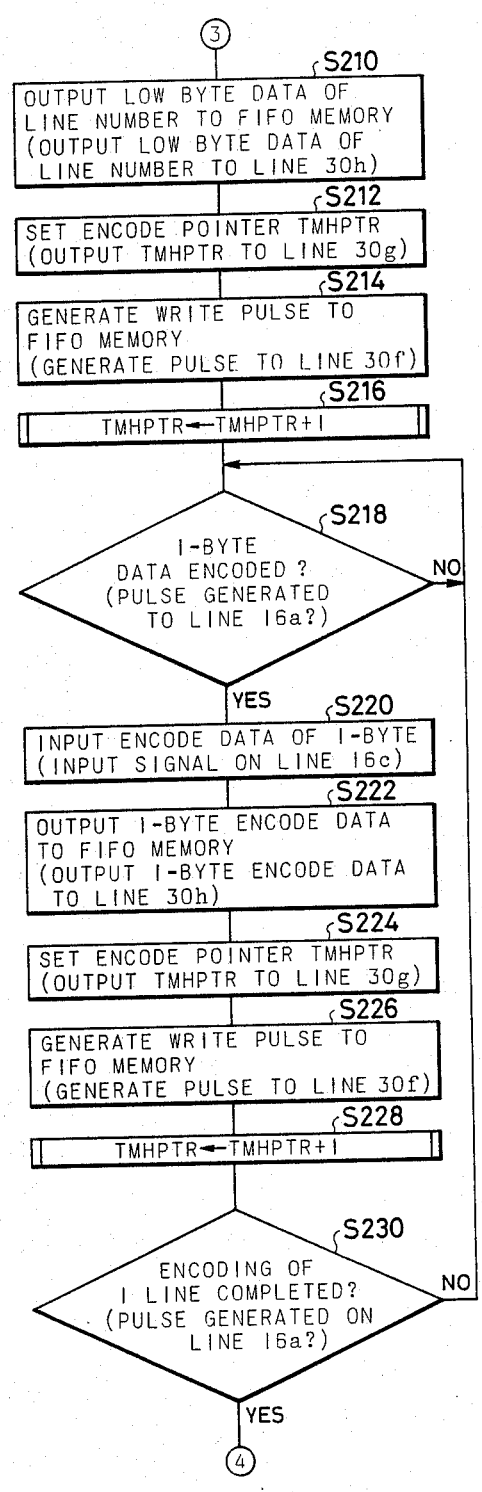
Figure 22E:
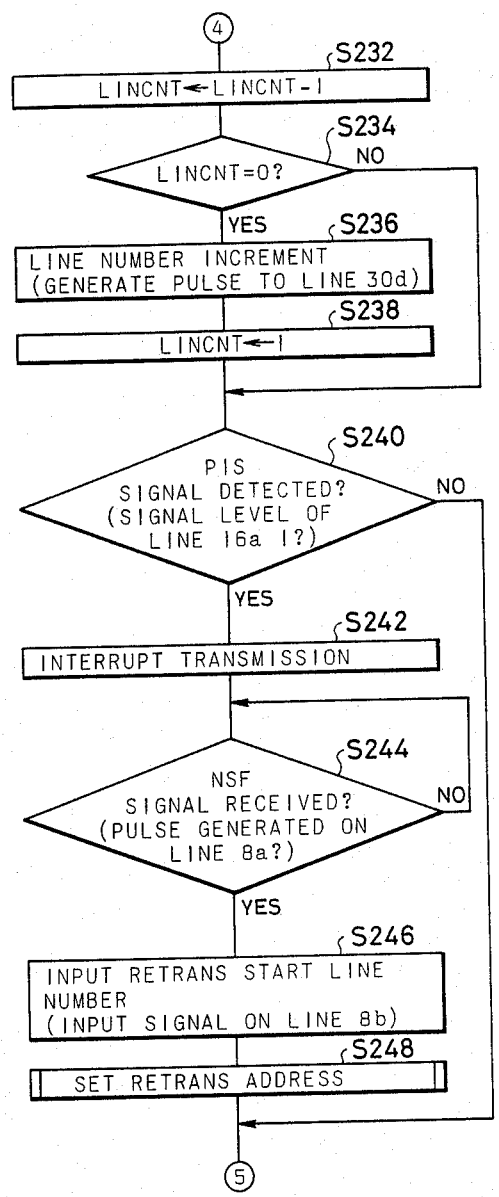
Figure 22F:
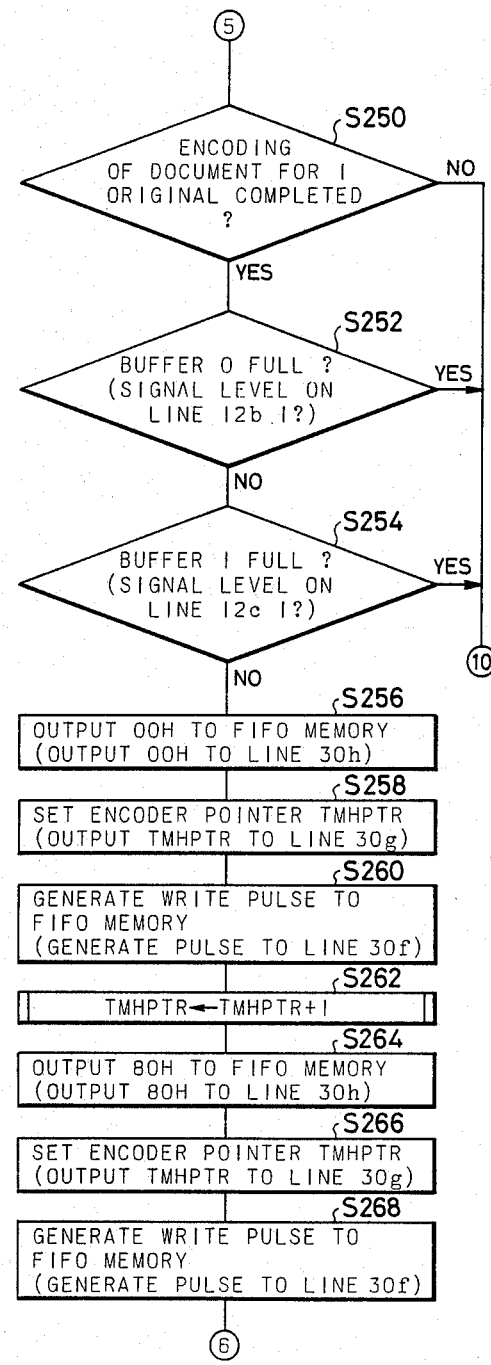
Figure 22G:
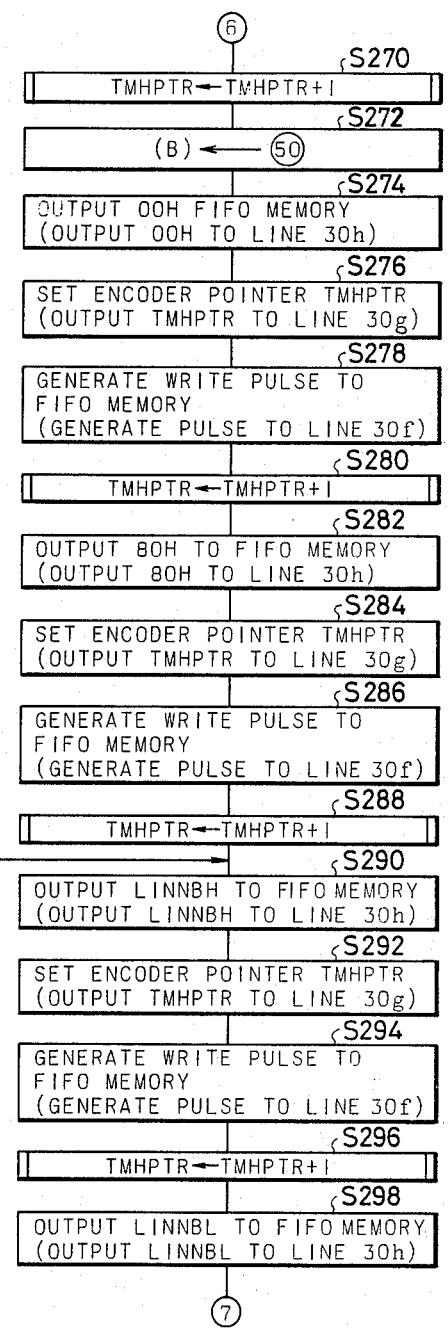
Figure 22H:
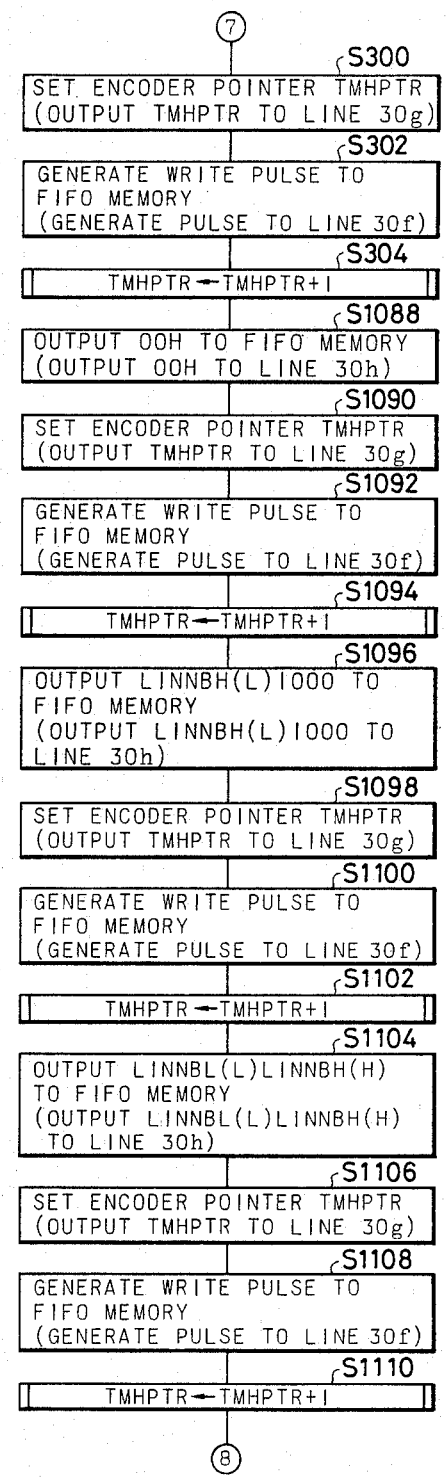
Figure 22I:
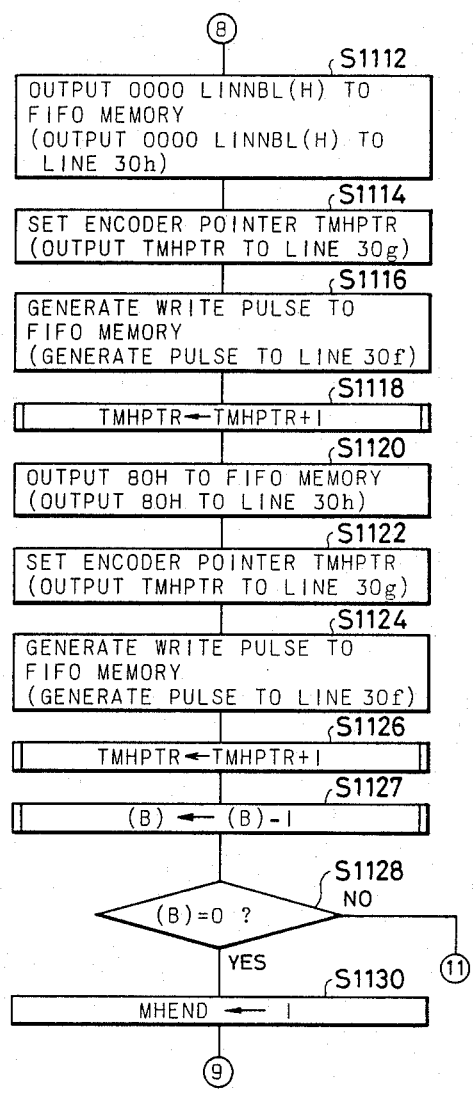
Figure 22J:
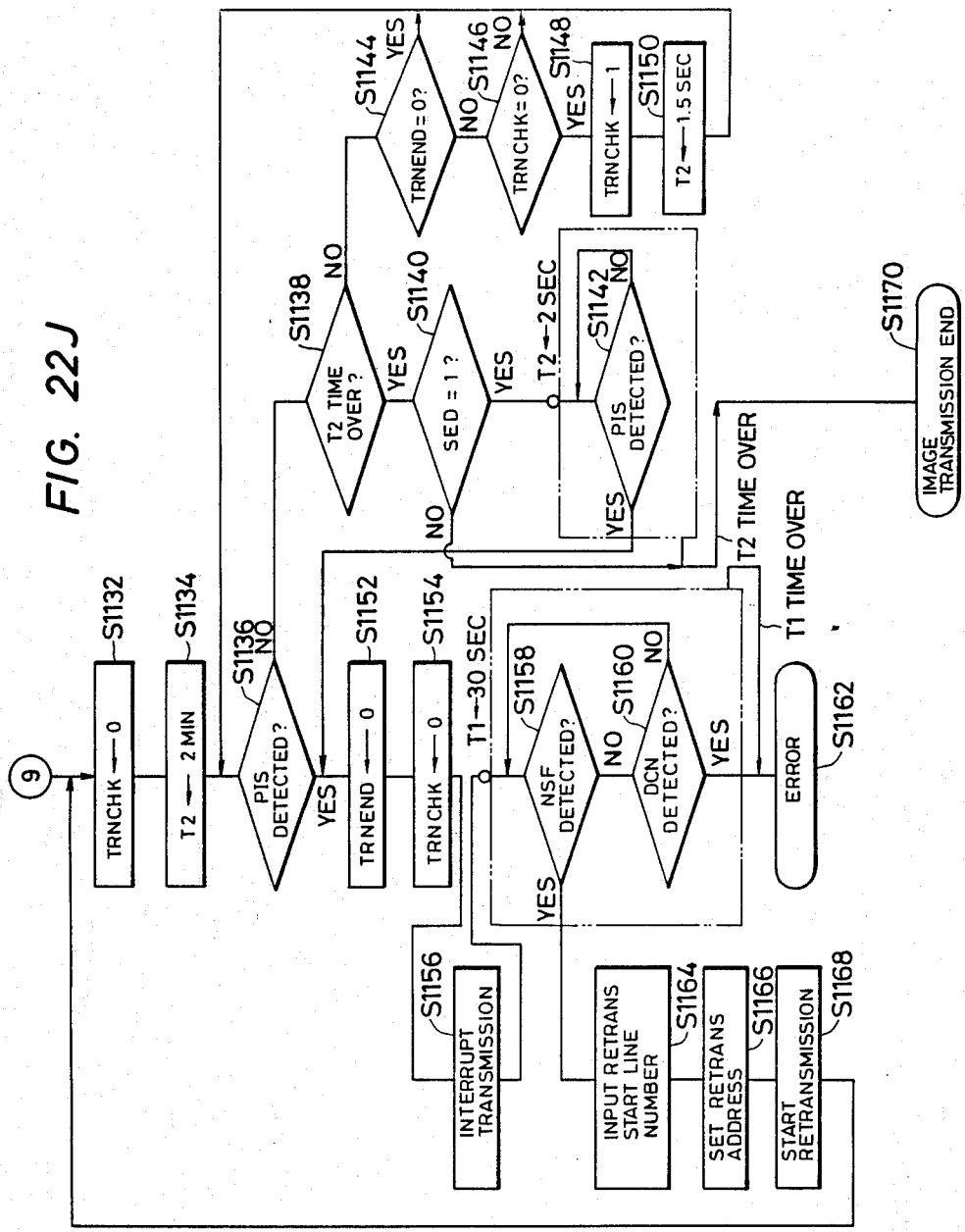
Figure 22K:
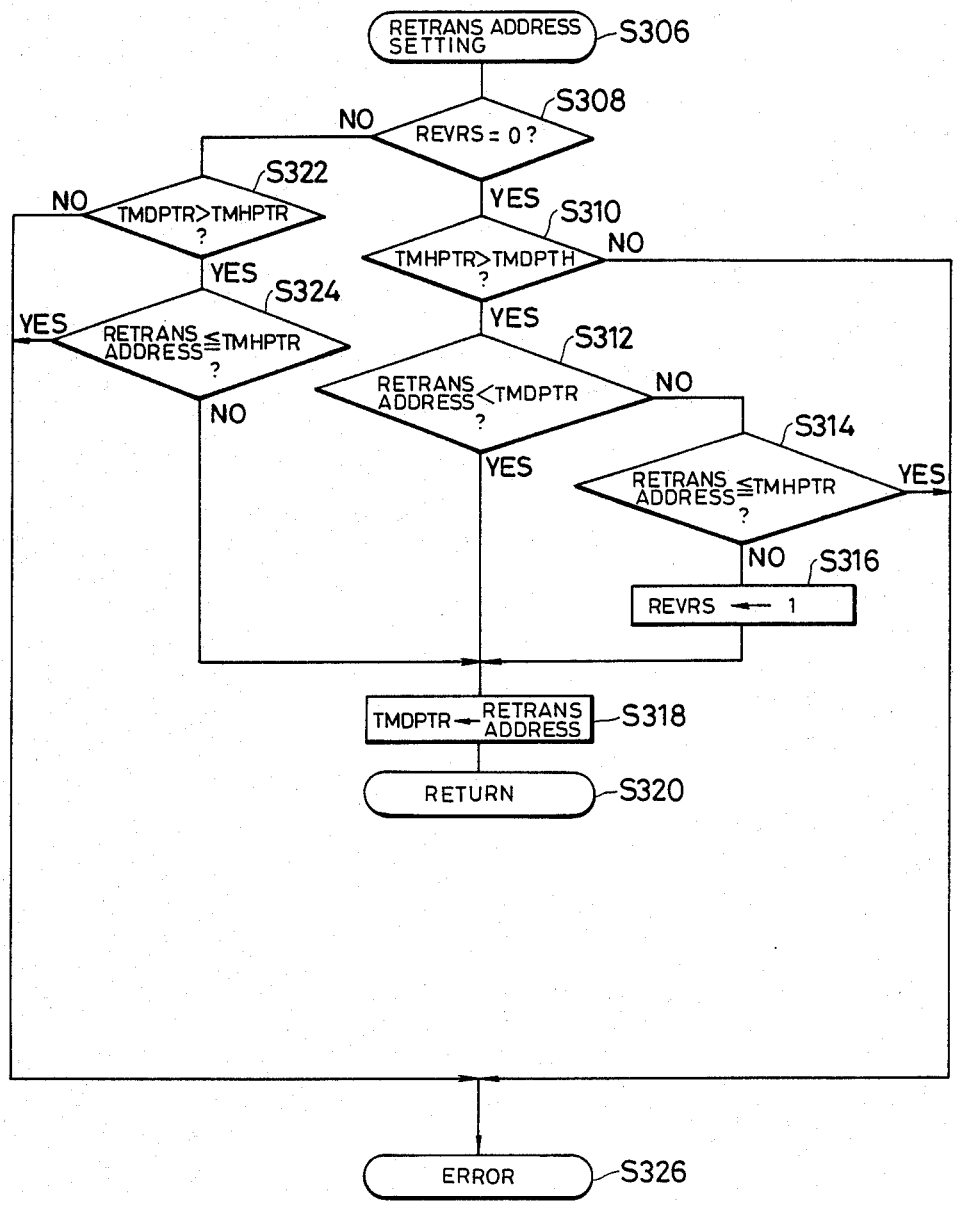
Figure 22L:
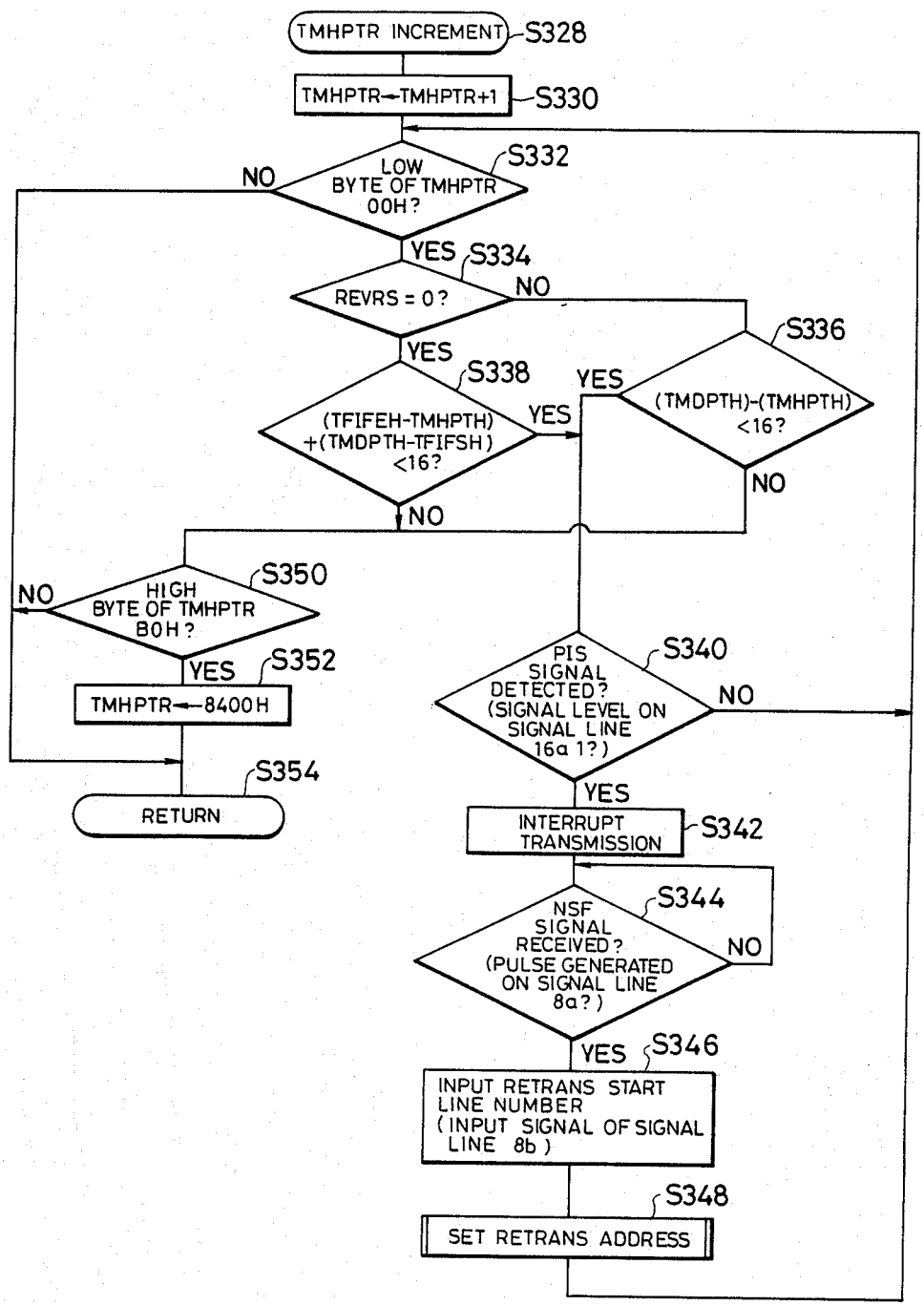
Figure 23:
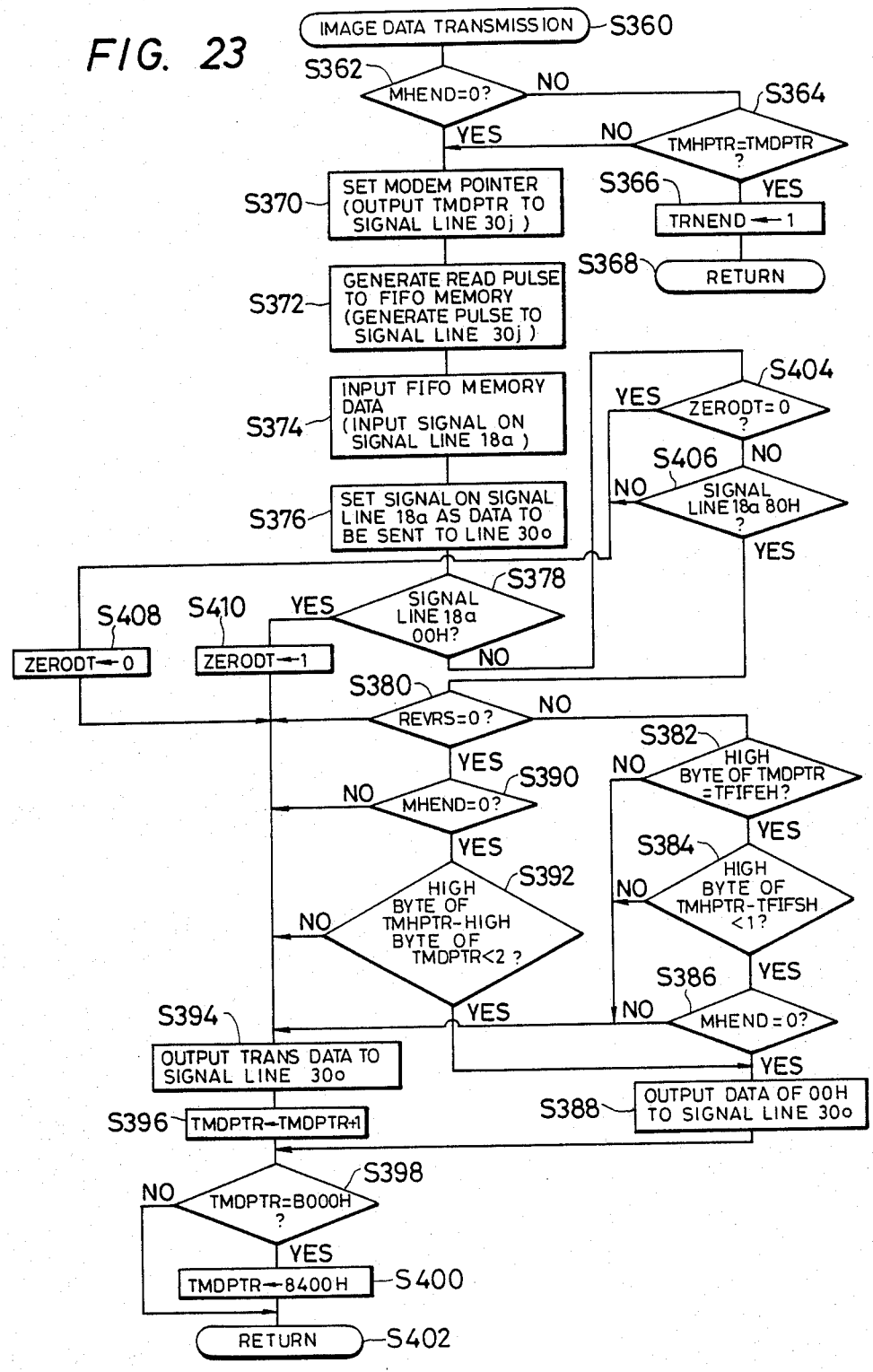
FIG. 23 is a flowchart showing the transmission procedure (i.e., interruption process) of encode data which is controlled by the control circuit 30 shown in FIG. 19.
Figure 24:
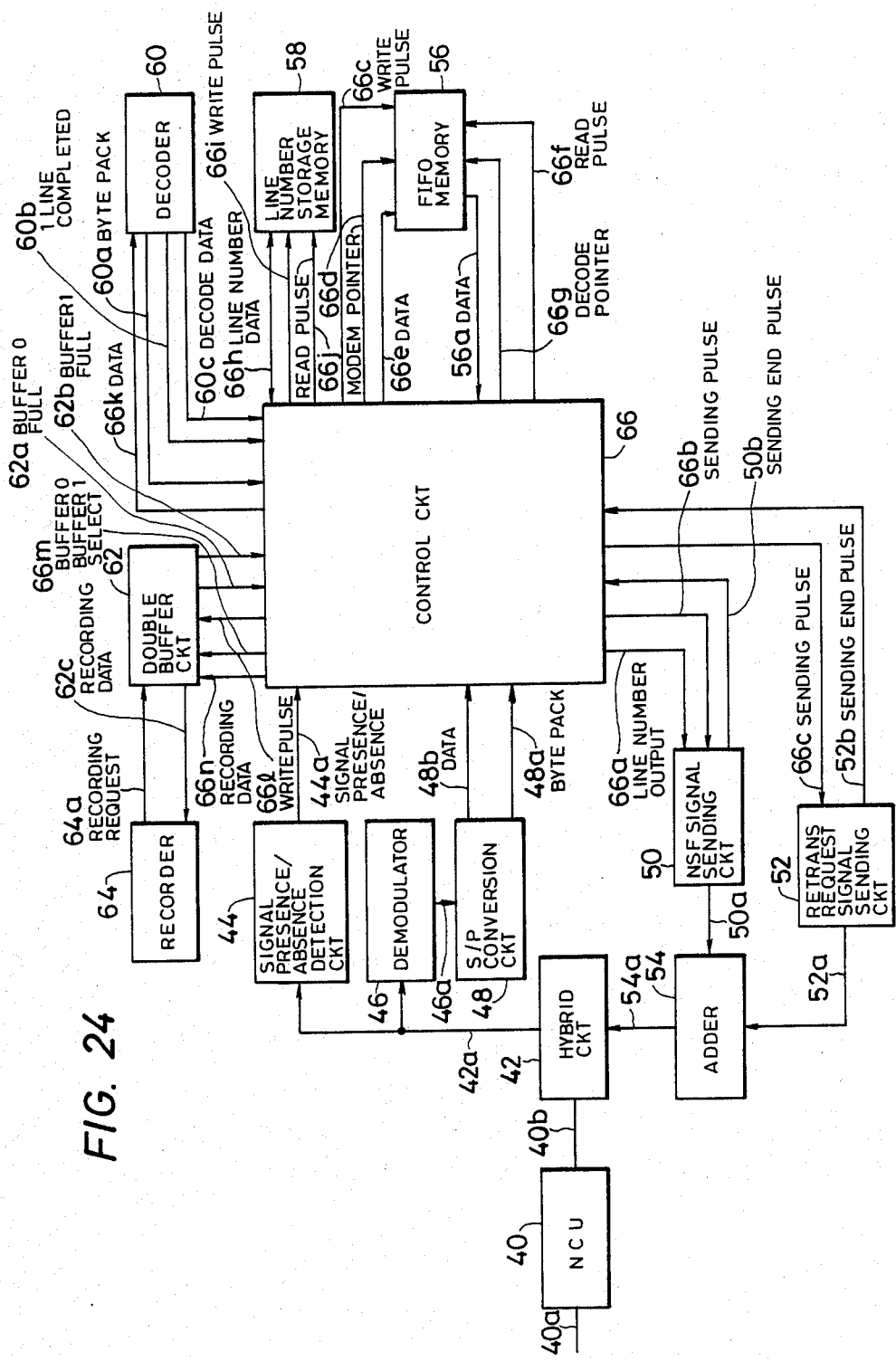
FIG. 24 is a block diagram showing an embodiment of the reception side in the facsimile apparatus to which the invention is applied.
Figure 25:
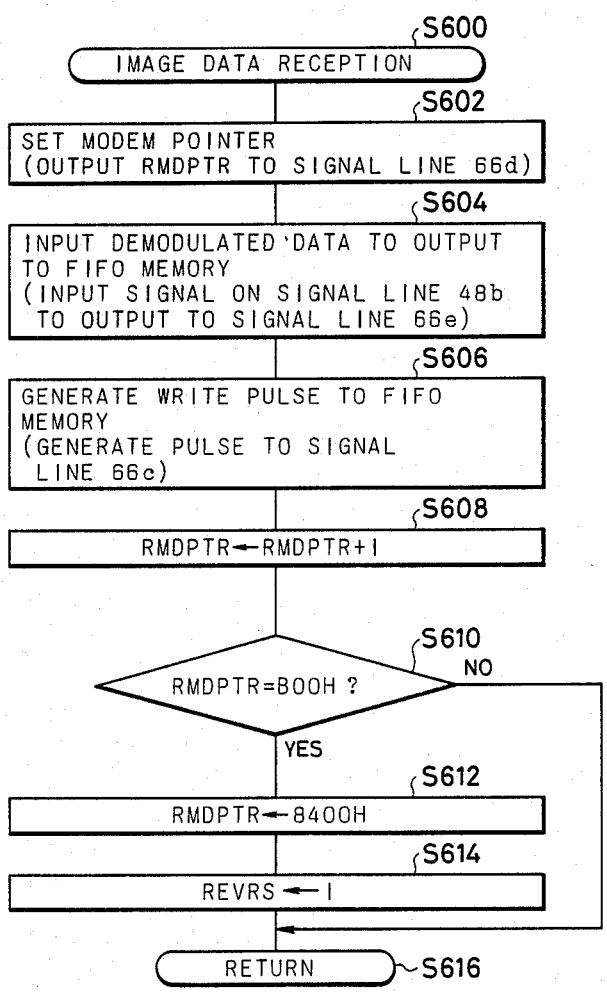
FIG. 25 is a flowchart showing the reception process (i.e., interruption process) of demodulated data which is controlled by a control circuit 66 shown in FIG. 24.

§1 An example of the error retransmission procedure (FIG. 8 is used)
§2 Description of the line number (FIG. 9 is used)
§3 A practical example in the case of storing the encode data into the FIFO memory (FIG. 10 is used)
§4 Description of the FIFO memory and the pointer to control the FIFO memory
§5 Constitution to select the error retransmission mode from the apparatus on the transmission side (FIGS. 11 and 12 are used)
§6 Management of the FIFO memory in the apparatus on the transmission side (FIGS. 13 to 15 are used)
§7 Propriety of the memory capacity to store the retransmission start address
§8 Control after all image data was transmitted from the apparatus on the transmission side
§9 Condition to request the retransmission from the apparatus on the reception side and the condition to request the fallback (FIG. 16 is used)
§10 Constitution of the NSF signal (FIG. 17 is used)
§11 Operation of the apparatus on the transmission side when the NACK signal was received (FIG. 18 is used)
§12 Description of a block diagram of the apparatus on the transmission side (FIGS. 19 and 20 are used)
§13 Schematic description of the operation of the control circuit in the apparatus on the transmission side (FIG. 21 is used)
§14 Detailed description of the operation of the control circuit in the apparatus on the transmission side (FIGS. 22 and 23 are used)
§15 Block constitution of the apparatus on the reception side (FIG. 24 is used)
§16 Description of the operation of the control circuit in the apparatus on the reception side (FIGS. 25 and 26 are used)
§17 Other embodiments

§1 AN EXAMPLE OF THE ERROR RETRANSMISSION PROCEDURE (FIG. 8)

With reference to FIG. 8, an explanation will be made with respect to the case where the mode was selected so as to transmit image data in the error retransmission mode (namely, in the case where a start button was continuously pressed for 2.5 seconds or more in the apparatus on the transmission side, or in the case where the error retransmission mode was selected by a switch or the like in the apparatus on the transmission side).

In FIG. 8, a consideration will be made with respect to the case where an impulse-like noise had once been generated while the image data is being transmitted, so that an error of three or more lines occurred in the apparatus on the reception side. When such an error occurred, the reception side apparatus sends an NACK signal (PIS signal: Procedure Interrupt Signal in this embodiment). When the transmission side apparatus detects this PIS signal, it interrupts the transmission of the image data.

The reception side apparatus uses the NSF signal of the $V_{21}$ modulation in order to transfer the data of the retransmission start line/fallback or the like to the transmission side apparatus subsequent to the PIS signal. In the embodiment, the last line number correctly received is communicated to the transmission side apparatus by way of the NSF signal.

On the basis of such a signal, the transmission side apparatus retransmits the image data from the next line of the line designated from the reception side. At this time, if the fallback is instructed, the transmission side apparatus executes the fallback. On the other hand, if the fallback cannot be performed in excess of the current time point (namely, in the case where the error retransmission was performed three times when the image data is at present being transmitted at the rate of 2400 bits/sec), the control procedure will be finished as an error and the line will be disconnected (DCN).

Figure 5:
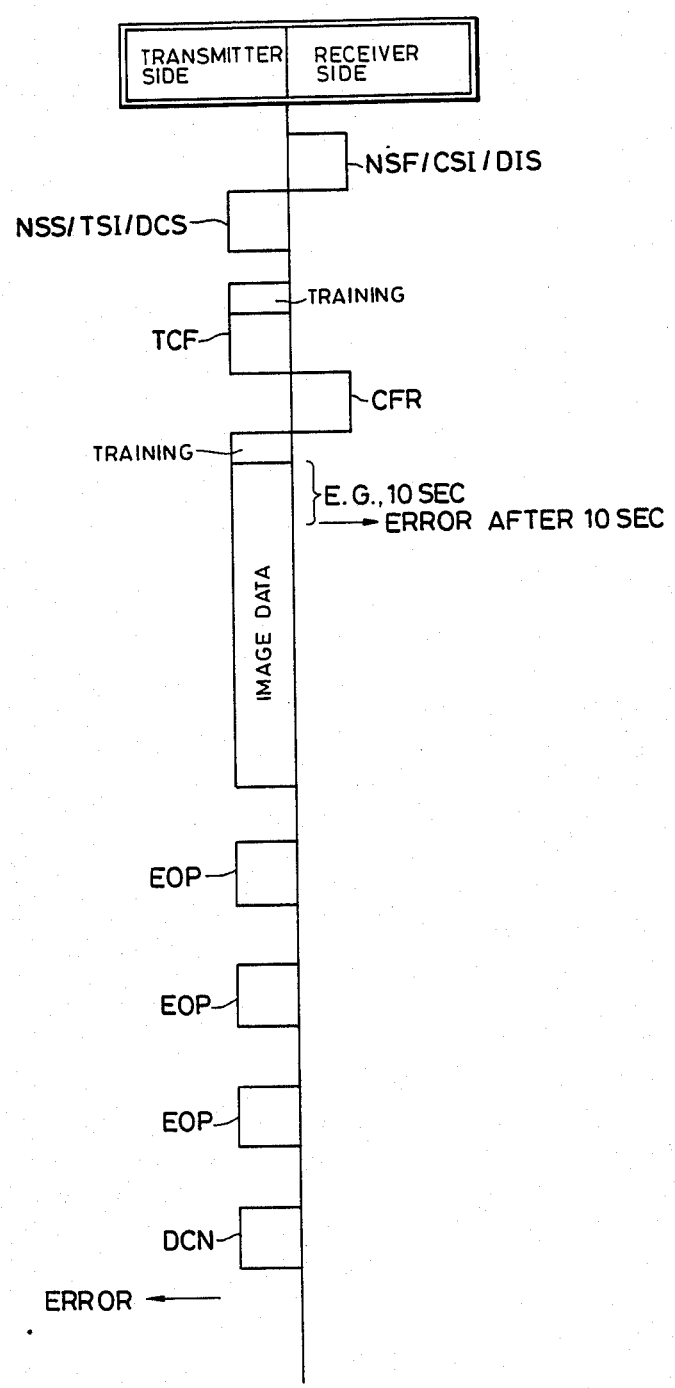
FIG. 5 is a diagrammatical view showing the state in the case where the apparatus on the reception side failed to receive a training signal in the conventional error retransmission system.
Figure 6:
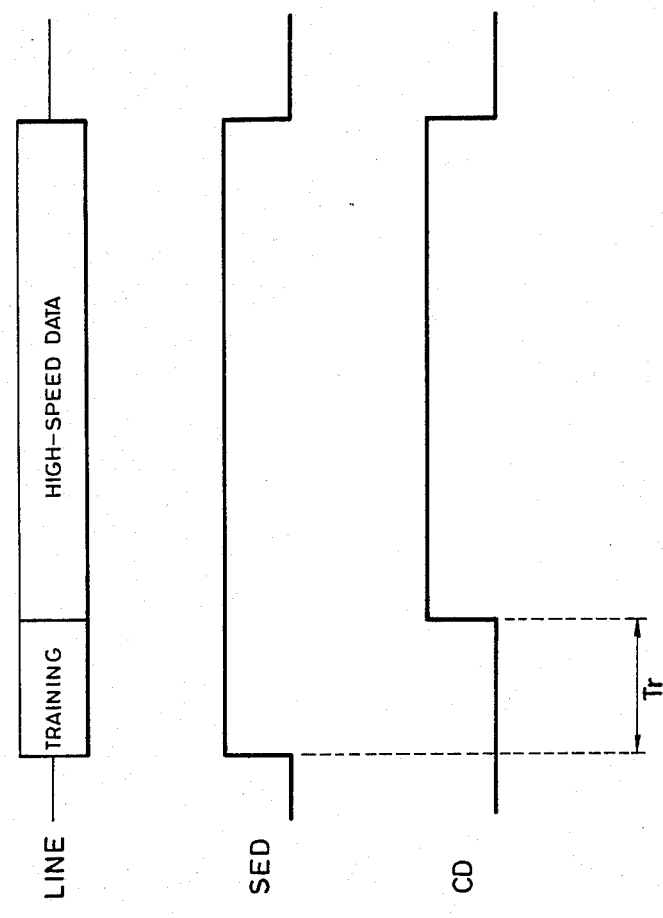
FIGS. 6A to 6C are waveform diagrams for explaining the reception of a training signal and an image signal.
Figure 7:
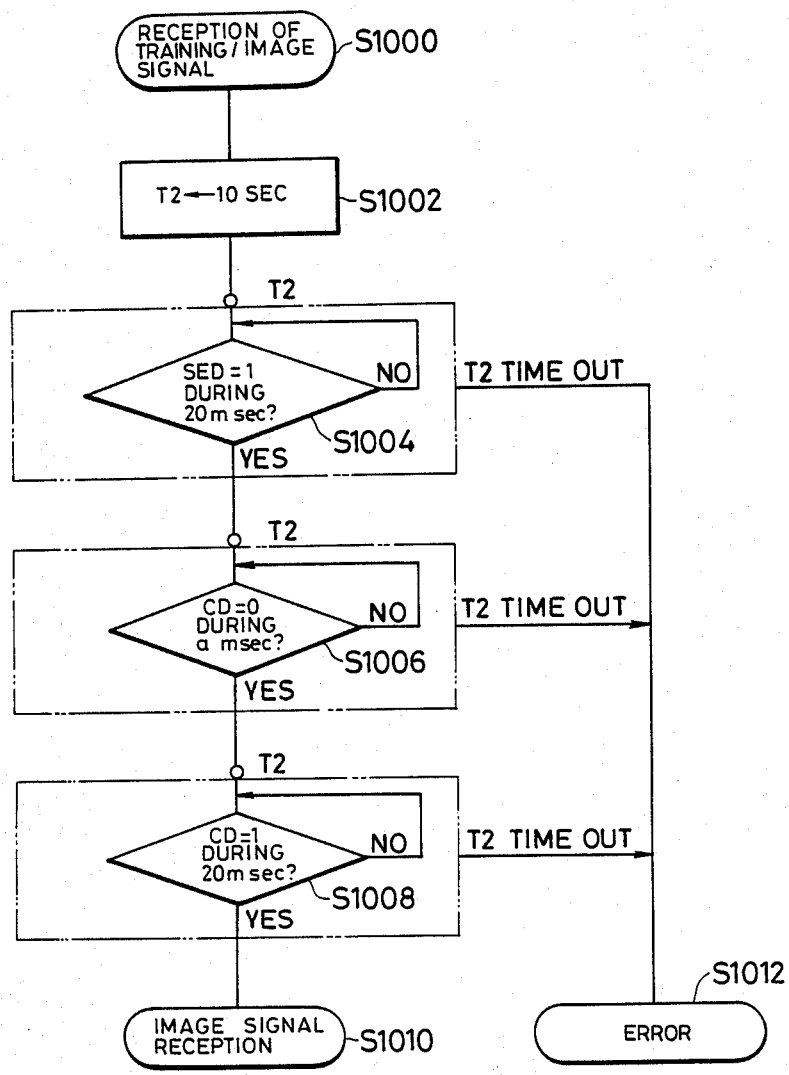
FIG. 7 is a flowchart showing the control procedure for the reception of a training/image signal which has conventionally been known.

The respective abbreviations such as NSF/CSI/DIS and the like shown in FIG. 8 have already been described in conjunction with FIG. 5.

§2 DESCRIPTION OF THE LINE NUMBER (FIG. 9)

FIG. 9 is a bit arrangement diagram showing a practical example of the line number. This line number is inserted after the EOL (End of Line) code.

In the embodiment, the system of which the Modified Huffman code was modified is used as the encoding system.

The line number consists of two bytes (sixteen bits) subsequent to the EOL code. The MSB (Most Significant Bit) of the high byte and the MSB of the low byte of the line number are respectively fixed to "1" so that the line number can be distinguished from the EOL signal. In the case where the number of bits of one line is not 1728 bits (upon reception of the image data of a document of the A4 size) when the image data was decoded by the reception side apparatus, the EOL is again searched to obtain the line synchronization. For this purpose, it is necessary to make the signal of the line number different from the EOL.

Now, assuming that the line number is expressed as a hexadecimal number, line number 0 is indicated by 80H (high byte of the line number) 80H (low byte of the line number); line number 1 is 80H (high byte of the line number) 81H (low byte of the line number); line number 2 is 80H (high byte of the line number) 82H (low byte of the line number); line number 3 is 80H (high byte of the line number) 83H (low byte of the line number); line number 10 is 80H (high byte of the line number) 8AH (low byte of the line number); and line number 100 is 80H (high byte of the line number) E4H (low byte of the line number). These line numbers are specified so as to be incrementally advanced for every three lines.

§3 A PRACTICAL EXAMPLE IN THE CASE OF STORING THE ENCODED DATA INTO THE FIFO MEMORY (FIG. 10)

FIG. 10 shows an example of the state in which the encoded data and the retransmission start address corresponding to each line number were stored into the memory. In this diagram, TFIFS denotes a head address (8400H in this embodiment) of the memory to store the encoded data. For example, a memory area from 8400H to AFFFH will be considered as a memory area to store the encode data in the transmission side apparatus. In addition, a memory area from, e.g., C000H to C3FFH will be considered as a memory area to store the retransmission start address.

It is now assumed as the condition in the transmission side apparatus that the minimum transmission time when one line is all white is 10 msec and the minimum transmission time when black exists in one line is 20 msec and the transmission speed is 4800 bits/sec. Then, a procedure to transmit the document (all white) of the A4 size will be described with reference to FIG. 10. At this time, the minimum number of bytes of one line is 6. It is also assumed that the byte data stored in the memory is transmitted from the LSB. For example, when the data in address 8401H is transmitted, data of 0 is first transmitted, in an amount of as many as seven bits, and thereafter data of 1 is transmitted.

In FIG. 10, the EOL is formed by the data stored in addresses 8400H and 8401H (data of 1 is transmitted after fifteen continuous data of 0 were transmitted). The high byte data of the line number is stored in address 8402H and the low byte data of the line number is stored in address 8403H. The data stored in addresses 8402H and 8403H is 8080H and indicates line number 0.

When 1728 bits are all white, the data encoded by the Modified Huffman encoding system is stored in addresses 8404H to 8406H. Namely, when 1728 bits are all white, the Modified Huffman encoded data is 01 0011 011 0011 01 01 (in the case where the data is sequentially transmitted to the line from the left-hand data). In this case, 010011011 is the makeup code in the case where 1728 bits are the white run length and 00110101 is the terminating code in the case where 0 bit is the white run length. When the Modified Huffman encoded data in the case where 1728 bits are all white is stored into the memory, it becomes B2H, 59H, 01H.

When the data is transmitted to the line, it is transmitted in accordance with the sequence as follow: from the data of the LSB of B2H to the data of the MSB; from the data of the LSB of 59H to the data of the MSB; and from the data of the LSB of 01H to the data of the MSB. Namely, the data is transmitted to the communication line in accordance with the sequence of 01001101 (data of B2H) 10011010 (data of 59H) 1000 0000 (data of 01H) (in the case where the data is sequentially transmitted to the line from the left data). In a manner similar to the above, the encoded data is stored into the memory of the transmission side apparatus.

On the other hand, the retransmission start address is stored in the memory in correspondence to each line number. The retransmission start address is stored into the memory area of addresses C000H to C3FFH. The head address of the memory area in which the retransmission start address is stored is called LIN0. Memory area of as much as two bytes is needed to designate one retransmission start address. Since the memory area of addresses C000H to C3FFH consists of 1024 bytes, 512 retransmission start addresses can be stored. As mentioned above, since the line number is incrementally advanced for every line, when the line number changes (namely, when it is increased by 1), the head address of the line number in the memory in which the encoded data has already been stored is loaded into the memory to store the retransmission start address. A practical example is as shown in FIG. 10.

00H and 84H are stored in addresses C000H and C001H. The data stored in address C000H is the low data in the retransmission start address of line number 0. The data stored in address C001H is the high data in the retransmission start address of line number 0. The head address stored (into the memory in which the encoded data has been stored) of line number 0 is 8400H.

On one hand, 07H and 84H are stored in addresses C002H and C003H. The data stored in address C002H is the low data in the retransmission start address of line number 1. The data stored in address C003H is the high data in the retransmission start address of line number 1. The head address stored (into the memory in which the encoded data has been stored) of line number 1 is 8407H. In a manner similar to the above, the head addresses stored (into the memories in which the encoded data has been stored) of line numbers 2, 3, and 4 are 840EH, 8415H, and 841CH.

Further, as mentioned above, since the memory area to store the retransmission start address is composed of 1024 bytes, 512 retransmission start line numbers can be stored. The 513rd line number is stored into the LIN0 (address C000H). In this manner, the past 512 line numbers are stored.

§4 DESCRIPTION OF THE FIFO MEMORY AND THE POINTER TO CONTROL THE FIFO MEMORY

In the apparatus on the transmission side, the data encoded by the embodiment is stored into the FIFO (First-In First-Out) memory. As mentioned above, the FIFO memory has a memory capacity of 8400H to AFFFH. The head address of the FIFO memory of the transmission side apparatus is called TFIFS (TRN FIFO START; 8400H in the embodiment). The high byte of the head address of the FIFO memory of the transmission side apparatus is called TFIFSH (TRN FIFO START HIGH; 84H in the embodiment). The end address of the FIFO memory of the transmission side apparatus is called TFIFE (TRN FIFO END; AFFFH in the embodiment). The high byte in the end address of the FIFO memory of the transmission side apparatus is called TFIFEH (TRN FIFO END HIGH; AFH in the embodiment).

In the transmission side apparatus, the data read by reading means is encoded and thereafter it is stored into the FIFO memory of the transmission side apparatus. A pointer is used to control the FIFO memory and this pointer is called TMHPTR (TRN MH POINTER). The data stored into the FIFO momory on the transmitter side is modulated by a modulator and thereafter it is sequentially transmitted to the line. However, a pointer to control the FIFO memory is also needed and this pointer is called TMDPTR (TRN MODEM POINTER).

On the other hand, in the apparatus on the reception side, the data transmitted from the transmission side apparatus is stored into the memory. This memory is also the FIFO (First-In First-Out) memory similarly to that of the transmission side apparatus. The FIFO memory of the reception side apparatus also has a memory capacity of 8400H to AFFFH similarly to that of the transmission side apparatus.

The head address of the FIFO memory in the reception side apparatus is called RFIFS (REC FIFO START; 8400H in the embodiment). The high byte of the head address of the FIFO memory in the reception side apparatus is called RFIFSH (REC FIFO START HIGH; 84H in the embodiment). The end address of the FIFO memory in the reception side apparatus is called RFIFE (REC FIFO END; AFFFH in the embodiment). The high byte of the end address of the FIFO memory in the reception side apparatus is called RFIFEH (REC FIFO END HIGH; AFH in the embodiment).

In the reception side apparatus, the data transmitted from the transmission side apparatus is demodulated by a demodulator and thereafter it is stored into the FIFO memory. A pointer is used to store the demodulated data into the FIFO memory and this pointer is called RMDPTR (REC MODEM POINTER). In addition, the data stored in the FIFO memory is sequentially read out and decoded and recorded. A pointer is also used to sequentially read out and decode the data stored in the FIFO memory and this pointer is called RMHPTR (REC MH POINTER).

§5 CONSTITUTION TO SELECT THE ERROR RETRANSMISSION MODE FROM THE APPARATUS ON THE TRANSMISSION SIDE (FIGS. 11 and 12)

Two methods are used to select the error retransmission mode from the apparatus on the transmission side. In the first method, the error retransmission mode is selected using a switch or the like. Namely, it is assumed that the error retransmission mode is selected when a certain particular switch is ON.

In the second method of selecting the error retransmission mode, a start button of the transmission side apparatus is continuously pressed. Namely, the error retransmission mode is selected by continuously pressing the start button for 2.5 seconds or more and the operator can know that the error retransmission mode has been selected due to the generation of a "beep" sound.

On the other hand, when the start button of the transmission side apparatus is continuously pressed for five seconds or more, the G2 mode is selected and the operator can know that the G2 mode was selected due to the generation of a "beep-beep" sound.

In the embodiment, the image data is transmitted at the transmission speed of 4800 bits/sec in the error retransmission mode. Therefore, in the case where the reception side apparatus is provided with the function of the error retransmission mode when the error retransmission mode was selected by the transmission side apparatus, the image data is transmitted in the error retransmission mode. On the contrary, in this case, if the reception side apparatus is not provided with the function of the error retransmission mode as well, the transmission speed is reduced from 9600 bits/sec to 4800 bits/sec and the transmission of the image data is started.

FIG. 11 is a block diagram showing an arrangement of the transmission side of the facsimile apparatus according to the embodiment. In this diagram, reference numeral 67 denotes a network control unit (NCU). In order to use the telephone network for the data communication or the like, the NCU 67 is connected to a terminal of the telephone line, thereby controlling the connection of the telephone exchange network or switching to the data communication path or holding the loop. Numeral 67a is a telephone line.

A hybrid circuit 68 serves to separate the signal of the transmission system from the signal of the reception system. A transmission signal on a signal line 71a is transmitted to the telephone line 67a through a signal line 67b and the NCU 67. On one hand, the signal transmitted from the facsimile apparatus on the distant side is transmitted to a signal line 68a through the NCU 67.

A binary signal sending circuit 69 receives the data on a signal line 76a when a pulse has been generated on a signal line 76b and outputs the data which was V21-modulated to a signal line 69a.

A tonal signal sending circuit 70 receives a signal on a signal line 76c when a data on a signal line 76d is at a "1" signal level. The tonal signal sending circuit 70 outputs to a signal line 70a a tonal signal of 462 Hz when the input data is "1"; a tonal signal of 1080 Hz when the input data is "2"; a tonal signal of 1650 Hz when the input data is "3"; a tonal signal of 1850 Hz when the input data is "4"; and a tonal signal of 2100 Hz when the input data is "5", respectively.

An adder 71 receives the signals on the signal lines 69a and 70a and outputs the result of the addition to the signal line 71a.

A tonal signal detection circuit 72 receives the signal on the signal line 68a and outputs to a signal line 72a a signal of "1" when the signal of 462 Hz is detected; a signal of "2" when the signal of 1080 Hz is detected; a signal of "3" when the signal of 1650 Hz is detected; a signal of "4" when the signal of 1850 Hz is detected; and a signal of "5" when the signal of 2100 Hz is detected, respectively.

When a binary signal is detected by a binary signal detection circuit 73, the detection circuit 73 generates a pulse to a signal line 73a and outputs the demodulated binary data to a signal line 73b.

When a start button 74 is pressed, a signal of a "1" level on a signal line 74a is outputted.

When the transmission in the error retransmission mode is selected, a singal of a "1" level is outputted to a signal line 75a from an error retransmission mode selection switch 75.

Numeral 76 denotes a control circuit.

A mode-change indicating sound generation circuit 77 generates a "beep" sound when a pulse is generated to a signal line 76e.

FIG. 12 is a flowchart showing the control procedure of the control circuit 76 shown in FIG. 11.

In step S1014, a check is made to see if the start button 74 has been pressed or not. This discrimination is made by checking whether a "1" signal has been inputted through the signal line 74a or not. When the start button 74 is pressed, step S1016 then follows.

In step S1016, a check is made to see if the start button 74 has been continuously pressed for 2.5 seconds or more or not. This discrimination is made by checking the signal which is inputted through the signal line 74a. When the start button 74 is continuously pressed for 2.5 seconds or more, step S1028 then follows. On the contrary, when the start button 74 is not continuously pressed for 2.5 seconds or more, step S1018 then follows.

In step S1018, a check is made to see if the error retransmission mode has been selected or not. This discrimination is made by checking the signal which is inputted through the signal line 75a. When the error retransmission mode is selected, step S1022 then follows. On the contrary, when the error retransmission mode is not selected, step S1020 then follows.

Step S1020 shows the ordinary transmission of image data at the transmission speed of 9600 bits/sec.

In step S1022, a check is made to see if the facsimile apparatus on the distant side (reception side apparatus) has the error retransmission function or not. The data indicating whether the reception side apparatus has the error retransmission function or not is supplied to the trnasmision side by the FIF of the NSF signal. Namely, by inputting the signals on the signal lines 73a and 73b, it is discriminated whether the reception side apparatus has the error retransmission function or not. When the reception side apparatus has the error retransmission function, step S1026 then follows. On the contrary, when the reception side apparatus, does not have the error retransmission function, step S1024 then follows.

In step S1024, the image data is transmitted at the transmission speed of 4800 bits/sec.

In step S1026, the image data is transmitted in the error retransmission mode.

In step S1028, a "beep" sound is generated (a pulse is sent to the signal line 76e), thereby informing the operator that the error retransmission mode has been selected.

In step S1030, a check is made to see if the start button 74 has been subsequently continuously pressed for 2.5 seconds or more or not. This discrimination is made by checking the signal which is inputted through the signal line 74a. When the start button is subsequently continuously pressed for 2.5 seconds or more, step S1032 then follows. On the contrary, if it is NO in step S1030, step S1022 then follows.

In step S1032, a "beep-beep" sound is generated (a pulse is sent to the signal line 76e twice), thereby informing the operator that the G2 mode has been selected.

In step S1034, the transmission is executed in the G2 mode.

§6 MANAGEMENT OF THE FIFO MEMORY IN THE APPARATUS ON THE TRANSMISSION SIDE (FIGS. 13 to 15)

The management of the FIFO memory included in the transmission side apparatus will then be described hereinbelow.

FIGS. 13A and 13B are diagrams for explaining the relations among the FIFO memory and various kinds of pointers. The pointer TMHPTR indicates until which address the encoded data has been stored in the FIFO memory space. On one hand, the pointer TMDPTR shows until which address the data has been modulated and transmitted to the line in the FIFO memory space. After the encoded data was stored from the address TFIFS to the address TFIFE, the encoder stores the next encoded data into the address TFIFS. At this time, "1" is set into a flag of REVRS (reverse), thereby communicating to the modem side that the encoded data has been stored until the end address of the FIFO memory and the pointer TMHPTR has been returned to the head of the FIFO memory.

On the other hand, as the process on the modem side, the encoded data from the address TFIFS is sequentially read out and modulated and thereafter it is transmitted to the line. The data stored in the address TFIFE is read out and modulated and sent to the line. Thereafter, the data stored in the address TFIFS is read out and modulated and transmitted to the line. At this time, "0" is set into the flag of REVRS (reverse), thereby informing to the side which is executing the encoding that the data in the last address of the FIFO memory has been modulated and completely transmitted to the line and the pointer TMDPTR has been returned to the head.

The main functions of the management of the FIFO memory in the transmission side apparatus are as follows.

① When the line number is changed, the address in which the encode data corresponding to the line number has been stored is stored into the memory to store the retransmission start line number.

② Prevents that the modem pointer, namely, TMDPTR passes ahead the encoder pointer TMHPTR.

③ Prevents that the encoder pointer TMHPTR goes round the FIFO memory and fairly approaches the modem pointer TMDPTR. (This is because although the retransmission is performed when a reception error occurred on the reception side, it is intended to leave the data to execute this retransmission in the FIFO memory.)

Since the case of the above item ① has already been described using FIG. 10, its description is omitted here.

The case of the item ② will then be described. In order to prevent that the pointer TMDPTR of the modem passes ahead the pointer TMHPTR of the encoder, a FILL if transmitted when the modem pointer TMDPTR approaches the encoder pointer TMHPTR. In this case, when the data read out is encoded, the EOL is composed of two bytes to constitute the data of 00H and 80H (refer to FIG. 10). The following practical example is considered as an example of the control in the item ②.

In the case where the modem pointer TMDPTR detects the data of 00H and 80H while the data in the FIFO memory is being transmitted, the REVRS (reverse) flag is checked. When the REVRS (reverse) flag is 0, a check is made to see if (high address in the encoder pointer TMHPTR)−(high address in the modem pointer TMDPTR) is smaller than 2 or not. When the above condition is satisfied, namely, when this difference is smaller than 2, the FILL is transmitted. On the contrary, when the above condition is not satisfied, namely, when (high address in the encoder pointer TMHPTR)−(high address in the modem pointer TMDPTR)$\geq 2$, the pointer TMDPTR of the modem is sequentially increased and the data stored in the FIFO memory is transmitted.

On the other hand, when the REVRS (reverse) flag is 1, a check is first made to see if the high address in the modem pointer TMDPTR is equal to TFIFEH (high byte in the last address of the FIFO memory) or not. When the high address in the modem pointer TMDPTR is not equal to the TFIFEH, the modem pointer is sequentially increased and the data stored in the FIFO memory is transmitted.

When the modem pointer TMDPTR is equal to the TFIFEH, a check is made to see if (high address in the encoder pointer
TMHPTR)−TFIFSH<1 or not. When this condition is satisfied, a FILL is trnasmitted. When this condition is not satisfied, namely, when (high address in the encoder pointer
TMHPTR)−TFIFSH$\geq 1$, the modem pointer TMDPTR is sequentially increased and the data stored in the FIFO memory is transmitted.

In the above-mentioned case, even in the case where the FILL is transmitted, if the encoding has been fully finished (actually, since "1" is set into a flag of MHEND when the encoding is finished on the side which performs the encoding, the modem side can discriminate whether the enocding has been fully finished or not by checking the flag MHEND), the modem pointer TMDPTR is sequentially increased and the data stored in the FIFO memory is transmitted.

After all of the encoded data has completely been transmitted, an RTC (Return To Control) signal is transmitted. The RTC signal is also constituted by adding the line number finally trnasmitted after the EOL. One hundred and three EOLs are transmitted.

The case of the item ③ will then be explained. FIG. 14 shows the number of bits and the number of bytes which are transmitted for three seconds in each transmission speed. Namely, to make it possible to execute the retransmission which allows the delay time of up to three seconds in the reciprocating directions, it is necessary that the encoder pointer TMHPTR is away from the modem pointer TMDPTR by 3600 bytes or more.

FIGS. 15A and 15B show the relations among the FIFO memory and various kinds of pointers. In this embodiment, when the high address in the pointer TMHPTR of the encoder is increased, as compared with the modem pointer TMDPTR, the encoder pointer TMHPTR is controlled so as to be away from the modem pointer TMDPTR by 4096 bytes or more. A practical example of this control will then be described hereinbelow.

The REVRS (reverse) flag is checked when the high address in the encoder pointer TMHPTR is increased. When the REVRS (reverse) flag is 0, a check is made to see if {TFIFEH − (high address in the encoder pointer TMHPTR)} + {(high address in the modem pointer TMDPTR) − TFIFSH} < 16 or not. When this condition is satisfied, the reading of the next line of the document and the encoding of the signal read are interrupted and the apparatus enters the waiting state. On the contrary, when this condition is not satisfied, namely, when {TFIFEH − (high address in the encoder pointer TMHPTR)} + {(high address in the modem pointer TMDPTR) − TFIFSH} ≧ 16, the next line of the document is read and the signal read is encoded and the encoded data is stored into the FIFO memory.

On the other hand, when the REVRS (reverse) flag is 1, a check is made to see if (high address in the modem pointer TMDPTR)−(high address in the encoder pointer TMHPTR)<16 or not. When this condition is satisfied, the reading and encoding are interrupted and the apparatus enters the waiting state. When this condition is not satisfied, namely, when (high address in the modem pointer TMDPTR)−(high address in the encoder pointer TMHPTR)≧16, the reading and encoding are performed and the encoded data is stored into the FIFO memory.

§7 PRO-PRIETY OF THE MEMORY CAPACITY TO STORE THE RETRANSMISSION START ADDRESS

It is assumed that the memory area to store the retransmission start address consists of 1024 bytes in this embodiment. Therefore, 512 retransmission start addresses can be stored into the memory. Namely, it is possible to retransmit the data as much as the past 512 line numbers. When one line has been encoded, the shortest data is obtained in the case where one line is all white. As mentioned above, the number of bytes is seven when the line of all white was encoded. Since one line number is increased for every line, the minimum number of bytes of one line number is seven. When considering the retransmission of the data as much as 512 line number, at least 3584 bytes are needed. In this case, assuming that the transmission speed is 4800 bits/sec (600 bytes/sec), 3584 (bytes)÷600 (bytes/sec)≃6 (seconds)

and three seconds are considered as the allowable delay time on the line as mentioned before. Therefore, it is sufficient to store 512 retransmission start addresses into the memory having a memory capacity as much as 512 addresses.

§8 CONTROL AFTER ALL IMAGE DATA HAVE BEEN TRANSMITTED FROM THE APPARATUS ON THE TRANSMISSION SIDE

After completion of the encoding of all image data on the document to be transmitted, the RTC (Return to Control) signal for allowing the reception side apparatus to interrupt the reception of the image signal and receives a procudure signal is written into the FIFO memory. This RTC signal is composed of 103 EOLs. The line number finally trnasmitted is added subsequent to the EOL. In this case, the EOL is constituted by twelve bits of which bit "1" follows eleven bits "0".

The transmission time of the RTC signal is 0.6 second when the transmission speed is 4800 bits/sec and 1.2 seconds when it is 2400 bits/sec.

In general, when the error retransmission is executed, in many cases, the line quality is bad. Therefore, it is presumed that the RTC cannot be detected in the case where the RTC signal consists of six EOLs. Therefore, the RTC signal is composed of 103 EOLs, thereby enabling the RTC signal to be certainly detected in the reception side apparatus.

Actually, even after the RTC signal is transmitted from the modem as well, the procedure signal is not immediately transmitted. In this embodiment, 1.2 seconds are allowed as the delay time of the international line or the like and one second is allowed as the detection time of the NACK signal (PIS signal) on the transmission side. If SED=0 after 1.5 seconds elapsed after the RTC signal had been transmitted, it is determined that the PIS signal is not transmitted from the reception side, so that the procedure signal is then transmitted. Practically speaking, EOM/MPS/EOP/PRI-ROM/PRI-MPS/PRI-EOP are used as the procedure signal.

On the contary, if SED=1 after 1.5 seconds elapsed after the RTC signal had been transmitted, the PIS signal is searched. When the PIS signal is detected within two seconds, the error retransmission is performed. On the contrary, when the PIS signal is not detected even after two seconds elapsed, the procedure signal is then transmitted.

§9 CONDITION TO REQUEST THE RETRANSMISSION FROM THE APPARATUS ON THE RECEPTION SIDE AND THE CONDITION TO REQUEST FALLBACK (FIG. 16)

The retransmission is requested from the apparatus on the reception side in the following three cases:

① When an image error of three or more successive lines has occurred.

② When the reception of the training signal has failed.

③ When the EOL signal cannot be detected for a predetermined time (for example, 4.5 seconds in the case of the transmission speed of 2400 bits/sec, 3.5 seconds in the case of 4800 bits/sec) or more after the apparatus entered the image reception mode.

On one hand, when "the retransmission was executed three times while a sheet of document is being transmitted", fallback is requested. However, in the case where the data having no error with regard to a predetermined number of bytes (e.g., 127 bytes) or more is received, a counter to count the number of retransmission times is cleared.

FIG. 16 is a flowchart showing the control procedure of the image reception when an attention is paid to the cases where the retransmission is requested and where the fallback is requested. The retransmission request-/fallback operation will then be described in detail with reference to this flowchart.

Step S1036 shows the image reception state. Prior to receiving the image data, a counter to count the number of transmission times of the NSF signal and a retransmission counter indicative of the number of retransmission times while a sheet of document is being received are preliminarily cleared.

In step S1038, a check is made to see if the reception of the training signal has succeeded or not. The success in training reception means that SED=1, CD=0 (length of about half of the training time), and CD=1 could be correctly confirmed. In the case where the training reception succeeded within 3.5 seconds, step S1040 then follows. On the contrary, when the training reception failed within 3.5 seconds, step S1078 then follows.

Ordinarily, the training reception ends within 3.5 seconds. Therefore, if the training reception is not finished within 3.5 seconds after the start of the training reception, it is determined that the training reception failed. As mentioned above, in this embodiment, the failure in the training reception can be promptly decided. Therefore, after that, the error transmission can be executed or the NSF signal (there can be a case of the DCN signal) can be transmitted.

An explanation will be made later with respect to the selection regarding whether the error retransmission is executed or the NSF signal is transmitted (the DCN signal is transmitted in the case where the NSF signal has been transmitted three times).

In step S1040, the counter to count the number of sending times of the NSF signal is cleared since the training reception has succeeded. When the error retransmission is executed, the reception side apparatus transmits the NSF signal subsequent to the PIS signal. The NSF signal contains the retransmission start line and the information indicative of the presence or absence of the fallback, and the like. When the transmission side apparatus correctly receives the NSF signal, it controls the fallback or the like and thereafter it retransmits the data from the retransmission start line.

However, when the transmission side apparatus cannot correctly receive the NSF signal, it again executes the receiving operation of the NSF signal. On one hand, after the reception side apparatus sent the NSF signal, it receives the training signal. However, since the transmission side apparatus does not send the training signal, the training reception will fail. At this time, the reception side apparatus checks to see if SED=1 could be detected within 3.5 seconds or not (step S1078). In this case, SED=0 since the training signal is not sent. The reception side apparatus again transmits the NSF signal. The foregoing counter serves to count this number of sending times of the NSF signals.

In the case where no training signal is sent from the transmission side even if the NSF signal was sent three times, the DCN signal is sent to disconnect the line.

Steps S1042 to S1046 show the image reception state.

In Step S1042, a check is made to see if a continuous error of three or more lines has occurred or not. Three lines are merely an example and the number of lines in this case can be set to other arbitrary value. In addition, this number of lines may be also automatically changed in accordance with a fineness of the received image.

When the continuous error of three or more lines has occurred, step S1052 follows and the error retransmission is executed. On the contrary, when the continuous error of three or more lines does not occur, step S1044 then follows.

In step S1044, a check is made to see if the EOF signal has been detected for a seconds (a=4.5 seconds in the case of the transmission speed of 2400 bits/sec, and a=3.5 seconds in the case of 4800 bits/sec) or not. When the EOL signal is not detected for a seconds, step S1056 follows and the retransmission is instructed to the transmission side. On the contrary, when the EOL signal is detected for a seconds, step S1046 follows. The period of a seconds is determined on the basis of the longest transmission time of one line at each transmission speed as a reference. Due to this, even in the case where although the training reception succeeded, the correct data is not demodulated as well, the error retransmission can be executed.

In step S1046, a check is made to see if the RTC (Return to Control) signal has been detected or not. When the RTC signal is detected, step S1048 follows. On the contrary, when the RTC signal is not detected, step S1042 follows.

Step S1048 shows the after procedure.

Step S1050 shows an error in the case where the timeover occurred (T=16 minutes) while a sheet of document is being received.

In step S1052, a check is made to see if the correct data as many as a predetermined number of bytes or more has been received or not. When the characteristic of the line is in the stationary state, the image reception is good. However, in the case where an error occurred due to the impulse-like noise which is not so frequently generated, this means that the correct data of a predetermined number of bytes or more has already been received.

In such a line condition, even if the fallback is executed on the transmission side, an error will again be generated. Therefore in such a case, it is proper not to perform useless fallback. Namely, when the correct data of a predetermined number of bytes or more has already been received, the retransmission counter is cleared in step S1054. On the contrary, when the correct data of a predetermined number of bytes or more is not received yet, step S1056 follows and the retransmission counter is not cleared.

In step S1056, the PIS signal is sent to interrupt the transmission on the transmission side.

In step S1058, the retransmission counter is increased by only one.

In step S1060, a check is made to see if the signal has reached (i.e., SED=1) or not. When SED=1, step S1062 follows. In this case, the PIS signal sent in step S1056 is not correctly received by the transmission side apparatus. On the contrary, when SED=0, step S1064 follows.

In step S1062, the PIS signal is again sent.

In step S1064, a check is made to see if the count value of the retransmission counter is 3 or more or not (namely, to see if the fallback is executed or not). When this count value is 3 or more (i.e., when the fallback is performed), step S1066 follows. On the contrary, when the count value is less than 3 (namely, when the fallback is not executed), step S1074 follows.

In step S1066, a check is made to see if the current transmission speed is 2400 bits/sec or not. If it is YES, the fallback cannot be performed any more. Therefore, the DCN signal is sent to disconnect the line (step S1068) and then the control procedure ends as an error (step S1070). On the other hand, when the current transmission speed is not 2400 bits/sec, step S1072 follows and the fallback is set.

In step S1074, the NSF signal including the retransmission start line and the information indicative of the present or absence of the fallback is sent.

In step S1076, the counter to count the number of sending times of the NSF signal is increased by only one and thereafter the image signal is received.

Step S1078 is the step which is branched when the training reception failed. In the case where the reception of the training signal failed after the CFR signal had been sent, the error retransmission is requested. However, in the case where the reception of the training signal failed after the NSF signal had been sent after completion of the error retransmission once, either one of the cases where the error retransmission is executed and where the NSF/DCN signal is sent is considered.

That is, in the case where the transmission side apparatus does not correctly receive the NSF signal (in the case where the transmission side apparatus does not send any training signal; namely, when it is YES in step S1078 and when it is YES in step S1080), the NSF signal is again sent. On the contrary, when the reception side apparatus failed in reception (it is NO in step S1078), the error retransmission is executed. In this case, SED=1 in step S1078 means that it is determined that the training signal has reached. When SED=1 is detected (i.e., in the case where the training signal has reached) in step S1078, step S1056 follows. On the other hand, when SED=1 cannot be detected (i.e., in the case where the training signal does not reach) in step S1078, step S1080 follows.

In step S1080, a check is made to see if the NSF signal for retransmission has been sent immediately before or not. If it is YES in step S1080, step S1082 follows. If it is NO, step S1056 follows.

In step S1082, a check is made to see if the NSF signal has already been retransmitted three times or not. If it is YES, the DCN signal is sent (step S1084) and thereafter the control procedure ends as an error (step S1086). If it is NO in step S1082, step S1064 follows and the NSF signal is again sent.

§10 CONSTITUTION OF THE NSF SIGNAL (FIG. 17)

The reception side apparatus is provided with a memory area to store the latest line number received. Upon initialization, the data of 0101H is stored.

Each time the EOL is detected, the decoder checks the next two-byte data, i.e., the line number. In the case where the line number received at the present time has been increased by only a number less than three as compared with the line number correctly received at the precedent time, it is decided that the received image is "good". In other words, it is determined that in the case of the image error of less then three lines, the reception is "good". Each time the line number is detected, it is stored into the memory and the count value is updated.

On the contrary, when the present line number received has been increased by a number of three or more than the precedent line number correctly received, the NACK signal is sent. In this embodiment, the PIS signal (the signal of which a signal of 462 Hz was continuously generated for three seconds) is sent. Namely, in the case where the image error of three or more lines occurred, it is decided that the received image is defective and the error retransmission is requested. Therefore, after the PIS signal was sent, the retransmission start line number and presence or absence of the fallback are informed to the transmission side apparatus using the signal of the transmission speed of 300 bits/sec.

An example of the signal of 300 bits/sec which is sent from the reception side apparatus to the transmission side apparatus is shown in FIG. 17. In this diagram, as a preamble, a pattern of a flag "0111 1110" is continuously sent for about one second; FFH denotes an address data; 13H is a control data (which is sent to the line in accordance with the sequence from the data of the LSB to the data of the MSB); and 20H is a FCF (Facsmile Control Field) of the NSF. The line numbers which are subsequently sent are the data of which an attention was paid to lower nine digits of the line number and there are line numbers 0 to 511. With respect to the line numbers which are sent in this case, "1" is not set to the MSB of each byte data. For example, line number 0 to 00H, 00H.

The next byte data indicates the presence or absence of the fallback. Practically speaking, the fallback is not set when it is 00H and the fallback is set when it is FFH.

FCS denotes the frame checking sequence and FLAG is a flag sequence "0111 1110".

Upon decoding when the image signal is received, the two-byte data (i.e., line number) subsequent to the EOL is ignored.

§11 OPERATION OF THE APPARATUS ON THE TRANSMISSION SIDE WHEN THE NACK SIGNAL (RETRANSMISSION REQUEST SIGNAL) HAS BEEN RECEIVED (FIG. 18)

The transmission side apparatus reads the data of the document by the reading means, encodes the data by the encoder, modulates the encoded data by the modem, and sends the modulated data to the line. At this time, the NACK signal (PIS signal in this embodiment) is checked. When the NACK signal is not detected, the image data is transmitted. When the NACK signal is detected, the transmission of the image data is interrupted and the signal of 300 bits/sec is then received. As mentioned above, the retransmission start line number (lower nine digits) and the information indicative of the presence or absence of the fallback are contained in the signal of 300 bits/sec.

When the transmission side apparatus detects the retransmission start line number, it checkes the address in the pointer TMHPTR of the encoder of the transmission side apparatus, the address in the modem pointer TMDPTR in the transmission side apparatus, the REVRS (reverse) flag, and the retransmission start address. Various kinds of controls are executed on the basis of the result of this check. As an example of this control, the following three cases are considered.

The first case is the case such that when the REVRS flag is 0 and the encoder pointer TMHPTR in the transmission side apparatus is larger than the modem pointer TMDPTR in this apparatus, the modem pointer TMDPTR in the transmission side apparatus is larger than the retransmission start address. FIGS. 18A to 18C show three cases where the retransmission start address is recognized and the retransmission is executed. The first case mentioned here is shown in FIG 18A. In this case, the retransmission start address is set to the modem pointer TMDPTR in the transmission side apparatus and the retransmission is performed from this line number.

The second case is shown in FIG. 18B and is the case such that the REVRS (reverse) flag is 1 and the modem pointer TMDPTR in the transmission side apparatus is larger than the encoder pointer TMHPTR in this apparatus. In this case, the retransmission start address is set to the modem pointer TMDPTR in the transmission side apparatus and the retransmission is performed from this line number. When the encoder pointer TMHPTR in the transmission side apparatus is larger than the retransmission start address, it is determined that an error occurred, so that, e.g., the DCN signal or the like is sent (at 300 bits/sec) and the line is opened without transmitting any image data.

The third case is shown in FIG. 18C and is the case such that when the REVRS (reverse) flag is 0 and the encoder pointer TMHPTR in the transmission side apparatus is larger than the modem pointer TMDPTR in this apparatus, the pointer of the retransmission start address is larger than the modem pointer TMDPTR in the transmission side apparatus. In this case, the retransmission start address is act to the modem pointer TMDPTR in the transmission side apparatus and the retransmission is performed from this line number. In addition, 1 is set to the REVRS flag. When the encoder pointer TMHPTR in the transmission side apparatus is larger than the retransmission start address, it is decided that an error occurred, so that, e.g., the DCN signal or the like is sent (at 300 bits/sec) and the line is opened without sending any image data.

When the instruction to perform the fallback is received, the fallback is executed and the image data is transmitted. When the DCN signal is detected subsequent to the PIS signal, the line is opened and the control procedure ends as an error.

§12 DESCRIPTION OF A BLOCK DIAGRAM OF THE APPARATUS ON THE TRANSMISSION SIDE (FIGS. 19 and 20)

FIG. 19 is a block diagram showing a constitution of the transmission side of the facsimile apparatus to which the present invention is applied.

In FIG. 19, reference numeral 2 denotes a network control unit (NCU) to hold a loop. In order to use the telephone network for data communication or the like, the NCU 2 is connected to a terminal of the line, thereby controlling the connection of the telephone exchange network or the switching to a data communication path.

Numeral 2a denotes a telephone line.

A hybrid circuit 4 serves to separate the signal of the transmission system from the signal of the reception system. A transmission signal on a signal line 28a is sent through a signal line 2b and the NCU 2 to the telephone line 2a. The signal sent from the facsimile apparatus on the distant side to be communicated is outputted to a signal line 4a through the NCU 2.

A detection circuit 6 detects the retransmission request signal (PIS signal is used in this embodiment) which is sent from the receiver. Namely, the detection circuit 6 receives the signal on the signal line 4a and outputs a signal of a "1" level to a signal line 6a when the retransmission request signal (PIS signal in the embodiment) is detected. On the contrary, when the retransmission request signal is not detected, the detection circuit 6 outputs a signal of a "0" level to the signal line 6a.

A binary signal reception circuit 8 receives the signal (NSF signal is used in the embodiment; refer to FIG. 17) of the transmission speed of 300 bits/sec which is sent subsequent to the retransmission request signal from the reception side apparatus and which contains the retransmission start line number and the information indicative of the presence or absence of the fallback. The reception circuit 8 also receives the disconnection command signal (DCN) (of the transmission speed of 300 bits/sec) which is sent subsequent to the retransmission request signal. When the NSF signal is detected, the binary signal reception circuit 8 generates a pulse to a signal line 8a and outputs the retransmission start line number to a signal line 8b. The reception circuit 8 also outputs the information indicative of the presence or absence of the fallback (the signal level is 0 when the fallback is not executed and is 1 when the fallback is performed) to a signal line 8d. When the DCN signal is detected, the reception circuit 8 generates a pulse to a signal line 8c.

A reader 10 reads an image signal of one line in the main scanning line direction from the document to be transmitted and produces a signal string indicative of binary of white or black. The reader 10 is constituted by an image sensing device such as a CCD (charge coupled device) or the like and an optical system. When a pulse is generated on a signal line 12a, namely, when a request to read the image signal of one line is instructed, the reader 10 reads the image signal of one line and outputs the binarized data to a signal line 10a.

Numeral 12 denotes a double buffer circuit which is constituted such that while the image signal stored in one buffer memory is being encoded, the image signal of the next line is written into the other buffer memory. Two buffer memories in the double buffer circuit 12 are referred to as BUF$_0$ (buffer 0) and BUF$_1$ (buffer 1). When the buffer BUF$_0$ is filled with the image data, a signal of a "1" level is outputted to the signal line 12b (buffer 0 full). When the buffer BUF$_0$ is not filled with the image data, a signal of a "0" level is outputted to the signal line 12b buffer 0 full). On the other hand, when the buffer BUF$_1$ is filled with the image data, a signal of a "1" level is outputted to a signal line 12c (buffer 1 full). When the buffer BUF$_1$ is not filled with the image data, a signal of a "0" level is outputted to the signal line 12c (buffer 1 full).

A control circuit 30, which will be explained later, checks that the buffer has been filled with the image data and thereafter it designates the buffer to be read out next by a signal which is outputted to a signal line 30b. (The data in the buffer 0 is read out when the signal on the signal line 30b is at a "0" level, and the data in the buffer 1 is read out when the signal on the signal line 30b is at a "1" level.) Thereafter, the control circuit 30 generates a pulse (read pulse) to a signal line 30a.

The double buffer circuit 12 outputs the data in the buffer designated to a signal line 12d. After this data has been completely outputted to the signal line 12d, the buffer full of the designated buffer is reset. Namely, when the signal outputted to the signal line 30b is at a "0" level (buffer 0 designation) and the (read) pulse is generated to the signal line 30a and all data in the buffer has been outputted, the buffer 0 full is reset (namely, a signal of a "0" level is outputted to the signal line 12b). On the contrary, when the signal outputted to the signal line 30b is at a "1" level (buffer 1 designation) and the (read) pulse is generated to the signal line 30a and all data in the buffer has been outputted, the buffer 1 full is reset (namely, a signal at a "0" level is outputted to the signal line 12c).

When the buffer is empty, the double buffer circuit 12 generates a pulse to the signal line 12a and receives the data of one line in the main scanning direction from the reader 10. In this case, this data is stored into the empty buffer and at the same time 1 is set to the buffer rull in which the data was stored. The read data is alternately stored into the buffer 0, buffer 1, buffer 0 and buffer 1.

A counter 14 counts the line number which is inserted after the end of line (EOL) code. When a pulse is generated to a signal line 30c, the line number is set to 0 (8080H). Each time a pulse is generated to a signal line 30d, a value of the line number is increased. Namely, when a pulse is generated to the signal line 30d when the line number is 0 (8080H), the line number becomes 1 (8081H). In a manner similar to the above, the line number is increased one by one. The two-byte data indicating the line number is outputted to a signal line 14a.

An encoder 16 receives the binarized data of one line which is outputted to a signal line 30e and then outputs the encoded data (based on the Modified Huffman encoding system in this embodiment) to a signal line 16c. When the number of bits of the encoded data becomes 8, namely, when the encoded data of one byte is obtained, the encoder 16 generates a pulse to a signal line 16a. On the other hand, upon completion of the encoding of the data of one line, the encoder 16 generates an end pulse to a signal line 16d. After completion of the encoding of one line, if the number of bits of the last data is less than eight, the remaining data is set to 0 and the process is executed by assuming that the data is composed of eight bits.

An FIFO memory 18 is used to read the line data and store the encoded data. On the other hand, the modem side reads out the data stored in the FIFO memory 18 and modulates it and sends the modulated data to the line. The encoded data is written into the FIFO memory 18 through three signal lines 30f, 30g, and 30h. When a (write) pulse is generated to the signal line 30f, the byte data outputted to the signal line 30h is stored in the address outputted to the signal line 30g. On the other hand, the data stored in the FIFO memory 18 is read out by way of three signal lines 30i, 30j, and 18a. When the (read) pulse is generated to the signal line 30i, the data in the address outputted to the signal line 30j is outputted to the signal line 18a. In this embodiment, the FIFO memory 18 has addresses of 8400H to AFFFH.

Numeral 20 denotes a retransmission start address storage memory. When a reception error occurred on the reception side, the transmission side apparatus re-transmits the data from the line number at which the error occurred by use of the memory 20. In the case of retransmitting the data from a certain line number in the transmission side apparatus, it is necessary to check from which number of the FIFO memory 18 the data of this line number has been stored. This data is stored in the memory 20. The information indicating "from which address of the FIFO memory 18 the data of a certain line number has been stored" is written into the memory 20 by way of signal lines 30k, 30l, and 30m. When the (write) pulse is generated to the signal line 30m, the byte data on the signal line 30l is stored in the address outputted to the signal line 30k. In addition, the information representing "from which address of the FIFO memory 18 the data from a certain line number has been stored" is read out from the memory 20 by way of signal lines 30k, 30n, and 20a.

When the (read) pulse is generated to the signal line 30n, the data in the address outputted to the signal line 30k is outputted to the signal line 20a. The memory 20 has addresses of C000H to C3FFH. A constitution of the memory to store the retransmission start addresses is as shown in FIG. 20.

As shown in FIG. 20, the addresses of line numbers 0, 512, . . . are stored in addresses C000H and C001H. The addresses of line numbers 1, 513, . . . are stored in addresses C002H and C003H. The addresses of line numbers 2, 514, . . . are stored in addresses C004H and C005H. In a manner similar to the above, the addresses of line numbers 510, 1022, . . . are stored in addresses C3FCH and C3FDH. The addresses of line numbers 511, 1023, . . . are stored in addresses C3FEH and C3FFH.

A parallel-to-serial conversion circuit (hereinafter abbreviated as a P/S conversion circuit) 22 converts the parallel data to the serial data. When the parallel data is not inputted to the P/S conversion circuit 22 any more, this converter generates a byte data request pulse to a signal line 22a. When a pulse is generated to the signal line 22a, the control circuit 30 outputs byte data to a signal line 30o. On the other hand, the P/S conversion circuit 22 receives the byte data outputted on the signal line 30o and parallel-to-serial converts it to the serial data and then outputs this serial data to a signal line 22b.

A modulator 24 performs the modulation based on the wellknown CCITT Recommendation V27ter (differential phase modulation). The modulator 24 receives the signal on the signal line 22b and modulates it and then outputs the modulated data to a signal line 24a.

Numeral 26 denotes a DCN signal sending circuit to send the DCN signal (of the transmission speed of 300 bits/sec) to a signal line 26a when a pulse is generated to a signal line 30p. Upon completion of the sending of the DCN signal, the sending circuit 26 generates a pulse to a signal line 26b.

An adder 28 receives the signals on the signal lines 24a and 26a and outputs the result of the addition to the signal line 28a.

The control circuit 30 will be described in detail later in the following items §13 and §14.

§13 SCHEMATIC DESCRIPTION OF THE OPERATION OF THE CONTROL CIRCUIT IN THE APPARATUS ON THE TRANSMISSION SIDE (FIG. 21)

The control circuit 30 shown in FIG. 19 executes the controls which will be explained hereinbelow. However, the encoding process is performed in accordance with the main routine and the transmitting process of signals is carried out in accordance with the interrupting routine.

The encoding by the control circuit 30, namely, the control procedure in the main routine is as shown in a flowchart fo FIG. 21. First, the modem pointer TMDPTR and the encoder pointer TMHPTR are set to the head address of the FIFO memory to store the encoded data (step S100). A check is made to see if the image data of one line in the main scanning direction has been completely read or not, namely, to see if the line buffer has been filled with the image data or not (step S102).

After the image data of one line in the main scanning direction has been read (namely, after the line buffer has been filled with the image data), step S104 follows and the data of one line is read (step S104). As mentioned above, the double buffer circuit is constituted by the buffer 0 and buffer 1 and the data is alternately read out from these two buffers.

After the data was read out from each buffer, it is encoded and the encoded data is written into the FIFO memory (step S106). The main controls upon encoding will be briefly explained hereinbelow.

1. The encoded data is written into the FIFO memory.
2. The end of line code (EOL signal) (00H and 80H and written as the data into the FIFO memory) and the line number are written into the FIFO memory.
3. In the case where a reception error occurs in the reception side apparatus, the transmission side apparatus retransmits the data from the line number at which the error occurred. The following control is executed so that this retransmission can be executed.

Namely, when the byte of the encoder pointer TMHPTR is increased, it is intended to prevent that the encoder pointer TMHPTR goes round the FIFO memory and approaches the modem pointer TMDPTR too closely. Practically speaking, when the encoder pointer TMHPTR approaches the modem pointer TMDPTR by a distance more than a predetermined value, the encoding is interrupted and the apparatus enters the waiting state. In the waiting state, a check is made to see if the PIS signal has been detected or not. When the PIS signal is detected, the NSF signal is then received. The modem pointer is set to the retransmission start address and the data is retransmitted from this address. When this retransmission is performed, the training is again executed. This control procedure is the same as that in steps S108 to S112, which will be explained later.

4. In the case of retransmitting the data from a certain line number, it is necessary to recognize from which address of the FIFO memory the data of this line number has been stored. This information is stored into the retransmission start address storage memory.

After completion of the encoding of the data of a certain line, a check is made to see if the retransmission request signal, i.e., the PIS signal has been detected or not (step S108). When this signal is detected, the transmission of the image data is interrupted and the NSF signal is then received (step S110). When the fallback is instructed, the transmission speed of the modem is reduced and the fallback is executed. When the DCN signal is received, the control procedure ends as an error.

Next, the modem pointer TMDPTR is set to the retransmission start address (this information is included in the NSF signal) and the data is retransmitted from this address (step S112).

Then, a check is made to see if the document of one original has been completely encoded or not (step S114). If it is NO, the processing routine is returned to step S102. If it is YES, step S116 follows.

In step S116, a check is made to see if the data which is not yet encoded still remains in the double buffer memories or not. If the non-encoded data still remains, step S102 again follows. If it is NO, step S118 follows and the RTC (Return to Control) signal is written into the FIFO memory.

Thereafter, the apparatus waits until the data stored in the FIFO memory is sent by the modem. After the data stored in the FIFO memory was sent, the apparatus enters the waiting state for only 1.5 seconds. If SED=0 in this case, the after procedure (step S122) follows. On the contrary, if SED=1, this means that the PIS signal has been sent from the reception side apparatus. Therefore, the PIS signal is then detected and the error retransmission is executed (step S120).

On the other hand, the transmitting process (i.e., interrupting process) mainly includes the following content.

(a) The data stored in the modem pointer TMDPTR is modulated and sent to the line.
(b) The modem pointer TMDPTR is sequentially increased.
(c) It is intended to prevent that the modem pointer TMDPTR passes ahead the encoder pointer TMHPTR.

§14 DETAILED DESCRIPTION OF THE OPERATION OF THE CONTROL CIRCUIT IN THE APPARATUS ON THE TRANSMISSION SIDE (FIGS. 22 and 23)

The control procedure (main process, i.e., encoding processing procedure) which is executed by the control circuit 30 will then be described with reference to flowcharts shown in FIGS. 22A to SSL.

First, various initializing processes are performed in steps S128 to S144.

In step S128, 0 is set to a flag TRNEND indicating whether or not all of the encoded data which had been stored in the FIFO memory has been sent or not.

In step S130, C000H is set to a pointer AGAPTR to control the memory to store the retransmission start address.

In step S132, 8400H is set to the encoder pointer TMHPTR.

In step S134, 8400H is set to the modem pointer TMDPTR.

Although the line number is increased for every predetermined number of lines (one line in the embodiment), this increasing operation is controlled by a counter LINCNT. In step S136, 1 is set to the counter LINCNT.

In step S138, 0 is set to the REVRS flag.

In step S140, 0 is set to the flag MHEND indicating whether or not the encoding has been finished.

In step S142, 0 is set to a flag BAF indicating from which buffer the data is currently being read out. When the flag BAF is 0, the data is read out from the buffer 0. When the flag BAF is 1, the data is read out from the buffer 1.

In step S144, the line number is initialized.

In steps S146 to S154, a check is made to see if the buffer is filled with the data or not, namely, to see if the data of one line has been completely read or not. When the buffer is full, step S156 follows. In this case, the data is alternately read from the buffers 0 and 1.

In steps S156 to S160, the data of one line is read out from the double buffers and outputted to the encoder.

In steps S162 to S182 shown in FIG. 22, to retransmit the data from a specific line number, the information indicating from which address of the FIFO memory the data of the specific line number has been stored is stored into the retransmission start address storage memory. In this case, when the line number changes, the retransmission start address is stored into this memory.

In step S162, the line number is increased for every line. In steps S164 to S168, the data of low byte in the retransmission start address is stored in the retransmission start address storage memory.

In step S170, the retransmission start address pointer AGAPTR is increased. In steps S172 to S176, the high byte data in the retransmission start address is stored into the retransmission start address storage memory. In step S178, the pointer AGAPTR is increased. In step S180, a check is made to see if the pointer AGAPTR has progressed to the end of retransmission start address storage memory or not. If this pointer has progressed to the end of memory, C000H is set to the retransmission pointer AGAPTR (step S182).

In steps S184 to S188 shown in FIG. 22, 00H is stored into the FIFO memory.

In step S190, the encoder pointer TMHPTR is increased. The increase of this pointer will be described later.

In steps S192 to S196, 80H is stored into the FIFO memory.

In step S198, the encoder pointer TMHPTR is increased.

In steps S200 to S216, the line number is inputted and stored into the FIFO memory. Namely, in step S200, the line number is inputted. In steps S202 to S206, the high byte data of the line number is stored into the FIFO memory. In step S208, the encoder pointer TMHPTR is increased.

In steps S210 to S214 shown in FIG. 22, the low byte data of the line number is stored into the FIFO memory. In step S216, the encoder pointer TMHPTR is increased.

In steps S218 to S230, the encode data is stored into the FIFO memory.

First, in step S218, a check is made to see if the one-byte data has been encoded or not. When the 1-byte data has been encoded, this encoded data of one byte is inputted (step S220) and then stored into the FIFO memory (steps S222 to S226).

In step S228, the encoder pointer TMHPTR is increased. In step S230, a check is made to see if the data of one line has completely been encoded or not. If it is NO, step S218 follows. If it is YES, step S232 follows.

In steps S232 to S238 shown in FIG. 22, a check is made to see if the line number is increased or not. If it is necessary to increase the line number it is increased for every line.

In steps S240 to S248, a check is made to see if the retransmission request signal, i.e., the PIS signal has been received or not. When the PIS signal is received, the NSF signal is then received and the retransmission start line number is inputted. The retransmission start address is set to the modem pointer TMDPTR and the data is transmitted from this address. When the fallback is instructed, the transmission speed is reduced. When the DCN signal is received, the line is disconnected.

Further, the line is disconnected in the case where the NSF signal cannot be detected as well, after an expiration of a predetermined time (e.g., 30 seconds).

In step S250, a check is made to see if the document of one original has been encoded or not. If it is YES, step S252 follows. If it is NO, step S146 follows.

In steps S252 and S254, a check is made to see if either one of the buffers is full or not. If it is YES, step S146 follows. If none of the buffer 0 and buffer 1 is full, step S256 follows.

In steps S256 to S300 shown in FIG. 22, the RTC (Return to Control) signal is stored into the FIFO memory.

First, in steps S256 to S260, data of 00H is stored into the FIFO memory.

In step S262, the encoder pointer TMHPTR is increased.

In steps S264 to S268, data of 80H is stored into the FIFO memory.

In step S270, the encoder pointer TMHPTR is increased.

In steps S274 to S304 and in steps S1088 to S1128, only 103 signals of which the line numbers were added to the EOLs are stored into the FIFO memory. In this embodiment, the EOL is the signal consisting of eleven bits "0" and one bit "1" subsequent thereto.

In step S1130, 1 is set to the flag MHEND because the encoding has been finished.

In steps S1132 to S1170 shown in FIG. 22, the apparatus waits until all of the data stored in the memory has been sent from the modem.

When the PIS signal is detected, the NSF signal is received and the retransmission start line number is inputted. The retransmission start address is set to the modem pointer TMDPTR and the data is transmitted from this address. When the fallback is instructed, the transmission speed is reduced. On one hand, when the DCN signal is received, the control procedure ends as an error. Further, the control procedure ends as an error even when the NSF signal cannot be detected as well after an elapse of 30 seconds.

If SED=0 after an expiration of 1.5 seconds after the RTC signal was sent from the modem, namely, after the flag TRNEND became 1, it is determined that the transmission of the image data has been finished. Thus, the procedure signal is sent. On the contrary, when SED=1 after an elapse of 1.5 seconds, the PIS signal is searched. When the PIS signal is detected within two seconds, the error retransmission is performed. When the PIS signal is not detected even after two seconds elapsed, it is decided that the image transmission has been finished and the procedure signal is then sent.

Steps S306 to S326 shown in FIG. 22 are the subroutine when the retransmission request signal (i.e., PIS signal) is detected during the transmission and the modem pointer TMDPTR is set to the retransmission start address (refer to steps S248, S348, and S1166).

As mentioned above, the retransmission start address is set in the following cases.
(1) The case where the REVRS flag is 0:
   (1-1) When TMHPTR>TMDPTR and also the retransmission address<TMDPTR
   (1-2) When TMHPTR>TMDPTR and also the retransmission address>TMHPTR (in this case, 1 is set to the REVRS flag)
(2) The case where the REVRS flag is 1:
   When TMDPTR>TMHPTR and also the retransmission address>TMHPTR In the above cases, the retransmission address is set to the modem pointer TMDPTR (step S318) and then the processing routine is returned (step S320). The control procedure ends as an error in the other cases.

In steps S328 to S354 shown in FIG. 22, the encoder pointer TMHPTR is increased.

In step S330, the encoder pointer TMHPTR is increased. When the high byte of the pointer TMHPTR is not increased, the routine is promptly returned. However, when the high byte of the TMHPTR is increased, step S334 follows.

In steps S334 to S338, it is controlled so as to prevent that the encoder pointer TMHPTR goes round and approaches the modem pointer TMDPTR too closely. Namely, when the encoder pointer TMHPTR is apart from the modem pointer TMDPTR by 4096 or more, the routine is returned. At this time, a check is made to see if the encoder pointer TMHPTR has reached the end of FIFO memory or not. When it reaches the end of FIFO memory, 8400H is set to the encoder pointer TMHPTR.

If the encoder pointer TMHPTR is not away from the modem pointer TMDPTR by 4096 or more, the encoding is interrupted and the apparatus enters the waiting state. In this waiting state, a check is made to see if the retransmission request signal (i.e., PIS signal) has been detected or not (step S340). When the PIS signal is detected, the transmission is interrupted (step S342) and the NSF signal is then received (step S344). The retransmission start line number is inputted (step S346) and the retransmission address is set to the modem pointer TMHPTR.

When the fallback is instructed, the transmission speed is reduced. When the DCN signal is received, the line is disconnected. Further, the line is also disconnected even when the NSF signal cannot be detected after an expiration of a predetermined time (e.g., 30 seconds).

FIG. 23 is a flowchart showing the detailed control procedure for the transmitting process (i.e., interrupting process) of the encoded data. In this embodiment, this interrupting process is executed when a pulse (i.e., byte data request pulse) is generated to the signal line 22a.

In this control procedure, the data stored in the FIFO memory is sequentially read out (steps S370 to S376) and outputted to the P/S conversion circuit 22 (steps S380 to S386 and steps S390 to S396). At this time, it is controlled so as to prevent that the modem pointer TMDPTR passes ahead tne encoder pointer. Namely, when the data of 00H and 80H is detected while the encoded data is being sent, in the case where the encoder pointer TMHPTR is not located ahead of the modem pointer by a predetermined amount, a FILL is sent and the apparatus waits until the encoding is carried out (step S380 to S392 and steps S404 to S410) as mentioned above. This procedure does not apply to the case where the MHEND is 1 (namely, when all of the document of one original has completely been encoded). When the modem pointer reaches the end of FIFO memory, the modem pointer TMDPTR is set to the head address 8400H of the FIFO memory (steps S398 and S400).

When the encoding has been all completed (MHEND=1) and the modem has transmitted all of the encoded data (TMHPTR=TMDPTR) (step S364), 1 is set to the TRNEND (step S366). The completion of the transmission of the encoded data is informed to the main processing routine (encoding processing routine).

§15 BLOCK CONSTITUTION OF THE APPARATUS ON THE RECEPTION SIDE (FIG. 24)

FIG. 24 is a block diagram showing a constitution of the reception side of the facsimile apparatus to which the invention is applied.

The condition to perform the error retransmission and the condition to execute the fallback have already been described in detail before; therefore, their descriptions are omitted here. Only the processes which are executed after the actual image signal was received will then be described hereinbelow.

In FIG. 24, a network control unit (NCU) 40 is the same as the NCU 2 shown in FIG. 19. Numeral 40a denotes a telephone line.

A hybrid circuit 42 is similar to the hybrid circuit 4 shown in FIG. 19. A signal transmitted to a signal line 54a passes through a signal line 40b and is sent to a telephone line 40a through the NCU 40. The signal sent from the facsimile apparatus on the distant side to be communicated is outputted to a signal line 42a through the NCU 40.

A detection circuit 44 receives the signal on the signal line 42a and detects the presence or absence of the signal. When the detection circuit 44 receives the signal of −43 dBm or more, it outputs a signal of a "1" level to a signal line 44a. When the detection circuit 44 receives the signal less than −43 dBm, it outputs a signal of a "0" level to the signal line 44a.

A demodulator 46 performs the demodulation based on the wellknown CCITT Recommendation V27ter (differential phase modulation). The demodulator 46 receives the signal on the signal line 42a and demodulates it and then outputs the demodulated data to a signal line 46a.

A serial-to-parallel conversion circuit (hereinafter, abbreviated as an S/P conversion circuit) 48 converts the serial data to the parallel data. When the S/P conversin circuit 48 forms the parallel data of eight bits, it generates a pulse to a signal line 48a and outputs and received data to a signal line 48b. A control circuit 66 detects the pulse generated to the signal line 48a, thereby recognizing that the data of one byte was received.

When a pulse is generated to a signal line 66b, a sending circuit 50 sends the NSF signal (refer to FIG. 17) to a signal line 50a. The line number is included in the NSF signal. The value outputted to a signal line 66a is set to this line number. The information of the fallback is contained in the NSF signal. The fallback information is outputted to a signal line 66h. When the signal on the signal line 66h is at a "0" level, the fallback is not instructed. When it is at a "1" level, the fallback is instructed. Upon completion of the transmission of the NSF signal, the sending circuit 50 generates a pulse to a signal line 50b.

A sending circuit 52 sends the retransmission request signal (i.e., PIS signal in this embodiment). In other words, when a pulse is generated to a signal line 66c, the sending circuit 52 sends the PIS signal (a signal of 462 Hz continues for three seconds) to a signal line 52a. After the PIS signal was sent, the sending circuit 52 generates a pulse to a signal line 52b.

An adder 54 receives the signals on the signal lines 50a and 52a and outputs the result of the addition to the signal line 54a.

An FIFO memory 56 is used to demodulate the data sent from the facsimile apparatus on the distant side to be communicated and store the demodulated data. The FIFO memory 56 is the same as the FIFO memory 18 (refer to FIG. 19) on the transmission side.

On the other hand, a decoder 60 reads out the data stored in the FIFO memory and decodes it and records it through a double buffer circuit 62. The demodulated data is written into the FIFO memory using signal lines 66c to 66e. When a (write) pulse is generated to the signal line 66c, the byte data outputted to the signal line 66e is stored in the address outputted to the signal line 66d.

On the other hand, the data stored in the FIFO memory is read out by way of three signal lines 66f, 66g, and 56a. When a (read) pulse is generated to the signal line 66f, the data in the address outputted to the signal line 66g is outputted to a signal line 56a. In this embodiment, the addresses of the FIFO memory are 8400H to AFFFH.

A line number storage memory 58 stores the latest line number correctly received. In the case of writing the line number into the memory 58, the line number is outputted to the signal line 66h and a (write) pulse is generated to a signal line 66i. On the contrary, when reading the latest line number correctly received, a (read) pulse is generated to a signal line 66j, so that the latest line number correctly received is outputted to a signal line 66h.

The decoder 60 reads out the demodulated data from the FIFO memory and outputs the decoded data to a signal line 60c. Upon completion of the preparation to decode the demodulated one-byte data, the decoder 60 generates a byte data request pulse to a signal line 60a. When the pulse is generated, the control circuit 66 reads out the demodulated one-byte data from the FIFO memory and outputs to the signal line 66k. After completion of the decoding of the signal of one line, the decoder 60 generates a pulse to a signal line 60b and then outputs the decoded data of one line to the signal line 60c.

Numeral 62 denotes the double buffer circuit which is constituted such that while the image signal is one buffer is being recorded, the image signal of the next line is written into the other buffer memory. The buffer circuit 62 is the same as the double buffer 12 (refer to FIG. 11) of the transmitter. These two buffers are referred to as a BUF 0 (buffer 0) and a BUF 1 (buffer 1). When the buffer BUF 0 is filled with the image data, a signal of a "1" level is outputted to a signal line 62a (buffer 0 full). When the buffer BUF 0 is not filled with the image data, a signal of a "0" level is outputted to the signal line 62a (buffer 0 full).

When the buffer BUF 1 is filled with the image data, a signal of a "1" level is outputted to the signal line 62b (buffer 1 full). When the buffer BUF 1 is not filled with the image data, a signal of a "0" level is outputted to the signal line 62b (buffer 1 full).

The control circuit 66, which will be explained latter, recognizes that the buffer is empty and designates into which buffer the data should be written (namely, the data is written into the buffer 0 when the signal on a signal line 66m is at a "0" level, and the data is written into the buffer 1 when it is at a "1" level). Thereafter, the control circuit 66 outputs the recording data to a signal line 66n and generates a (write) pulse to a signal line 66l.

The double buffer circuit 62 sets 1 to the buffer full of the designated buffer.

On the other hand, after the recording of the line data stored in a certain buffer has been finished, a recorder 64 generates a recording request pulse to a signal line 64a.

On one hand, in the case where the buffer is filled with the data when the recording request pulse is detected, the buffer circuit 62 outputs the recording data to a signal line 62c. After all of the data in the buffer has been outputted to the recorder 64, the buffer full corresponding to this buffer is reset. In this case, the data is alternately read out from the buffers such that the buffer 0, buffer 1, buffer 0, and buffer 1.

Upon completion of the preparation of the recording, the recorder 64 generates a recording request signal to the signal line 64a. The recorder 64 receives the recording data outputted to the signal line 62c and records it.

The operation of the control circuit 66 will now be described in detail in the following item §16.

§16 DESCRIPTION OF THE OPERATION OF THE CONTROL CIRCUIT OF THE APPARATUS ON THE RECEPTION SIDE (FIGS. 25 and 26)

The control circuit 66 shown in FIG. 24 executes the following controls.

The reception of the transmission data is processed by way of the foregoing interrupting routine. The decoding process is carried out by way of the main routine.

To receive the data, the control circuit 66 receives the one-byte data each time a pulse is generated to the signal line 48a and stores it into the FIFO memory. The modem pointer RMDPTR is then sequentially increased. On the other hand, when the modem pointer RMDPTR reaches the end of FIFO memory, the modem pointer is set to the head of FIFO memory. At this time, 1 is set to the REVRS flag.

FIG. 25 is a flowchart showing the detailed control procedure for the reception of the demodulated data (i.e., interrupting process).

When a pulse is generated to the signal line 48a, the interrupting process starts (step S600). In steps S602 to S606, the demodulated data is inputted and stored into the FIFO memory.

In step S608, the modem pointer RMDPTR is increased.

In step S610, a check is made to see if the modem pointer has reached the end of FIFO memory or not. When the modem pointer reaches the end of FIFO memory, 8400H is set to the modem pointer RMDPTR and 1 is set to the REVRS flag.

In the main processing (decoding processing) procedure, the end of line (EOL) code is first searched. Two bytes subsequent to the EOL denote the line number. In the case where the line number has been increased by only a number less than three as compared with the precedent line number, it is determined that the image reception is good. At this time, the line number is updated each time the new line number is received. Therefore, when the line number is larger than the precedent line number by three or more, it is decided that the image reception is inadequate. The PIS signal and the NSF signal containing the retransmission start line number are sent to the transmission side apparatus. In this case, the control of the fallback or the like is executed as mentioned above. The reception side apparatus receives the data from this line number.

When the image data is correctly received, each time the image data of one line is obtained, it is outputted to the double buffers and recorded. The data is alternately outputted to the double buffers such that the buffer 0 and buffer 1.

When the encoder pointer reaches the end of FIFO memory, the encoder pointer is set to the head of FIFO memory. At this time, REVRS flag is set to 0.

FIGS. 26A to 26D are flowcharts showing in detail the decoding processing procedure (main routine).

Figure 26A:
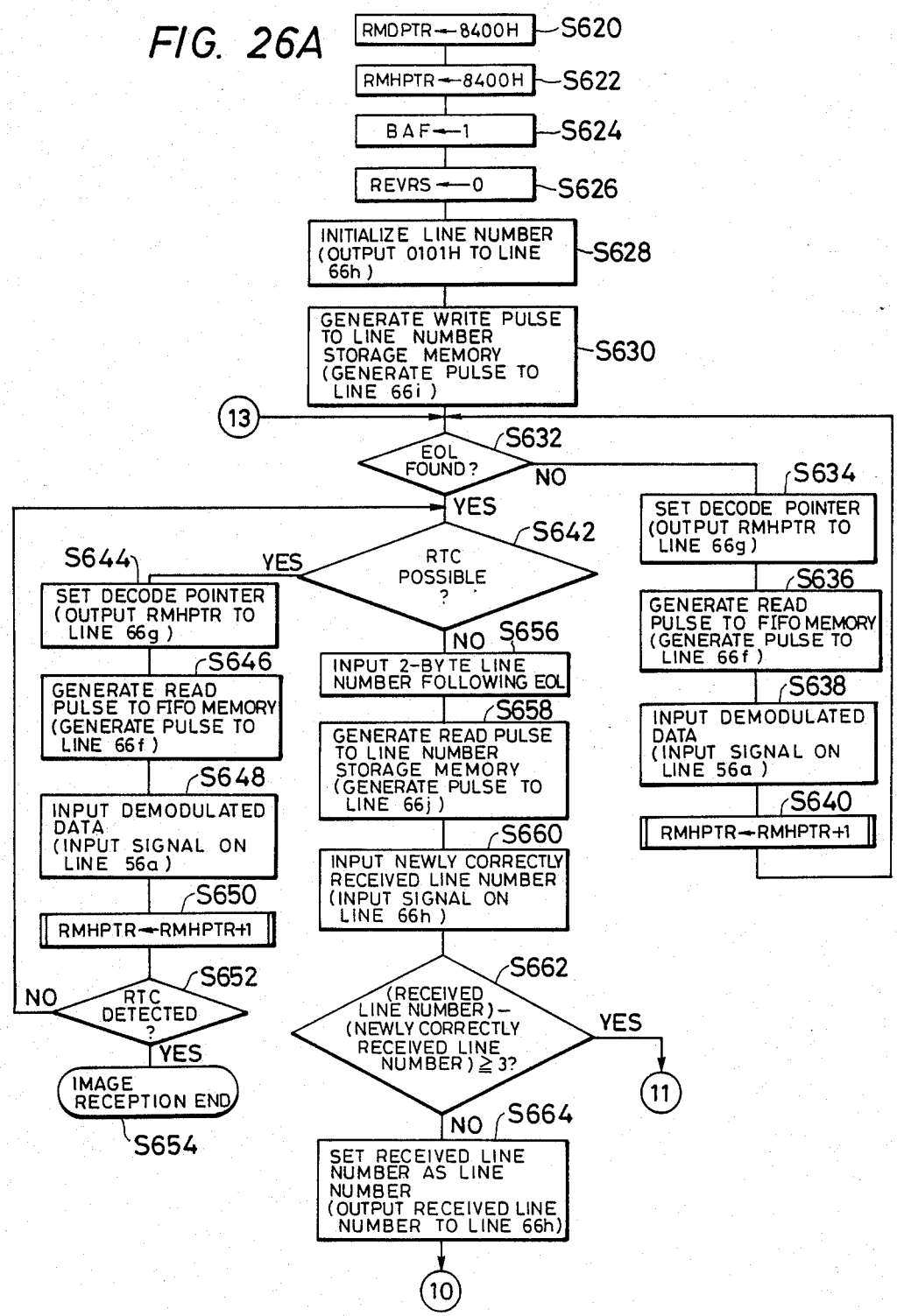
FIGS. 26A to 26D are flowcharts showing the decoding process (i.e., main process) which is controlled by the control circuit 66 shown in FIG. 24.

In FIG. 26A, steps S620 to S630 show various initializing processes.

In step S620, 8400H is set to the modem pointer RMDPTR.

In step S622, 8400H is set to the encoder pointer RMHPTR.

In step S624, 1 is set to the flag BAF (indicating into which buffer the recording data is at present stored).

In step S626, 0 is set to the flag REVRS representing that the modem pointer was returned to the head from the end of FIFO memory.

In steps S628 to S630, the line number is initialized (i.e., it is set to 0101H).

In steps S632 to S640, a check is made to see if the EOL has been detected or not. When the EOL is detected, step S642 follows.

In steps S634 to S638, the demodulated data of one byte is inputted from the FIFO memory.

In step S640, the encoder pointer is increased. This increasing process will be explained later (refer to steps S720 to S734).

In steps S642 to S654, a check is made to see if the return to control (RTC) signal has been detected or not. In step S642, a check is made to see if there is a possibility of detection of the RTC signal, namely, to see if the data after the two-byte data subsequent to the EOL was ignored is the EOL or not. If there is such a possibility, a check is then made to see if the RTC signal has been detected or not in steps S644 to S652. When the RTC signal was detected, the image reception ends (step S564). The RTC signal is detected when, for example, two bits "1" subsequent to eleven bits "0" were detected after "EOL". In this case as well, each time the EOL is detected, the two-byte data subsequent thereto is ignored.

In steps S644 to S648, the one-byte demodulated data is inputted from the FIFO memory. In step S650, the encoder pointer RMHPTR is increased. If there is not a possibility of detection of the RTC signal, namely, when it is detected that the data after the two-byte data subsequent to the EOL was ignored is not the EOL, step S656 follows.

In step S656, the 2-byte data subsequent to the EOL signal, i.e., the line number which was at present received is inputted. In steps S658 and S660, the latest line number correctly received is inputted.

In step S662, a check is made to see if the present line number received is larger than the latest line number correctly received by three or more or not, namely, to see if an image reception error has occurred or not. If the present line number is larger than the latest line number by three or more, namely, when the image reception error occurred, step S698 follows.

In the case where, on the contrary, the present line number is larger than the latest line number correctly received by only a number less than three, that is, when the image reception is good, step S664 follows.

In steps S664 and S666, the present line number is stored into the line number storage memory 58.

Figure 26B:
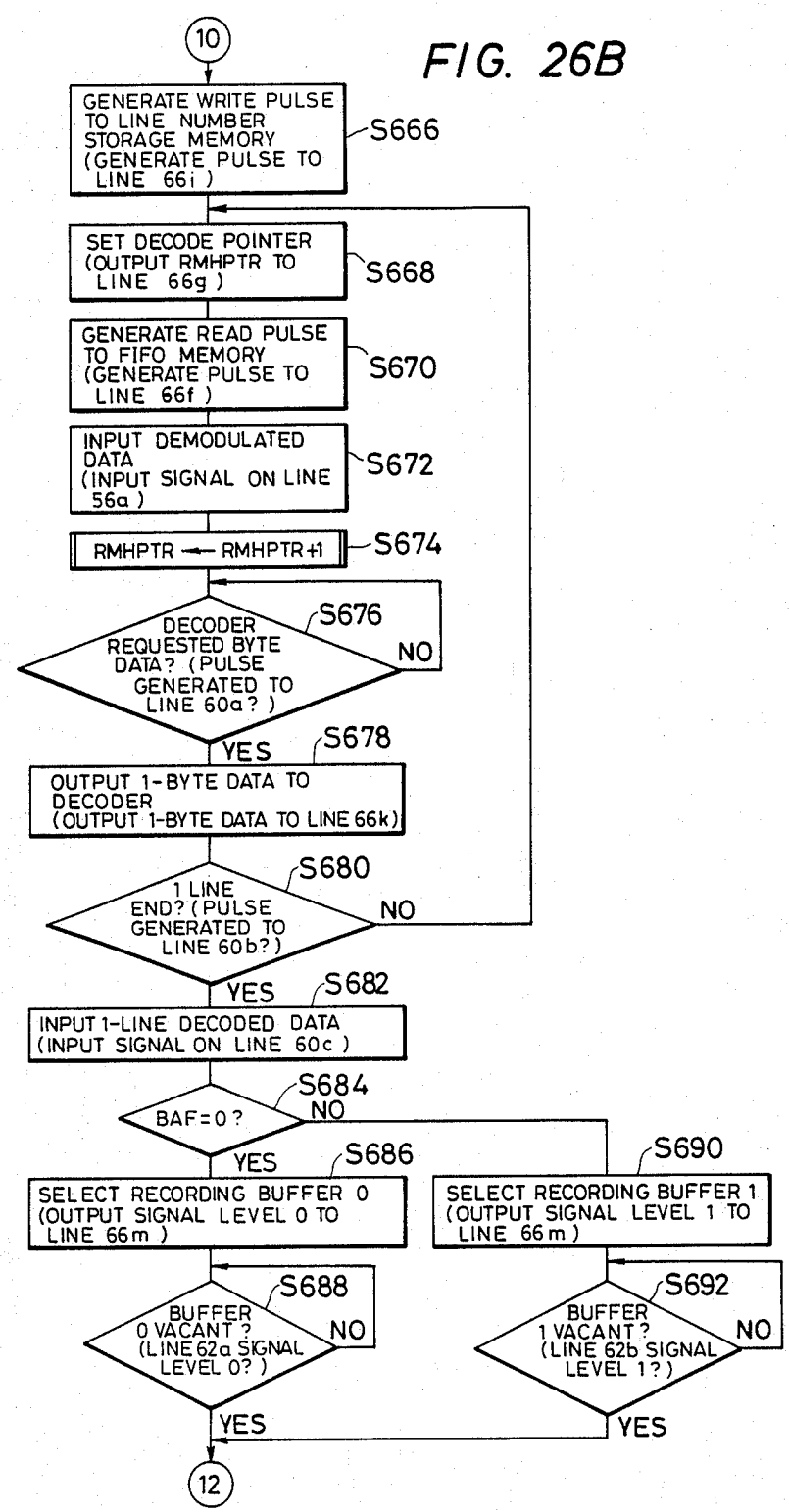

In steps S668 to S680 shown in FIG. 26B, the demodulated data is inputted and decoded to form the recording data of one line.

In steps S668 to S672, the demodulated data of one byte is inputted from the FIFO memory. In step S674, the encoder pointer RMHPTR is increased.

When the decoder requests the byte data (step S676), the one-byte data is sent to the decoder (step S678). In step S680, a check is made to see if the data of one line has been completely decoded or not. If it is NO, step S668 follows. If it is YES, step S682 follows.

In step S682, the decoded data of one line is inputted and the corresponding buffer is selected and this data is outputted to this buffer (steps S684 to S696). When the data of one line is written into the buffer, the buffer 0 and buffer 1 are alternately selected. In the next step S632, the data of the next line is decoded.

Figure 26C:
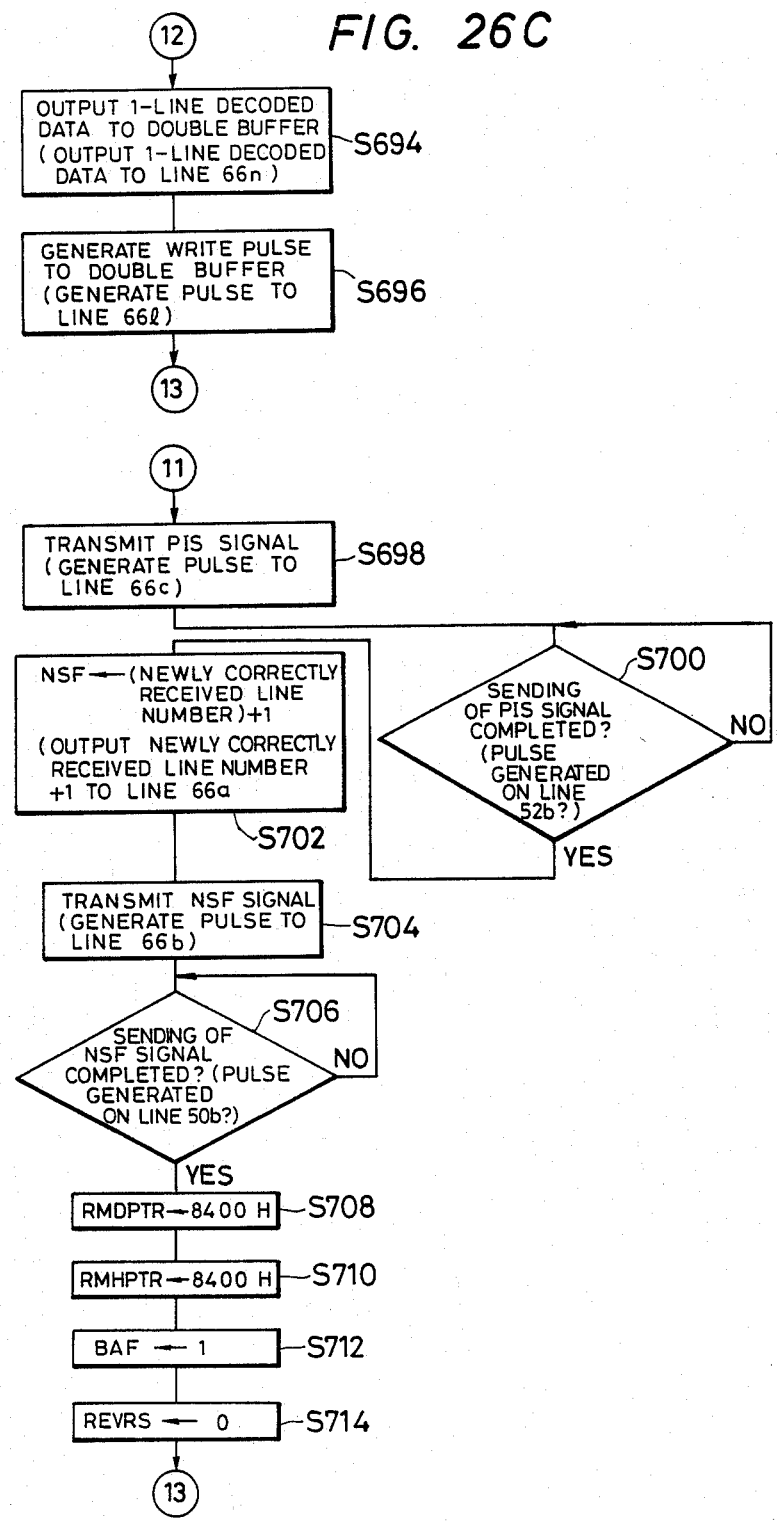

When the image reception is inadequate, step S698 shown in FIG. 26C follows. First, the PIS signal is sent (steps S698 to S700) to interrupt the transmission of the transmission side apparatus. Thereafter, the line number of which 1 was added to the latest line number correctly received is set to the NSF signal and the NSF signal is sent (steps S702 to S706). In this case, the control of the fallback or the like is also executed as mentioned above. 8400H is set to the modem pointer RMDPTR. 8400H is set to the encoder pointer RMHPTR. 1 is set to the flag BAF. 0 is set to the flag REVRS. Various initializing processes are performed and the image data is again received.

Figure 26D:
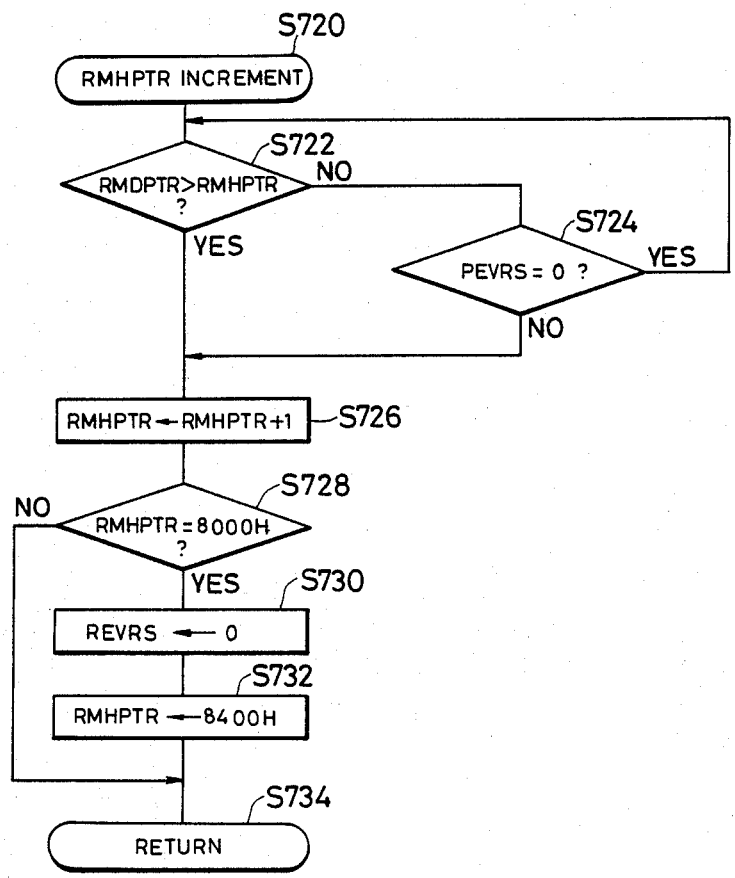

Steps S720 to S734 shown in FIG. 26D are the subroutine to increase the encoder pointer RMHPTR. When the encoder pointer RMHPTR is increased, it is necessary to control such that the encoder pointer doesn't pass ahead the modem pointer RMDPTR (steps S722 to S724).

In step S726, the encoder pointer RMHPTR is increased. In the case where the encoder pointer reaches the end of FIFO memory, the head address of the FIFO memory is set to the encoder pointer and 0 is set to the REVRS flag (steps S728 to S732).

In addition, various kinds of timers operate during the control operation as well and, for example, when the timeover occurs, the line is disconnected.

§17 OTHER EMBODIMENTS

In the case of constituting a facsimile apparatus having the automatic transmitting function, when the image transmission failed, another line is selected and the image data may be also automatically transmitted by this line.

On one hand, although the image of the document was divided into a plurality of line data in the foregoing embodiment, the area data which is obtained by dividing the image into a plurality of block areas may be also transmitted as a unit.

As described above, according to the embodiment, since the block transmission system according to the conventional HDLC procedure is not adopted, even if the transmission error occurs as well, the erroneous image data can be retransmitted from the corresponding line. Thus, an allowable error frequency can be also arbitrarily set and at the same time, the error retransmission can be also efficiently executed for the delay on the line.

In addition, since almost of the conventional encoding system can be commonly used, the embodiment can be easily realized.

Further, according to the embodiment, when the encoded data is sequentially transmitted by the modem on the transmission side, the data which has already been sent can be always stored by an amount as much as a predetermined number of bytes or more. Therefore, the allowable delay time on the line can be determined in accordance with this number of bytes. Namely, by setting the number of bytes to be a large value, even in the case where the delay time on the line is long as well, the error retransmission can be executed.

The foregoing embodiment is particularly effective to solve the problems referred to in 3.3 above.

In addition, since the block transmission system according to the conventional HDLC procedure is not adopted, even if the transmission error occurs as well, the erroneous image data can be retransmitted from the corresponding line. Thus, an allowable error frequency can be also arbitrarily set and at the same time, the error retransmission can be also efficiently executed for the delay on the line.

Further, since the decision reference to recognize the occurrence of the reception error on the reception side can be arbitrarily changed, the following special effects can be also derived.

① In the case where a reception error occurred even in one area, it is decided that the received image is inadequate and the image data can be retransmitted. Thus, the received recording image has no error at all.

① The decision reference to recognize the occurrence of the reception error on the receiver side can be defined as, for instance, "in the case where an error of three or more lines occurred". Therefore, only when the reception error of three or more lines occurred, it is decided that the received image is inadequate and the image data is retransmitted. On the other hand, the error of two or less lines can be ignored.

③ The decision reference can be changed in accordance with the kind of image, such as a size of character or the like.

Consequently, it is possible to solve the problems which are caused due to error retransmission using the HDLC frame constitution (§3 above), influences upon a line error (§3.1) and influences due to the bit position where an error occurred (§3.2) which have already been mentioned in the description of the related art.

According to an embodiment to which the present invention is applied, the following effects can be more practically obtained.

WITH RESPECT TO THE INFLUENCES UPON A LINE ERROR

Since the line number is added after the "EOL" (End of Line) code due to the Modified Huffman encoding system or Modified READ Encoding system, the retransmission request condition can be arbitrarily set on the reception side. For example, when an error of only one line occurred on the reception side, it is decided that the image reception is good. Only when a continuous error of two or more lines occurred, the retransmission can be requested.

To perform such a retransmission request, for instance, (a) On the transmission side, the line number is transmitted for every line and the algorithm to determine the received image to be inadequate on the reception side is changed.

(b) On the transmission side, the same line number is assigned to a few lines. By changing the numeric values indicative of these lines, the condition for retransmission is changed.

By changing such various conditions, the continuous allowable error lines can be arbitrarily set.

Particularly, in the facsimile transmission using a telephone line, it is difficult to fully eliminate the error line. Therefore, an error of a few lines or an error of tens of lines is permitted for the received image of one document. Namely, even if the received image has an error of a few lines or tens of lines, it is decided that the received image is adequate. From such a viewpoint, the line situation in the stationary state is discriminated by the training checking signal TCF and the transmission speed suitable for the line is selected. Due to this discrimination, the received image in the stationary state can be fairly improved. However, a problem occurs in the case where the impulse-like noise or the like was added to the line.

For such a problem as well, according to the error retransmission system of the invention, the retransmission is not requested but the image data is received when a generation frequency of an error is small. On one hand, in the case where a burst error occurred such as when the impulse-like noise was added to the line or the like, the retransmission can be requested. In this manner, the high efficient retransmission can be executed.

WITH RESPECT TO THE INFLUENCES DUE TO THE BIT POSITION WHERE AN ERROR OCCURRED

Figure 1:
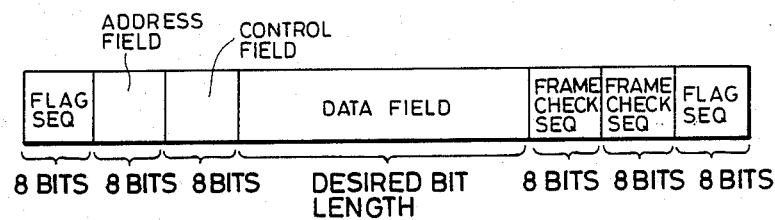
FIG. 1 is a diagram showing an HDLC frame format.
Figure 2:
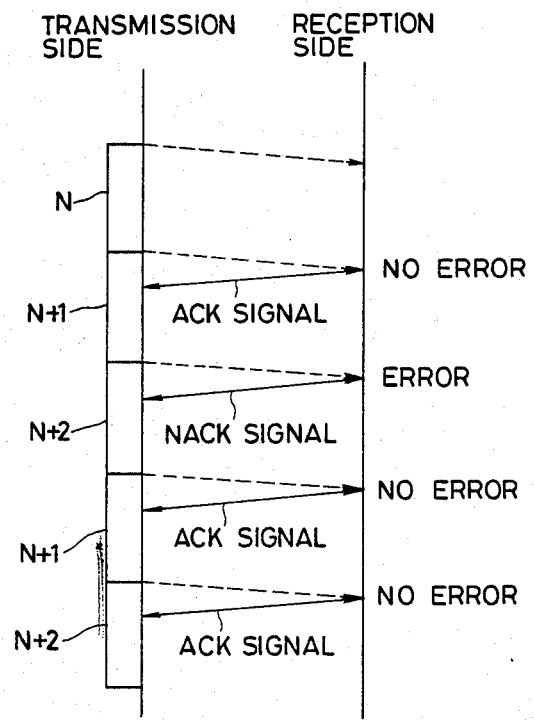
FIG. 2 is a diagram showing a practical example in the case where the error retransmission was performed using the HDLC frame data shown in FIG. 1.
Figure 3:
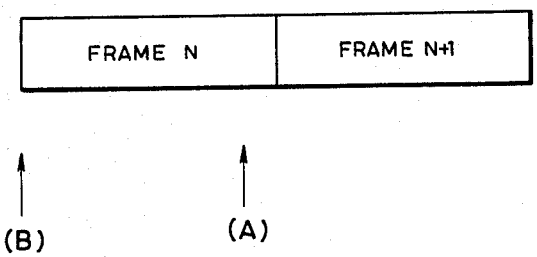
FIG. 3 is a diagram showing two HDLC frames.
Figure 4:
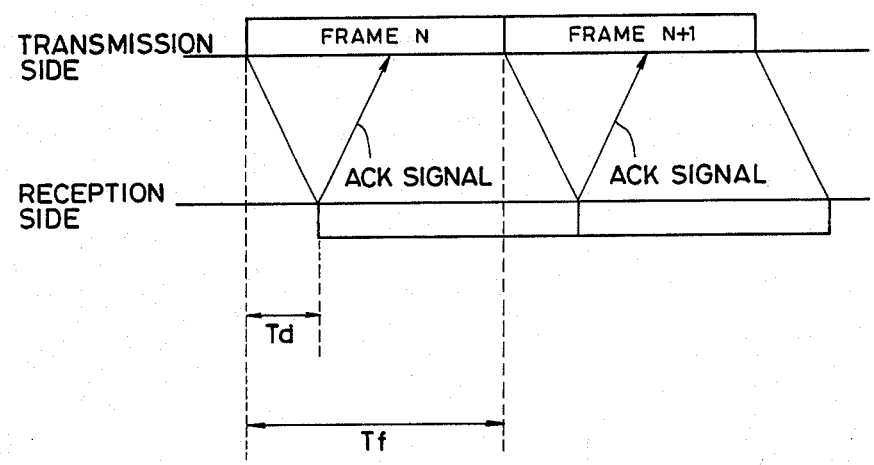
FIG. 4 is a diagram showing an example of the transmission of the HDLC frame in the case where a delay occurred in the line.

According to the error retransmission system of the invention, the data can be retransmitted from a desired area. Namely, even when an error occurred in the data existing in the portion of (A) shown in FIG. 3 as well, the data can be retransmitted from the head of data existing in the portion of (A). On the other hand, in the case where the image data was divided into blocks due to the conventional HDLC frame, it is necessary to retransmit the data from the portion of (B). In this manner, even when the error occurred in the received image as well, the data can be retransmitted from the area where the error occurred, so that there is not need to overlappingly transmit the data.

WITH REGARD TO THE INFLUENCES BASED ON THE PROPAGATION DELAY CHARACTERISTICS OF THE COMMUNICATION LINE

In the case of executing the error retransmission on the basis of the present invention, since the data is not divided into blocks, the error retransmission can be performed even when the delay time peculiar to the line is long as well.

WITH RESPECT TO EASE OF ENCODING

Since the bit having a constant length which follows the "EOL" is defined as the line number, the conventional encoding and decoding technologies can be used as they are and the encoding according to the invention can be easily realized. Due to this, it is possible to solve the drawback of the §3.4, difficulty in encoding, mentioned in the description of the related art.

It is also possible to obtain a special effect such that the data can be also retransmitted even when the apparatus on the distant side to be communicated could not correctly receive the training signal, which cannot be obtained in a conventional manner.

That is, a facsimile apparatus to which the invention is applied will now be described as an embodiment. After the apparatus entered the reception mode of a training signal which is sent prior to the image signal, a check is made to see if the training signal has correctly been received by the signal presence/absence detecting means and significant signal detecting means or not. In the case where the training reception is not correctly performed, the error retransmission is executed from the transmission side.

Thus, the error retransmission can be performed even when the training reception failed.

In this way, it is possible to solve the drawbacks mentioned in §4.2, regarding the process in the case where the reception of a training signal resulted in a failure, which has been mentioned in the description of the related art.

In addition, the fallback can be executed when the number of resending times of the error data exceeds a predetermined number, so that the vain fallback can be removed and the trasmission time can be reduced.

According to an embodiment (facsimile apparatus) to which the invention is applied, the following effects can be more practically derived.

In this embodiment, when a reception error of a predetermined number of areas (e.g., three lines) or more occurred, the error retransmission is performed, and when the number of retransmission times exceeds a predetermined number n (e.g., three), the fallback is performed (i.e., the transmission speed is reduced) and the transmission is executed. However, in the case where an error of a predetermined number of areas (e.g., three lines) or more occurred as well, if the correct data of a predetermined information amount of b bits (e.g., 127 bytes=127×8 bits) or more has already been received, the counter to count the number of retransmission times is initialized.

Due to this, even if the impulse-like noise generated when the line is in the stationary state (for example, it is assumed that such a noise was generated three times while the document of one original is being transmitted) or the like occurred a predetermined number of times, the automatic execution of the vain fallback is avoided.

Namely, when the correct data of a predetermined amount or more was received during the period after the error retransmission had previously been performed until the next error retransmission is executed, it is determined that there is no need to perform the fallback, thereby eliminating the vain fallback. Thus, it is possible to solve the drawback mentioned in §4.1 regarding fallback, which has already been mentioned in the description of the related art.

On one hand, in the case where the end of line (EOL) code cannot be detected within a predetermined period after the apparatus entered the image reception mode, the error retransmission can be performed. Thus, even when the demodulated data is not correctly demodulated although the training reception succeeded as well, the error retransmission can be executed.

In this manner, it is possible to solve the drawback mentioned in §4.3, regarding the process in the case where EOL cannot be detected, which has already been mentioned in the description of the related art.

In addition, since the error retransmission mode can be properly selected on the basis of the will of the operator, the image data can be properly communicated in consideration of the kind of document which is transmitted, function of the apparatus on the distant side to be communicated, or the like.

According to the facsimile apparatus to which the invention is applied, in addition to the foregoing effects of the invention, the following effects peculiar to the embodiment can be obtained.

① In the facsimile apparatus provided with the error retransmitting function, the error retransmission mode can be selected by continuously pressing the start button of the transmission side apparatus for a predetermined time (e.g., 2.5 seconds) or more.

② In the case where the reception side apparatus dosen't have the error retransmitting function in spite of the fact that the error retransmission mode was selected by the transmission side apparatus, the transmission of the image data can be started at a low transmission speed (e.g., 4800 bits/sec). Namely, when the error retransmission mode is selected, a probability of generation of an error is high in the case where the image data was transmitted at a high speed (e.g., 9600 bits/sec). Therefore, it is desirable to start the retransmission of the image data at a low transmission speed from the beginning.

③ As described above, it is possible to solve the drawback mentioned in §4.6, regarding the selection of the error retransmission mode, which has already been mentioned in the description of the related art.

According to the embodiment, since the causes of the failure of the training reception can be discriminated, the image data can be efficiently transmitted.

Further the following effects peculiar to the embodiment can be obtained.

① In the facsimilie apparatus having the error retransmitting function, the instruction signal of the retransmission start line or the like is sent from the reception side apparatus when the error retransmission is performed and thereafter the apparatus enters the reception mode of the image signal which is sent from the transmission side apparatus. However, in the case where the training reception failed, it is possible to discriminate whether the instruction signal of the retransmission start line or the like is not correctly received on the transmission side (namely, this means that the transmission side does not send any training signal) or whether the training signal sent from the transmission side apparatus can be correctly received by the reception side apparatus or not.

② In this discrimination, when it is decided that the transmission side apparatus does not correctly receive such an instruction signal which is sent from the reception side apparatus, the reception side apparatus can retransmit the instruction signal of the retransmission start line or the like.

③ Therefore, even if the transmission side apparatus cannot correctly receive the instruction signal of the retransmission start line or the like which is sent from the reception side apparatus as well, the reception side apparatus can resend the instruction signal. Therefore, the image data can be continuously transmitted and received.

④ In the case where the training/image signal is not sent from the transmission side apparatus in spite of the fact that the instruction signal was sent three times from the reception side apparatus, the DCN signal is sent and the control procedure ends as an error.

⑤ Thus, it is possible to solve the drawback mentioned in §4.5, regarding the process after an instruction signal of a retransmission start line or the like was sent, which has already been mentioned in the description of the related art.

In addition, according to the embodiment, the apparatus waits for only a predetermined period after completion of the sending of the image signal, and the procedure signal is transmitted after confirming that no error occurs on the reception side. Therefore, even if the reception error occurred at the end of image signal, the error retransmission can be executed. In this case, it is possible to consider both of the delay time which is caused on a long distance communication line such as an international line or the like and the detection time of the PIS signal (NACK signal) on the transmission side as well.

Thus, it is possible to solve the drawback mentioned in §4.4, regarding the process in the case where the transmission of an image signal was finished, which has already been mentioned in the description of the related art.

As described above, according to the present invention, the error retransmission mode can be certainly selected and the retransmission can be efficiently and properly executed.

The present invention is not limited to the foregoing embodiments but many modifications and variations are possible within the spirit and scope of the appended claims of the invention.

What is claimed is:

1. A data reception apparatus comprising:
   receiving means for receiving data divided into a plurality of units;
   discriminating means for discriminating a reception error in reception of data by said receiving means;
   transmitting means for sending a retransmission request signal to a transmission side in response to a discrimination output of said discriminating means; and
   setting means for variably setting a discrimination reference of said discriminating means.

2. A data reception apparatus according to claim 1, wherein the data is encoded image data.

3. A data reception apparatus according to claim 2, wherein said unit is one line of said image data.

4. A data communication system comprising:
   a data transmission apparatus having transmitting means for sending data and a training signal prior to transmission of said data;
   a data reception apparatus having receiving means for receiving said data and said training signal;
   detecting means for detecting that said training signal was not correctly received by said receiving means; and
   discriminating means for discriminating due to which cause on the transmission side or on the reception side the reception error of said training signal occurred in response to said detection output.

5. A data communication system according to claim 4, wherein said data is encode image data.

6. A data transmission apparatus comprising:
   transmitting means for transmitting a communication procedure signal and a data signal;
   retransmitting means for resending the data signal when a retransmission request signal is sent from a reception side;
   confirming means for checking the presence or absence of the retransmission request signal after completion of transmission of the data signal; and
   control means for allowing the communication procedure signal to be sent after absence of the retransmission request signal has been confirmed by said confirming means.

7. A data transmission apparatus according to claim 6, wherein the data is encoded image data.

8. Data reception apparatus according to claim 6, wherein said communication procedure signal is a signal having a function selected from the group consisting of (1) indicating the next data transmission and (2) indicating the end data transmission.

9. Data reception apparatus according to claim 6, wherein said retransmitting means has a memory for storing the transmitted data signal, and wherein said retransmitting means receives information identifying the data to be retransmitted and retransmits data corresponding to the received identified information.

10. Data reception apparatus according to claim 9, wherein said transmitting means transmits data which is divided into a plurality of units and said retransmitting means retransmits data for one of said units indicated by the discriminating information from the receiving side.

11. Data reception apparatus according to claim 10, wherein said unit is a line unit.

12. Data reception apparatus according to claim 6, wherein said confirming means checks whether the retransmission request signal was received within a predetermined period after the completion of data signal transmission and said retransmitting means conducts the data retransmission if the retransmission request signal was received within said predetermined period.

13. Data reception apparatus according to claim 12, wherein said control means permits the transmission of the communication procedure signal when said confirming means confirms that the retransmission data has not been received within said predetermined time.

14. Data reception apparatus cpmprising:
   receiving means for receiving data divided into line units;
   detection means for detecting an error in the line data received by said receiving means; and
   instruction means responsive to detection output of said detection means for instructing a transmitting end to retransmit the line data,
   wherein said instruction means issues the retransmission instruction when said detection means detects error over successive plural lines.

15. Data reception apparatus according to claim 14, wherein the data is encoded image data.

16. Data reception apparatus according to claim 14, further comprising memory means for storing an identification signal identifying line data in which an error is detected by said detection means,
   wherein said instruction means sends a retransmission request signal and an identification signal stored in said memory means to the transmitting end.

17. A data communication system comprising:
   data transmission apparatus having transmitting means for sending image data divided into lines and memory means for storing the data transmitted by said transmitting means; and data reception apparatus having receiving means for receiving a line of image data, detection means for detecting an error in the received line data and instruction means responsive to output from said detection means for instructing said data transmission apparatus to restransmit the line data, wherein said data transmission apparatus further comprises retransmission means for retransmitting the line data stored in said memory means in response to a retransmission instruction from said data reception apparatus, and wherein said instruction means issues the retransmission instruction to said data transmission apparatus when said detection means detects error over a predetermined number of lines and wherein the data of a line where said error occurred is not retransmitted if the number of lines on which said error is detected by said detection means is less than said predetermined number.

18. Data reception apparatus according to claim 17, wherein said instruction means issues the retransmission instruction when said detection means detects said error over said predetermined number of successive lines.

19. Data reception apparatus according to claim 17, wherein said image data is encoded image data.

20. Data reception apparatus comprising:
receiving means for receiving data divided into a plurality of units;
detecting means for detecting an error in each unit of the data received by said receiving means; and
instruction means responsive to a detection by said detecting means, for issuing a retransmission instruction for instructing a transmitting end to retransmit a unit of data in which an error is detected, wherein said instruction means issues the retransmission instruction when said detection means detects error over successive plural units.

21. Data reception apparatus according to claim 20, wherein the data is encoded image data.

22. Data reception apparatus according to claim 20, wherein the unit is one line of the image data.

23. Data reception apparatus according to claim 20, wherein said instruction means sends a retransmission request signal and an identification signal identifying the unit in which the error was detected to the transmitting end.

24. Data reception apparatus according to claim 23, wherein said instruction means sends a signal indicative of slowing a data transmission rate, to the transmitting end when the retransmission request signal is repeatedly sent more than a predetermined number of times.

25. Data reception apparatus according to claim 24, wherein the transmission rate is recovered from a slowed-down rate to a normal transmission rate upon completion of reception of data for which the retransmission request signal has repeatedly been sent.

26. Data transmission apparatus comprising:
transmitting means for transmitting data;
identifacation means for identifying the function of a receiving end in response to a signal from the receiving end;
retransmitting means responsive to a retransmission request for retransmitting data which the receiving end has failed to receive;
manual designation means for designating a retransmission mode in said retransmitting means; and
selecting means responsive to designation by said manual designation means and a result of identification by said identification means for selecting whether said retransmitting means is made operative or inoperative.

27. Data transmission apparatus according to claim 26, wherein said selecting means renders said retransmitting means operative when the retransmission mode is designated by said manual designation means and also said identification means identifies the receiving end having the retransmission mode.

28. A data communication apparatus according to claim 26, wherein a transmission speed is simultaneously selected upon selection by said selecting means.

29. A data communication apparatus according to claim 26, wherein the data is encoded image data.

* * * * *

UNITED STATES PATENT AND TRADEMARK OFFICE
CERTIFICATE OF CORRECTION

PATENT NO. : 4,829,524
DATED : May 9, 1989
INVENTOR(S) : TAKEHIRO YOSHIDA

It is certified that error appears in the above-identified patent and that said Letters Patent is hereby corrected as shown below:

COLUMN 3

Line 66, "contains" should read --contain--.

COLUMN 5

Line 2, "noises." should read --noise.--.

COLUMN 7

Line 46, "corresponding" should read
    --corresponding to--.

COLUMM 14

Line 40, "FIFO momory" should read --FIFO memory--.

COLUMN 17

Line 68, "ahead" should read --ahead of--.

COLUMN 18

Line 12, "ahead" should read --ahead of--.

COLUMN 19

Line 61, "PRO-PRIETY" should read --PROPRIETY--.

COLUMN 22

Line 23, "EOF" should read --EOL--.

UNITED STATES PATENT AND TRADEMARK OFFICE
CERTIFICATE OF CORRECTION

PATENT NO. : 4,829,524
DATED : May 9, 1989
INVENTOR(S) : TAKEHIRO YOSHIDA

Page 2 of 3

It is certified that error appears in the above-identified patent and that said Letters Patent is hereby corrected as shown below:

COLUMN 27

Line 23, "buffer rull" should read --buffer full--.

COLUMN 30

Line 30, "ahead" should read --ahead of--.

COLUMN 33

Line 59, "ahead tne" should read --ahead of the--.

COLUMN 39

Line 1, "almost" should read --most--.

COLUMN 43

Line 65, "encode" should read --encoded--.

COLUMN 44

Line 43, "cpmprising:" should read --comprising:--.
Line 59, "in which" should read --on which--.

COLUMN 45

Line 15, "data of" should read --data on--.

UNITED STATES PATENT AND TRADEMARK OFFICE
CERTIFICATE OF CORRECTION

PATENT NO. : 4,829,524

DATED : May 9, 1989

INVENTOR(S) : TAKEHIRO YOSHIDA

Page 3 of 3

It is certified that error appears in the above-identified patent and that said Letters Patent is hereby corrected as shown below:

COLUMN 46

Line 18, "identifacation" should read --identification--.
    Line 22, "request" should read --request signal--.

Signed and Sealed this

Fourth Day of August, 1992

Attest:

DOUGLAS B. COMER

*Attesting Officer*    *Acting Commissioner of Patents and Trademarks*